US008267795B2

(12) United States Patent  (10) Patent No.: US 8,267,795 B2
Shiraku  (45) Date of Patent: Sep. 18, 2012

(54) INFORMATION STORAGE MEDIUM AND GAME-PROVIDING SYSTEM

(75) Inventor: Shusuke Shiraku, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 0 days.

(21) Appl. No.: 13/182,859

(22) Filed: Jul. 14, 2011

(65) Prior Publication Data

US 2012/0021836 A1    Jan. 26, 2012

(30) Foreign Application Priority Data

Jul. 23, 2010  (JP) ................................. 2010-166505

(51) Int. Cl.
   *A63F 13/00* (2006.01)
(52) U.S. Cl. .......................................... 463/42; 715/757
(58) Field of Classification Search .............. 463/30–31, 463/42; 705/26, 27; 473/407
   See application file for complete search history.

(56) References Cited

U.S. PATENT DOCUMENTS

| | | | | |
|---|---|---|---|---|
| 7,996,264 | B2 * | 8/2011 | Kusumoto et al. | 705/14.16 |
| 8,172,702 | B2 * | 5/2012 | Meadows et al. | 473/407 |
| 2006/0105838 | A1 | 5/2006 | Mullen | 463/31 |
| 2008/0262910 | A1 * | 10/2008 | Altberg et al. | 705/14 |
| 2008/0263459 | A1 * | 10/2008 | Altberg et al. | 715/757 |
| 2008/0263460 | A1 * | 10/2008 | Altberg et al. | 715/757 |
| 2009/0063283 | A1 * | 3/2009 | Kusumoto et al. | 705/14 |
| 2010/0113140 | A1 * | 5/2010 | Kelly et al. | 463/25 |
| 2010/0179005 | A1 * | 7/2010 | Meadows et al. | 473/407 |
| 2011/0131508 | A1 * | 6/2011 | Gershfang et al. | 715/757 |

FOREIGN PATENT DOCUMENTS

JP    A-2008-242989    10/2008

OTHER PUBLICATIONS

Christopher Mack, Social Clicks Booyah's My Town: Location-Based Gaming Meets Monopoly, Inside Social Games, Dec. 3, 2009, URL: http://www.insidesocialgames.com/2009/12/03/booyahs-mytown-location-based-gaming-meets-monopoly/.
"Mobile Site Evolution", Web Designing vol. 9, issue 10, Japan, Mainichi Communications Corporation, Sep. 24, 2009, pp. 60-61 (with partial English-language translation).

* cited by examiner

*Primary Examiner* — Masud Ahmed
(74) *Attorney, Agent, or Firm* — Oliff & Berridge, PLC

(57) ABSTRACT

A server includes an acquisition section that provides a user with information about a virtual event area selected based on acquired current position information and position information linked to the virtual event area, the virtual event area being linked to position information that indicates a position within a predetermined range from an acquired current position, and stores the virtual event area as acquisition information about the user when an acquisition request for the virtual event area has been received, the virtual event area being linked to user identification information, a visit processing section that provides the user with information about the virtual event area having position information that indicates a position within a predetermined range from the acquired current position, based on the acquired current position information and the position information linked to the virtual event area, and receives a visit request, and a parameter calculation section that changes a result value or a predetermined game parameter of the user when a visit request for the virtual event area stored as the acquisition information about the user has been received from another user.

20 Claims, 40 Drawing Sheets

FIG.5

| STORE IDENTIFICATION INFORMATION | POSITION INFORMATION | ADDRESS | ATTRIBUTE | WORD-OF-MOUTH PAGE LINK | GAME DATA |
|---|---|---|---|---|---|
| E1 | (i₁, h₁) | a1b1c1 | Z1 | r1 | g1 |
| E2 | (i₂, h₂) | a2b2c2 | Z2 | r2 | g2 |
| E3 | (i₃, h₃) | a3b3c3 | Z3 | r3 | g3 |
| ... | ... | ... | ... | ... | ... |

320 — STORE IDENTIFICATION INFORMATION
322 — POSITION INFORMATION
324 — ADDRESS
326 — ATTRIBUTE
328 — WORD-OF-MOUTH PAGE LINK
330 — GAME DATA
262

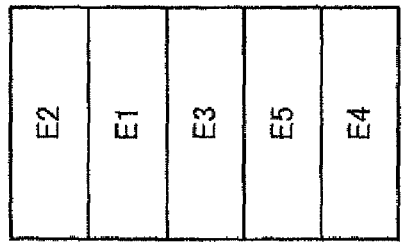
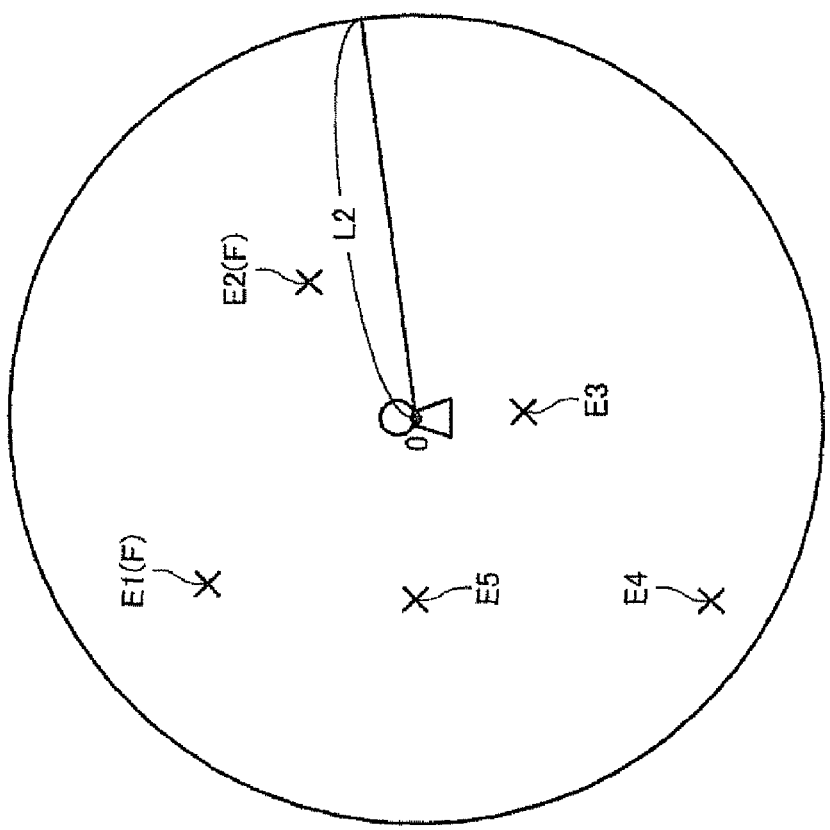

FIG.16

| USER | FRIEND | |
|---|---|---|
| Y1 | Y2, Y3 | ←—834 |
| Y2 | Y4, Y1 | |
| Y3 | Y1 | ←—838 |
| Y4 | Y2 | |
| ... | ... | |

810 — USER
820 — FRIEND

FIG.18
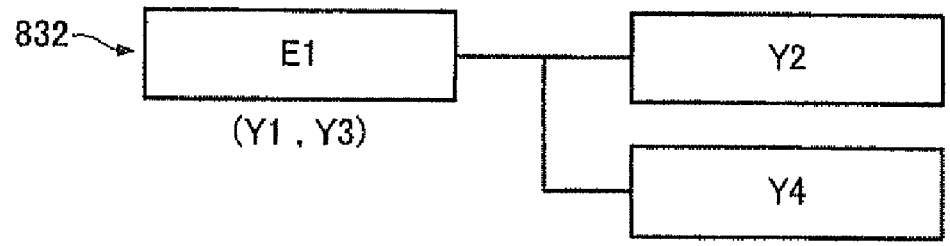
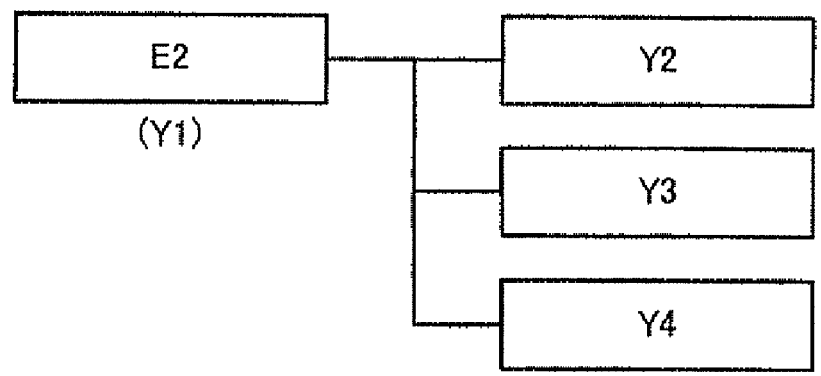
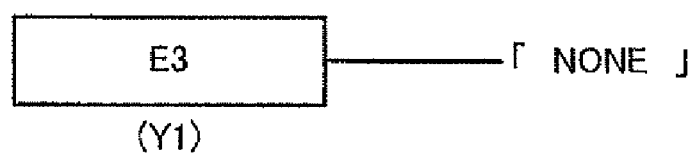
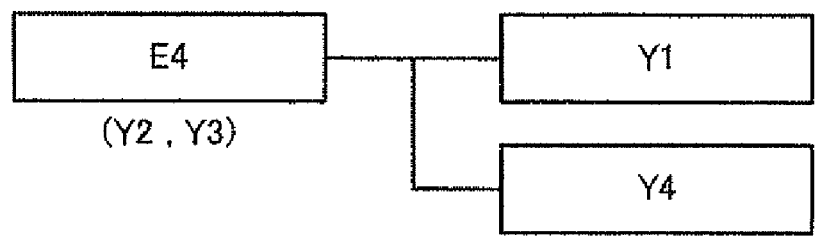

INFORMATION STORAGE MEDIUM AND GAME-PROVIDING SYSTEM

Japanese Patent Application No. 2010-166505, filed on Jul. 23, 2010, is hereby incorporated by reference in its entirety.

BACKGROUND OF THE INVENTION

The present invention relates to an information storage medium and a game-providing system.

A social networking service (SNS) (i.e., network system) that provides the user with a community-type service has been known. Such a network system allows the user to add a friend to a friend list, and allow the friend to read the diary kept by the user, or exchange an e-mail with the user. JP-A-2008-242989 discloses technology in this field.

In recent years, many users enjoy a game provided by the SNS, and notify friends with the game result via an e-mail, or record the game result on the diary or the my page.

The SNS can be utilized from a mobile terminal such as a mobile phone, and the user can enjoy a game provided by the SNS when the user is in transit.

In recent years, a mobile terminal such as a mobile phone generally includes a position information acquisition system (e.g., GPS). Various services have been provided by utilizing such a system.

The user who enjoys a game provided by the SNS using a mobile terminal such as a mobile phone generally plays a game when the user is in transit or in a place other than the home. Therefore, a game rich in variety can be provided by utilizing the current position information acquired by the position information acquisition system as a factor of the game.

Several games utilize the current position information about the user. However, these games are based on a game operation about the current position of the user. Therefore, a game operation about the current position of another user does not influence the user, or a game operation about the current position of the user does not influence another user. Specifically, the user cannot enjoy interaction with another user.

SUMMARY

According to a first aspect of the invention, there is provided a non-transitory computer-readable information storage medium storing a game-providing program that provides a game to a plurality of mobile terminals via a network, the game-providing program causing a computer to function as:

a virtual event area selection section that selects a virtual event area based on current position information acquired by a mobile terminal among the plurality of mobile terminals, the virtual event area being linked to position information that indicates a position within a predetermined range from a current position obtained from the current position information;

an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;

a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and a parameter calculation section that calculates at least one of a result value and a game parameter of a user in response to the acquisition request and/or the visit request for the virtual event area, the parameter calculation section changing the result value or the predetermined game parameter of a user for whom the information about the virtual event area is stored as the acquisition information when the visit request for the virtual event area has been received.

According to a second aspect of the invention, there is provided a game-providing system that includes a server that provides game to a plurality of mobile terminals via a network, the game-providing system comprising:

a virtual event area information storage section that stores virtual event area information including a virtual event area and position information corresponding to the virtual event area;

a virtual event area selection section that selects a virtual event area based on current position information acquired by a mobile terminal among the plurality of mobile terminals, the virtual event area being linked to the position information that indicates a position within a predetermined range from a current position obtained from the current position information;

an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;

a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and a parameter calculation section that calculates at least one of a result value and a game parameter of a user in response to the acquisition request and/or the visit request for the virtual event area, the parameter calculation section changing the result value or the predetermined game parameter of a user for whom the information about the virtual event area is stored as the acquisition information when the visit request for the virtual event area has been received.

BRIEF DESCRIPTION OF THE SEVERAL VIEWS OF THE DRAWING

FIG. 5 is a diagram illustrating store information.

FIGS. 15A and 15B are diagrams illustrating the display priority of candidate stores where a user can work part-time.

FIG. 16 is a diagram illustrating an example of friend information registered in a user information database.

FIG. 18 is a diagram illustrating an example of a part-timer list registered in a store information database.

DETAILED DESCRIPTION OF THE EMBODIMENT

Figure 1:
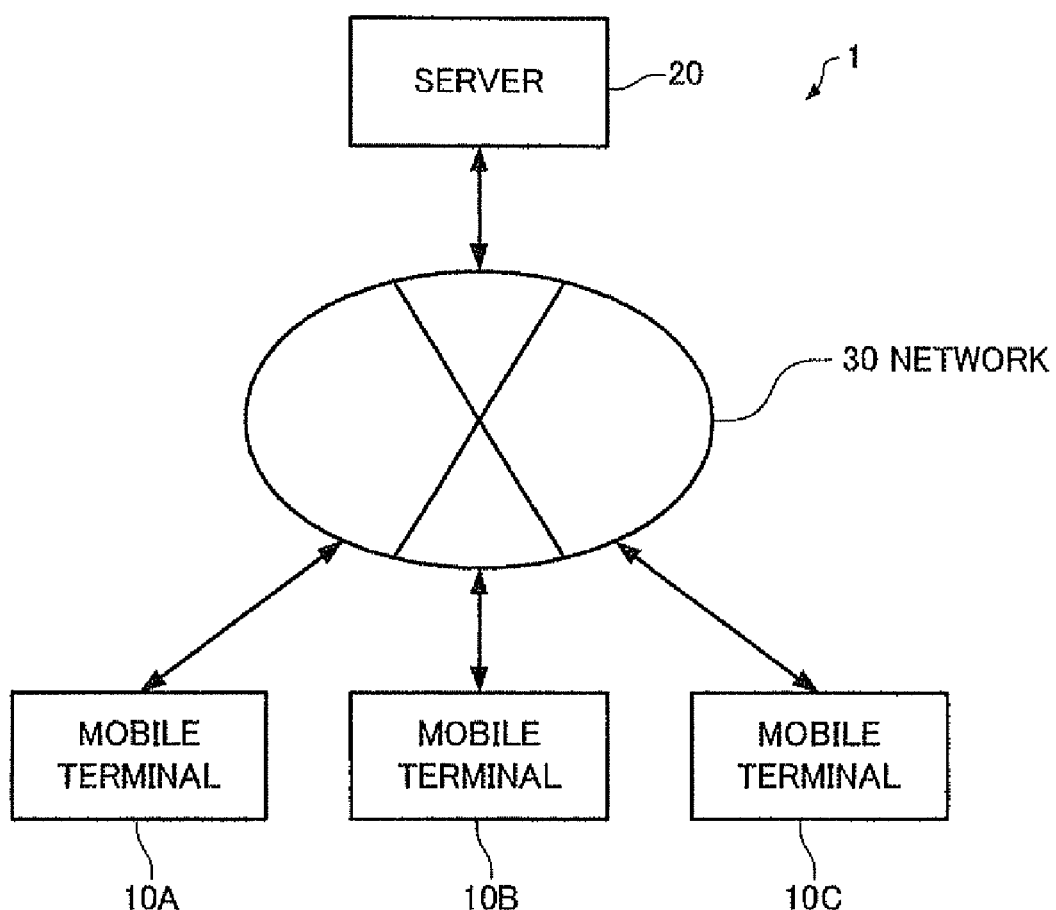
FIG. 1 is a diagram illustrating an example of a network of a game-providing system according to one embodiment of the invention.

The invention may provide an information storage medium and a game-providing system that allow a game operation that utilizes the current position of the user to influence a game played by another user by effectively utilizing current position information about a plurality of users.

(1) According to one embodiment of the invention, there is provided a non-transitory computer-readable information storage medium storing a game-providing program that provides a game to a plurality of mobile terminals via a network, the game-providing program causing a computer to function as:

a virtual event area selection section that selects a virtual event area based on current position information acquired by a mobile terminal among the plurality of mobile terminals, the virtual event area being linked to position information that indicates a position within a predetermined range from a current position obtained from the current position information;

an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;

a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and a parameter calculation section that calculates at least one of a result value and a game parameter of a user in response to the acquisition request and/or the visit request for the virtual event area, the parameter calculation section changing the result value or the predetermined game parameter of a user for whom the information about the virtual event area is stored as the acquisition information when the visit request for the virtual event area has been received.

The current position information may be information about the latitude, the longitude, the address, the nearest base stations, or the like in the real world.

The acquisition section may select a virtual event area linked to position information (in the real world) that indicates a position within a predetermined range from the position indicated by the acquired current position information as the acquisition candidate information. The acquisition section may provide a virtual event area among the selected virtual event areas that satisfies a predetermined condition as the acquisition candidate information. The predetermined condition may be a condition determined by the virtual price of the virtual event area, the game parameter (e.g., money) of the user, and the like.

The visit processing section may select a virtual event area linked to position information (in the real world) that indicates a position within a predetermined range from the position indicated by the acquired current position information as the visit candidate information.

When the virtual event area acquired by the user is included in the selected virtual event areas, the visit processing section may provide the virtual event areas excluding the virtual event area acquired by the user as the acquisition candidate information.

The parameter calculation section may advantageously change the result value or the predetermined game parameter of the user when a visit request for the virtual event acquired by the user has been received from another user. The parameter calculation section may advantageously change the result value or the predetermined game parameter of the user as the visit count of another user increases.

Identification information (ID or code) about the virtual event area may be linked (stored) to identification information (instrument ID of the mobile terminal or user ID designated in the game) as the acquisition information about the user.

The user may be prevented from issuing a visit request for the virtual event area acquired by the user.

For example, the user may be prevented from issuing a visit request when the visit request does not satisfy a predetermined condition.

It is thus possible to provide a game that changes the game result or parameter of the user when another user has visited the virtual event area acquired based on the position of the user in the real world.

This makes it possible to provide an interesting game in which a game operation using the current position information about the user influences the game result and the game parameter of another user, and a game operation using the current position information about another user influences the game result and the game parameter of the user.

It is thus possible to provide a computer-readable information storage medium that stores a program that allows a game operation that utilizes the current position of the user to influence a game result of another user by effectively utilizing the current position information about a plurality of users.

(2) In the information storage medium,
the visit processing section may cause a memory to store identification information about a user who has issued the visit request for the virtual event area as visit record information linked to the virtual event area when the visit request has been received; and
the parameter calculation section may determine whether or not the user who has issued the visit request for the virtual event area maintains a friendship with the user for whom the information about the virtual event area is stored as the acquisition information based on the visit record information and friend information that specifies a user who maintains a friendship with another user, and may advantageously change a result value or a predetermined game parameter of the user for whom the information about the virtual event area is stored as the acquisition information when it has been determined that the users are friends, as compared with a case where the users are not friends.

(3) In the information storage medium,
the visit processing section may acquire information about a user who maintains a friendship with another user based on the friend information, and may provide the other user with information about the virtual event area stored as the acquisition information about the user as the visit candidate information via a mobile terminal among the plurality of mobile terminals.

(4) In the information storage medium,
the parameter calculation section may change a result value or a predetermined game parameter of a user who has issued the visit request for the virtual event area when the visit request has been received.

(5) In the information storage medium, the game-providing program may cause the computer to further function as:
a cooperator registration section that provides a user with information about another user who maintains a friendship with the user and is registered as a game user, as cooperator candidate information via a mobile terminal among the plurality of mobile terminals, and registers the other user as a cooperator of the user when a cooperation request that designates the other user has been received from the mobile terminal,
wherein the parameter calculation section changes at least one of a result value and a game parameter of the user when a cooperator has been registered for the user.

(6) In the information storage medium,
the acquisition section may decide whether or not a user who has acquired the selected virtual event area has a friend among other users who have issued acquisition requests for the virtual event area based on the friend information and the acquisition information, and may determine a priority for providing the other users with the information via the users' mobile terminals based on the decision result.

(7) In the information storage medium, the game-providing program may cause the computer to further function as:
a virtual price calculation section that calculates a virtual price of the virtual event area based on land price information corresponding to the position information,
wherein the acquisition section provides a user with information including the virtual price of the selected virtual event area via a mobile terminal among the plurality of mobile terminals.

(8) In the information storage medium,
the parameter calculation section may calculate at least one of a result value and a game parameter of a user based on the virtual price of the virtual event area stored as the acquisition information about the user.

(9) In the information storage medium,
the acquisition section may select a virtual event area that is positioned within a predetermined range from the current position and has a virtual price equal to or lower than a given value based on the acquired current position information and the position information linked to the virtual event area, and may provide information about the virtual event area as the acquisition candidate information, and the acquisition section may select a virtual event area that has a virtual price equal to or lower than the given value and may provide information about the virtual event area as the acquisition candidate information while enlarging the predetermined range stepwise when the virtual event area that has a virtual price equal to or lower than the given value is not included within the predetermined range.

(10) In the information storage medium, evaluation information that can be updated by another application may be stored in a memory and linked to the virtual event area; and the virtual price calculation section may calculate the virtual price of the virtual event area based on the evaluation information.

(11) In the information storage medium, the parameter calculation section may increase virtual sales of the virtual event area acquired by a user until an upper-limit value that has been set according to a predetermined condition has been reached; and the parameter calculation section may include a virtual money collection section that allows a user to receive money from the virtual sales and resets the virtual sales when a money collection request for the virtual event area acquired by the user has been received from the mobile terminal.

(12) In the information storage medium, the game-providing program may cause the computer to further function as:

an exclusive control section that performs an exclusive control process so that a user cannot acquire a virtual event area that has been acquired by another user who maintains a friendship with the user.

For example, the exclusive control section may perform the exclusive control process so that a user who has subsequently issued an acquisition request cannot acquire the virtual event area.

(13) In the information storage medium, wherein, when a user maintains a friendship with another user who has acquired the virtual event area selected by the virtual event area selection section, the exclusive control section may issue a negotiation request to the other user, and when the exclusive control section has received a negotiation acceptance response from the other user, the exclusive control section may cancel acquisition of the virtual event area by the other user and allow the user to acquire the virtual event area.

(14) According to another embodiment of the invention, there is provided a game-providing system including a server that provides game to a plurality of mobile terminals via a network, the game-providing system comprising:

a virtual event area information storage section that stores virtual event area information including a virtual event area and position information corresponding to the virtual event area;

a virtual event area selection section that selects a virtual event area based on current position information acquired by a mobile terminal among the plurality of mobile terminals, the virtual event area being linked to the position information that indicates a position within a predetermined range from a current position obtained from the current position information;

an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;

a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and a parameter calculation section that calculates at least one of a result value and a game parameter of a user in response to the acquisition request and/or the visit request for the virtual event area, the parameter calculation section changing the result value or the predetermined game parameter of a user for whom the information about the virtual event area is stored as the acquisition information when the visit request for the virtual event area has been received.

The game-providing system may be implemented by one server. The game-providing system may be implemented by a plurality of servers, and the process of the game-providing system may be executed by the plurality of servers by distributed processing.

(15) The game-providing system may further comprise:

a user information storage section that stores user information including friend information that specifies a user who maintains a friendship with another user, wherein the visit processing section causes a memory to store identification information about a user who has issued the visit request for the virtual event area as visit record information linked to the virtual event area when the visit request has been received; and wherein the parameter calculation section determines whether or not the user who has issued the visit request for the virtual event area maintains a friendship with the user for whom the information about the virtual event area is stored as the acquisition information based on the visit record information and the friend information, and advantageously changes a result value or a predetemined game parameter of the user for whom the information about the virtual event area is stored as the acquisition information when it has been determined that the users are friends, as compared with a case where the users are not friends.

(16) In the game-providing system, the visit processing section may acquire information about a user who maintains a friendship with another user based on the friend information, and may provide the other user with information about the virtual event area stored as the acquisition information about the user as the visit candidate information via a mobile terminal among the plurality of mobile terminals.

(17) In the game-providing system, the parameter calculation section may change a result value or a predetermined game parameter of a user who has issued the visit request for the virtual event area when the visit request has been received.

(18) The game-providing system may further comprise:

a cooperator registration section that provides a user with information about another user who maintains a friendship with the user and is registered as a game user, as cooperator candidate information via a mobile terminal among the plurality of mobile terminals, and registers the other user as a cooperator of the user when a cooperation request that designates the other user has been received from the mobile terminal, wherein the parameter calculation section changes at least one of a result value and a game parameter of the user when a cooperator has been registered for the user.

(19) In the game-providing system, the acquisition section may decide whether or not a user who has acquired the selected virtual event area has a friend among other users who have issued acquisition requests for the virtual event area based on the friend information and the acquisition information, and may determine a priority for providing the other users with the information via the users' mobile terminals based on the decision result.

(20) The game-providing system may further comprise:

a land price information storage section that stores land price information corresponding to the position information; and a virtual price calculation section that calculates a virtual price of the virtual event area based on the land price information, wherein the acquisition section provides a user with information including the virtual price of the selected virtual event area via a mobile terminal among the plurality of mobile terminals.

(21) In the game-providing system, the parameter calculation section may calculate at least one of a result value and a game parameter of a user based on the virtual price of the virtual event area stored as the acquisition information about the user.

(22) In the game-providing system, the acquisition section may select a virtual event area that is positioned within a predetermined range from the current position and has a virtual price equal to or lower than a given value based on the acquired current position information and the position information linked to the virtual event area, and may provide information about the virtual event area as the acquisition candidate information, and the acquisition section may select a virtual event area that has a virtual price equal to or lower than the given value and may provide information about the virtual event area as the acquisition candidate information while enlarging the predetermined range stepwise when the virtual event area that has a virtual price equal to or lower than the given value is not included within the predetermined range.

(23) In the game-providing system, evaluation information that can be updated by another application may be stored in a memory and linked to the virtual event area; and the virtual price calculation section may calculate the virtual price of the virtual event area based on the evaluation information.

(24) In the game-providing system, the parameter calculation section may increase virtual sales of the virtual event area acquired by a user until an upper-limit value that has been set according to a predetermined condition has been reached; and the parameter calculation section may include a virtual money collection section that allows a user to receive money from the virtual sales and resets the virtual sales when a money collection request for the virtual event area acquired by the user has been received from the mobile terminal.

(25) The game-providing system may further comprise:

an exclusive control section that performs an exclusive control process so that a user cannot acquire a virtual event area that has been acquired by another user who maintains a friendship with the user.

(26) In the game-providing system, when a user maintains a friendship with another user who has acquired the virtual event area selected by the virtual event area selection section, the exclusive control section may issue a negotiation request to the other user, and when the exclusive control section has received a negotiation acceptance response from the other user, the exclusive control section may cancel acquisition of the virtual event area by the other user and allow the user to acquire the virtual event area.

Exemplary embodiments of the invention are described below. Note that the following embodiments do not unduly limit the scope of the invention as stated in the claims. Note also that all of the elements described below should not necessarily be taken as essential elements of the invention.

1. Game-Providing System

FIG. 1 is a diagram illustrating a game-providing system according to one embodiment of the invention.

A game-providing system 1 according to one embodiment of the invention includes a server 20, and can connect a plurality of mobile terminals via a network 30. Note that the game-providing system according to one embodiment of the invention does not include a plurality of mobile terminals, but may also include a plurality of mobile terminals.

The server 20 is an information processing device that allows a plurality of users to communicate. The server 20 may be a server that provides an SNS, or may be a server that provides a given game. The server 20 may be a system that includes a plurality of information processing devices (servers) connected via a network, and performs a distributed process.

The server 20 included in the game-providing system 1 may be a system that has a web (World Wide Web) server function and a mail server function, and includes a web browser that allows a mobile terminal 10 (10A, 10B, 10C, . . . ) to browse a web page.

The mobile terminal 10 is an information processing device that has a current position information acquisition function, such as a mobile phone (including a PHS mobile terminal), a portable (mobile) information terminal (e.g., PDA), a portable game device, a personal digital assistant (PDA), or an electronic book. The mobile terminal 10 can connect to the server 20 via the network 30 (e.g., Internet (WAN), LAN, mobile phone network, packet network, and cable telephone network). The mobile terminal 10 and the server 20 may be connected via a cable communication channel or a wireless communication channel.

The mobile terminal 10 may be connected to the network 30 via a base station (not shown).

At least one base station may be provided corresponding to each communication area (cell) connected to the network 30 and having a radius of several to several tens of kilometers, and may communicate with the mobile terminal 10 via wireless communication.

Figure 2:
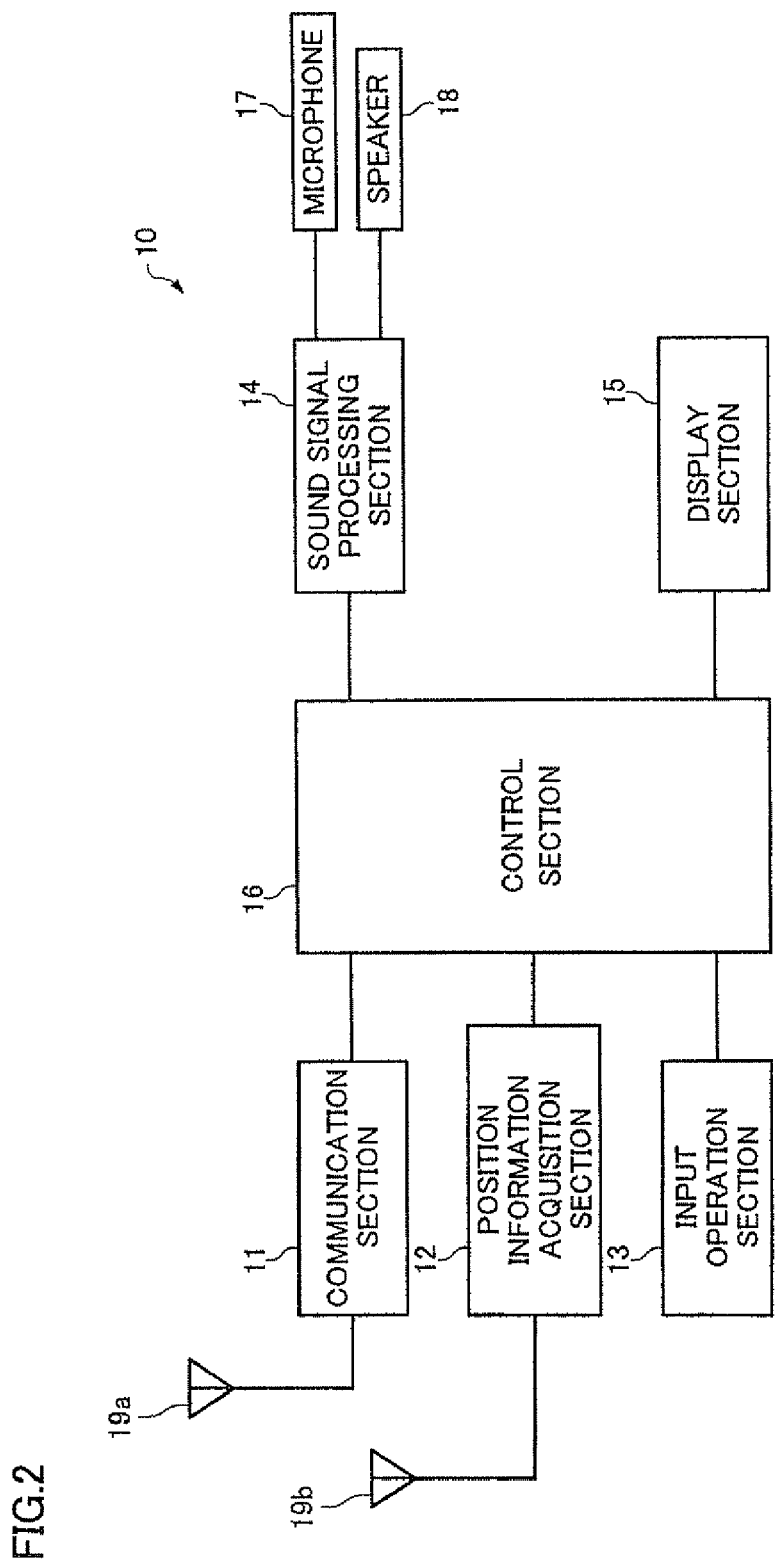
FIG. 2 is a block diagram illustrating a mobile terminal according to one embodiment of the invention.

FIG. 2 illustrates an example of a block diagram of the mobile terminal according to one embodiment of the invention.

The mobile terminal 10 may include a communication section 11 that transmits and receives a radio signal via a radio antenna 19a, and processes a signal, a position information acquisition section 12 (e.g., a GPS receiver section that receives a GPS signal from a GPS satellite (not shown) via a GPS antenna 19*b*), an input operation section 13 that inputs data based on an operation performed by the user, a sound signal processing section 14 that processes a sound signal input from a microphone 17 and a sound signal output from a speaker 18, a display section 15 that displays information, and a control section 16 that controls each section.

The position information acquisition section 12 need not necessarily receive a radio wave from a GPS satellite to acquire the position information, but may acquire (specify) the current position from a mobile phone or PHS base station.

The mobile terminal 10 includes a web browser that allows the user to browse a web page. The user can browse a web page provided by the server 20 and displayed on the display section 15.

The control section 16 included in the mobile terminal 10 controls a screen transition (described later), causes the display section 15 to display a screen (web page) described later, and causes the input operation section 13 to receive an operation input by the user. The communication section 11 transmits and receives data to and from the server via a network.

Figure 3:
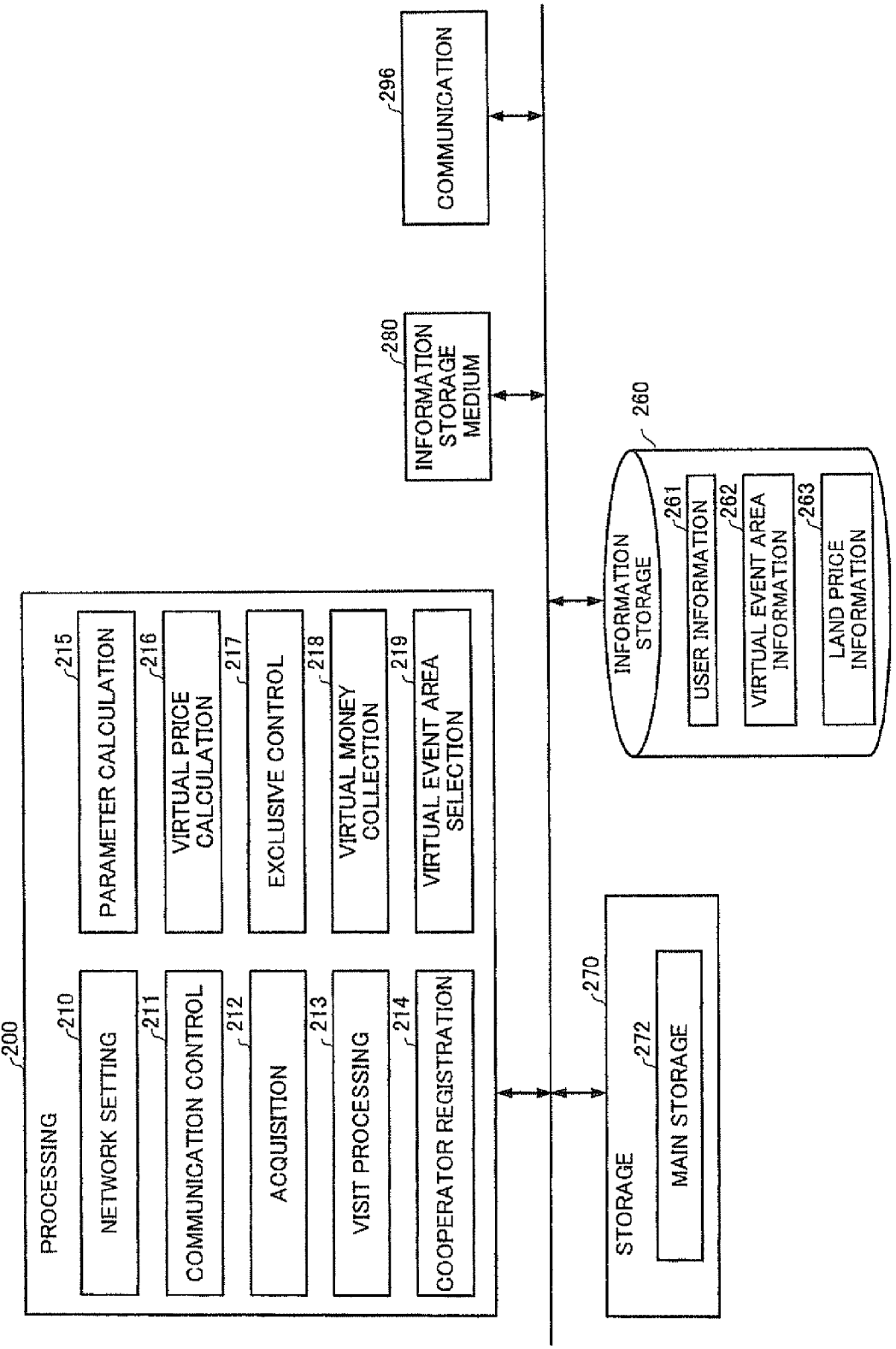
FIG. 3 is a functional block diagram of a server according to one embodiment of the invention.

FIG. 3 illustrates an example of a functional block diagram of the server 20 according to this embodiment.

Note that the server 20 may have a configuration in which some of the elements (sections) illustrated in FIG. 3 are omitted.

A storage section 270 serves as a work area for a processing section 200, a communication section 296, and the like. The function of the storage section 270 may be implemented by a RAM (VRAM) or the like.

An information storage section (e.g., database) 260 stores user information 261 about each of a plurality of users who access (participate in) the game-providing system, and functions as a user information database.

The information storage section (e.g., database) 260 also stores virtual event area information 262, and functions as a virtual event area information database. The virtual event area information 262 may include evaluation information that is linked to a virtual event area and can be updated by an application.

The information storage section (e.g., database) 260 also stores land price information 263, and functions as a land price information database.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like. The processing section 200 performs various processes according to one embodiment of the invention based on a program (data) stored in the information storage medium 280. Specifically, a program that causes a computer to function as each section according to one embodiment of the invention (i.e., a program that causes a computer to execute the process of each section) is stored in the information storage medium 280.

The communication section 296 performs a control process for communicating with the outside (e.g., mobile terminal, another server, or another game-providing system). The function of the communication section 296 may be implemented by hardware such as a processor or a communication ASIC, a program, or the like.

The processing section 200 (processor) performs a given process based on a program stored in the information storage medium 280, and the like. Specifically, the processing section 200 provides a given service in response to a request from the mobile terminal.

The processing section 200 performs various processes using a main storage section 272 included in the storage section 270 as a work area. The function of the processing section 200 may be implemented by hardware such as a processor (e.g., CPU or DSP) or an ASIC (e.g., gate array), or a program.

The processing section 200 included in the server 20 includes a network setting section 210, a communication control section 211, an acquisition section 212, a visit processing section 213, a cooperator registration section 214, a parameter calculation section 215, a virtual price calculation section 216, an exclusive control processing section 217, a virtual sales collection section 218, and a virtual event area selection section 219. Note that the processing section 200 may have a configuration in which some of these sections are omitted.

The network setting section 210 acquires user identification information, mobile terminal identification information, and the like from the mobile terminal 10, and stores user information 261 in the information storage section (e.g., database) 260, the user information 261 being linked to the user identification information and the mobile terminal identification information. The network setting section 210 refers to, updates (changes), and deletes the user information about the user based on the user identification information and the mobile terminal identification information.

The communication control section 211 exchanges data with the mobile terminal 10 via a network. Specifically, the communication control section 211 transmits information (e.g., user name) about another user that is linked to the user to the mobile terminal of the user based on a request from the mobile terminal.

The virtual event area selection section 219 selects a virtual event area linked to position information that indicates a position within a predetermined range from the acquired current position based on the current position information acquired by the mobile terminal. The acquisition section 212 provides the user with information about the virtual event area selected by the virtual event area selection section 219 as acquisition candidate information, and stores the virtual event area as acquisition information about the user when an acquisition request for the virtual event area included in the acquisition candidate information has been received from the mobile terminal, the virtual event area being linked to the user identification information. The visit processing section 213 provides the user with information about the virtual event area selected by the virtual event area selection section 219 as visit candidate information via the mobile terminal, and receives a visit request for the virtual event area included in the visit candidate information from the mobile terminal. The parameter calculation section 215 calculates at least one of a result value and a game parameter of the user corresponding to the acquisition request and/or the visit request for the virtual event area, and changes the result value or the predetermined game parameter of the user for whom a virtual event area is stored as the acquisition information when the visit request for the virtual event area has been received.

The visit processing section 213 may store identification information about a user who has issued a visit request for a virtual event area as visit record information linked to the virtual event area when the visit request has been received, and the parameter calculation section 215 may determine whether or not the user who has issued the visit request for the virtual event area maintains a friendship with the user for whom the virtual event area is stored as the acquisition information based on the visit record information and friend information that specifies another user who maintains a friendship with the user, and may advantageously change the result value or the predetermined game parameter of the user for whom the virtual event area is stored as the acquisition information when it has been determined that the user who has issued the visit request for the virtual event area maintains a friendship with the user, as compared with a case where the user who has issued the visit request for the virtual event area does not maintain a friendship with the user.

The visit processing section 213 may determine another user who maintains a friendship with the user based on the friend information, and may provide the user with the virtual event area stored as the acquisition information about the other user as the visit candidate information via the mobile terminal.

The parameter calculation section 215 may change the result value or the predetermined game parameter of the user who has issued the visit request for the virtual event when the visit request has been received.

The cooperator registration section 214 may provide the user with information about another user who maintains a friendship with user and is registered as a game user as cooperator candidate information via the mobile terminal, and may register another user as a cooperator of the user when a cooperation request that designates the other user has been received from the mobile terminal, and the parameter calculation section 215 may change at least one of the result value and the game parameter of the user when a cooperator has been registered for the user.

The acquisition section 212 may determine whether or not a user who has acquired the selected virtual event area maintains a friendship with the user based on the friend information and the acquisition information, and may determine a priority when providing the information with the user via the mobile terminal based on the determination result.

The virtual price calculation section 216 may calculate a virtual price of the virtual event area based on land price information corresponding to the position information, and the acquisition section 212 may provide the user with information including the virtual price of the selected virtual event area via the mobile terminal.

The parameter calculation section 215 may calculate at least one of the result value and the game parameter of the user based on the virtual price of the virtual event area stored as the acquisition information about the user.

The acquisition section 212 may select a virtual event area that is positioned within a predetermined range from the current position and has a virtual price equal to or lower than a given value as the acquisition candidate information based on the acquired current position information and the position information linked to the virtual event area, and may select a virtual event area that has a virtual price equal to or lower than the given value as the acquisition candidate information while enlarging the predetermined range stepwise when the acquisition candidate is not included within the predetermined range.

The virtual price calculation section 216 may calculate the virtual price of the virtual event area based on evaluation information linked to the virtual event area.

The parameter calculation section 215 may increase virtual sales of the virtual event area acquired by the user until an upper-limit value that has been set according to a predetermined condition has been reached, and may include a virtual money collection section that allows the user to receive money from the virtual sales, and resets the virtual sales when a money collection request for the virtual event area acquired by the user has been received from the mobile terminal.

The exclusive control section 217 performs an exclusive control process so that the user cannot acquire a virtual event area that has been acquired by another user who maintains a friendship with the user.

The exclusive control section 217 may issue a negotiation request to another user who maintains a friendship with the user and has acquired the virtual event area selected by the virtual event area selection section, and cancels acquisition of the virtual event area by the other user and allows the user to acquire the virtual event area when a negotiation acceptance response has been received from the other user.

2. Database

Figure 4:
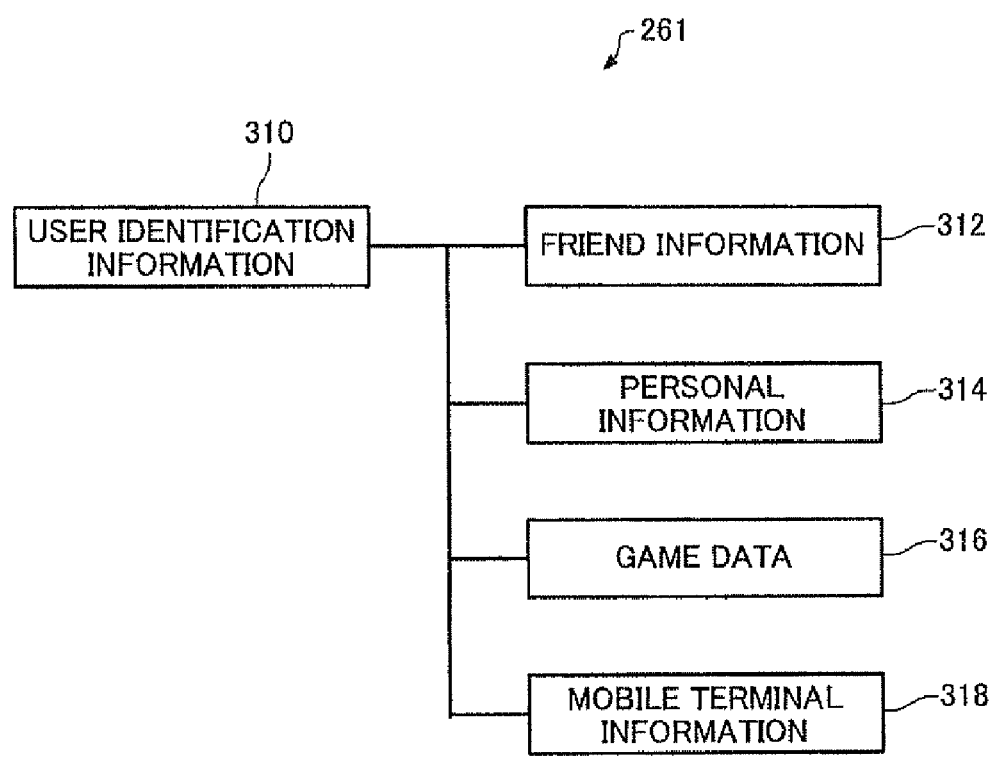
FIG. 4 is a diagram illustrating user information.

FIG. 4 is a diagram illustrating the user information.

The user information 261 may be stored in a database managed by the server included in the game-providing system, or may be stored in a database managed by another system. The user information 261 may be configured so that the user information 261 can be referred to and updated by another application (e.g., an SNS service that differs from the service according to one embodiment of the invention) or the like.

The user information 261 may be configured so that the user information 261 is updated by referring to data of another application utilizing an application programming interface (API) of the other application.

The user information 261 is configured as a set of user information about a plurality of users. The user information 261 includes user identification information 310 about each user, and user information about each user that is linked to the user identification information 310. The user identification information 310 may be an ID assigned to each user, an instrument ID assigned to the instrument of the mobile terminal, or a game ID registered by the user.

The user information 261 may include friend information 312 about a friend of each user. A list of the user identification information about another user who maintains a friendship with the user may be stored as the friend information 312. The friend information may be updated by an application of an SNS service, for example.

The user information 261 may include personal information 314 about each user. Information about the name, nickname, birth date, blood type, and the like of the user may be linked to the user identification information 310 about each user as the personal information 314. The personal information 314 may be information registered by the user through a SNS service, for example.

The user information 261 may include game data 316 about each user that is generated or used by the game-providing system. A game parameter, acquisition information, and the like may be linked to the user identification information 310 about each user as the game data 316. The game data 316 about each user may include data illustrated in FIG. 8, for example.

The user information 261 may include mobile terminal information 318 about each user. Mobile terminal identification information (identification number) about the mobile terminal 10 used to access the mobile terminal 10, and destination information (e.g., IP address, e-mail address, port number, MAC address, or telephone number) about the mobile terminal 10 may be linked to the user identification information 310 about each user as the mobile terminal information 318.

FIG. 5 is a diagram illustrating the virtual event area information.

An example in which the virtual event area is a store in the game is described below. Note that the virtual event area is not limited to a store, but may be a real estate (e.g., land or house) or a natural object (e.g., ponds or tree).

The store information (i.e., virtual event area information) 262 may be stored in a database managed by the server included in the game-providing system, or may be stored in a database managed by another system. The store information 262 may be configured so that the store information 262 can be referred to and updated by another application (e.g., navigation service) or the like.

The store information 262 is configured as a set of store information about a plurality of virtual stores. The store information 262 includes store identification information 320 about each store, and store information about each store that is linked to the store identification information 320.

The store information 262 includes position information 322. The position information 322 is position information in the real world on the assumption that the store is present in the real world, and may be information about the latitude (in) and the longitude (ki) in the real world, for example. Note that position information data corresponding to a store present in the real world used by another application or the like may be used as the position information 322.

The store information 262 may include address information 324 about the store. The address information 324 may be information about the administrative division (an), the district municipality (bn), the house number (cn), and the like. The address may be used when referring to the land price information database used to calculate the store price. In this case, it is preferable that the store information 262 include key information used when searching land price data.

The store information 262 may include attribute information 326. The attribute information 326 may include information about a store type (category information (e.g., eating house, bookstore, or station)) or the like. The attribute information may be used to calculate the store price.

The store information 262 may include word-of-mouth page link information 328 about the store.

The word-of-mouth page link information 328 is a link address of a page where that includes word-of-mouth information about the store in the game or an actual store corresponding to the store in the game. The word-of-mouth information includes evaluation information that can be updated by another application. The store value (i.e., the assessed value of the store when selling the store) may be calculated using the evaluation information.

The store information 262 may include game data 330 about each store that is generated or used by the game-providing system. The game data 330 about each store may include data illustrated in FIG. 9, for example.

Figure 6:
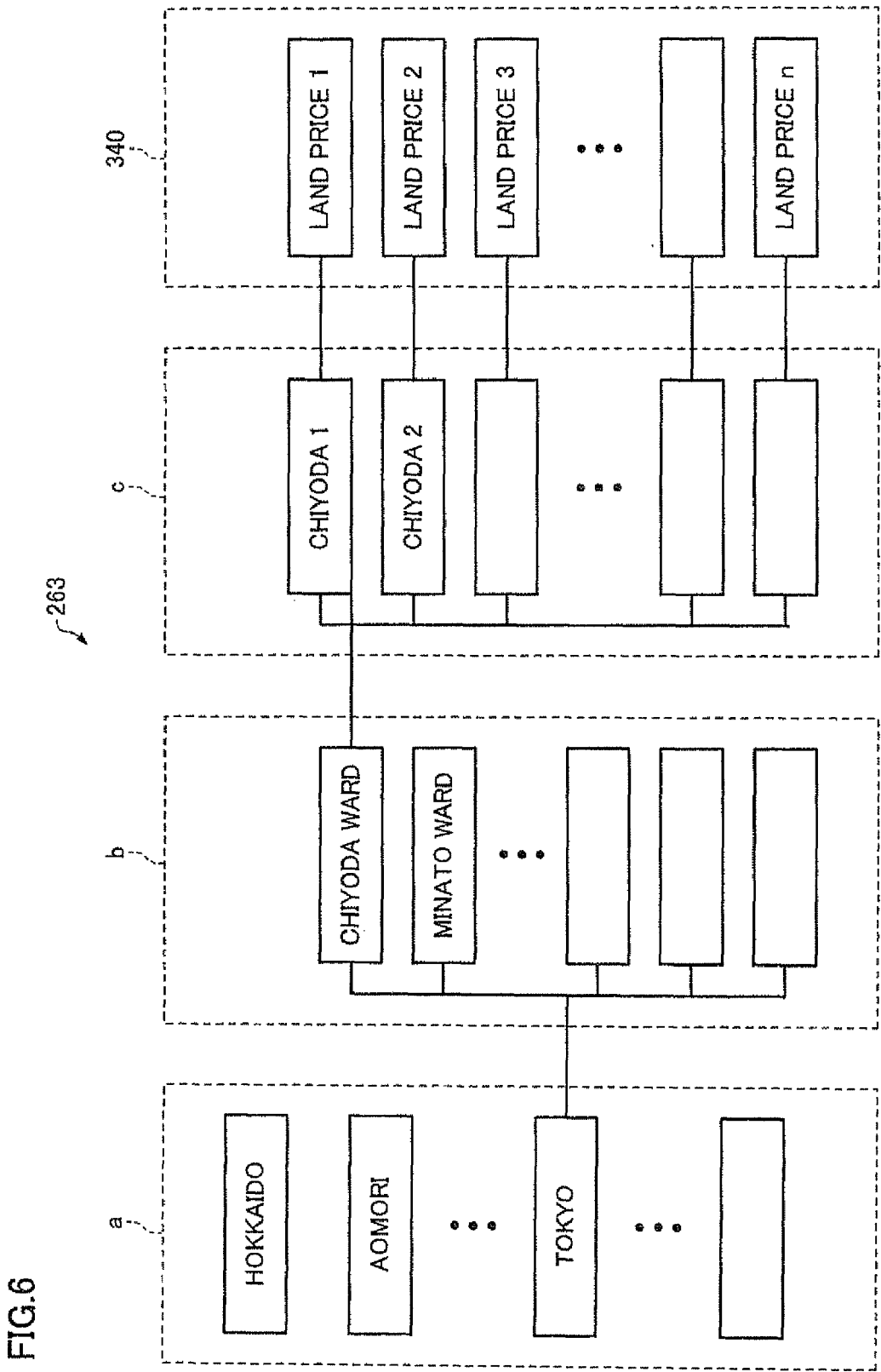
FIG. 6 is a diagram illustrating land price information.

FIG. 6 is a diagram illustrating the land price information.

The land price information 263 may be stored in a database managed by the server included in the game-providing system, or may be stored in a database managed by another system. The land price information 263 may be configured so that the land price information 263 can be referred to and updated by another application (e.g., official land price service) or the like. The land price information 263 may be configured so that the land price information 263 is updated by referring to data of another application utilizing an API of the other application.

The land price information 263 may be configured so that key information (address) (e.g., administrative division a, district municipality b, and house number c) is connected to the land price corresponding to the address using a predetermined data structure (e.g., tree structure), and the land price 340 corresponding to the address can be searched.

3. Process 3-1. Outline of Game

A game according to one embodiment of the invention is described below taking a game provided by an SNS as an example.

Figure 7:
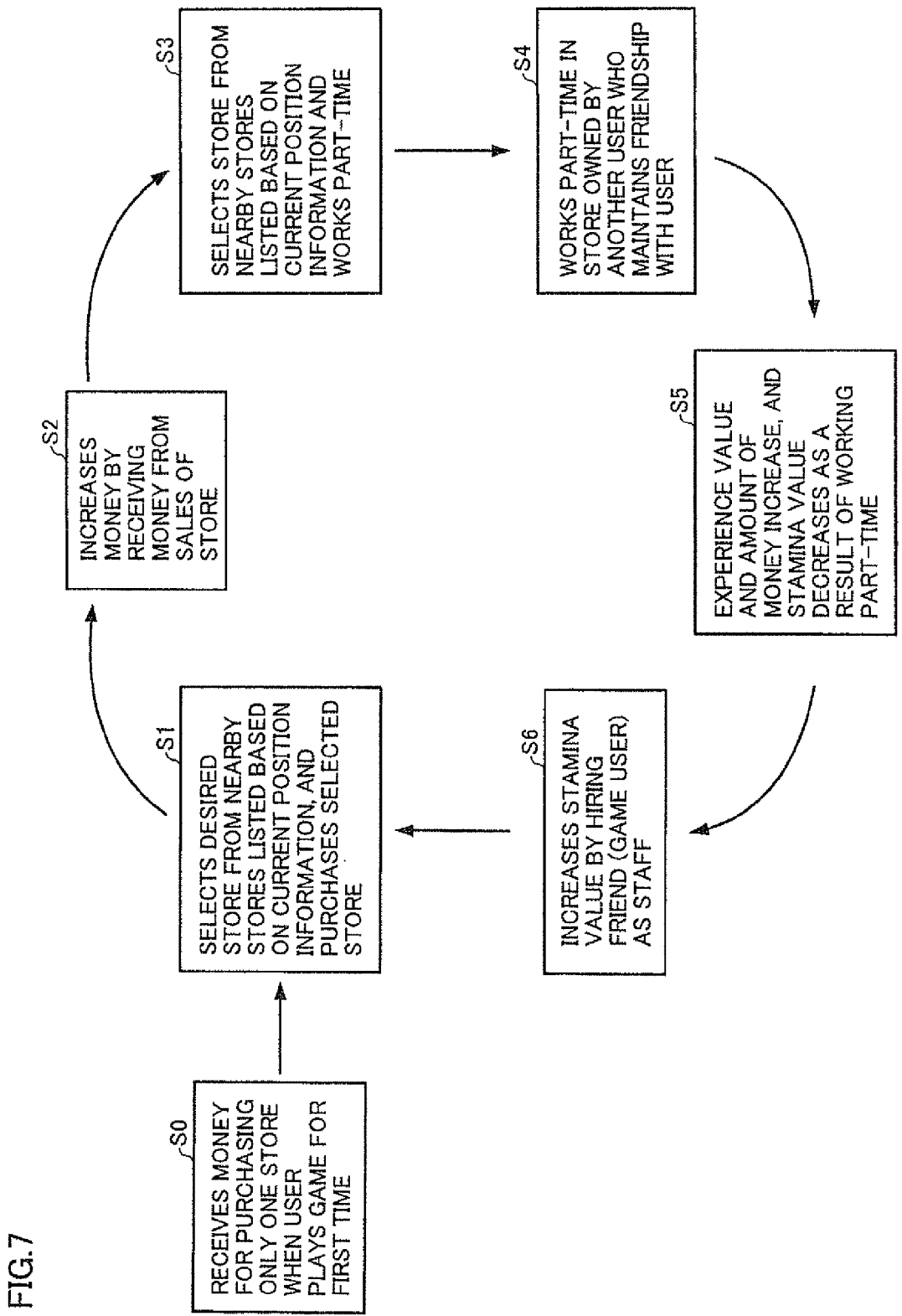
FIG. 7 is a diagram illustrating an example of a game cycle.

FIG. 7 is a diagram illustrating an example of a game cycle of the game according to one embodiment of the invention.

The user receives money (i.e., parameter) for purchasing only one store when the user plays the game for the first time (S0), and purchases (acquires) a store. The user can select the desired store from nearby stores listed based on the current position information, and purchase (acquire) the selected store (S1). The amount of money possessed by the user decreases as a result of purchasing the store. However, since the sales (i.e., parameter) of the store increase based on a predetermined algorithm, the user can increase his money by receiving money from the sales of the store (S2).

The user can work part-time in (i.e., visit) another store (S3). The user can select a store where the user will work part-time from nearby stores listed based on the current position information. The user can work part-time in a store owned by another user who maintains a friendship with the user irrespective of the current position (S4). An experience value (i.e., parameter) of the user and the amount of money possessed by the user increase, and a stamina value (i.e., parameter) of the user decreases as a result of working part-time (S5).

When another user who maintains a friendship with the user has worked part-time in (i.e., visited) the store owned by the user, the sales of the store may be quickly increased (i.e., the result value of the user or a predetermined game parameter may be changed).

The user can increase the stamina value by hiring his friend (game user) as staff (S6).

The user enjoys the game by purchasing a nearby store (i.e., virtual event area (virtual store having the position information that indicates a position near the current position)) based on the current position information about the mobile terminal possessed by the user, and receiving money from the sales of the store, or working part-time in (i.e., visiting) another store to increase the total assets or the number of stores owned by the user.

3-2. Game Data

Figure 8:
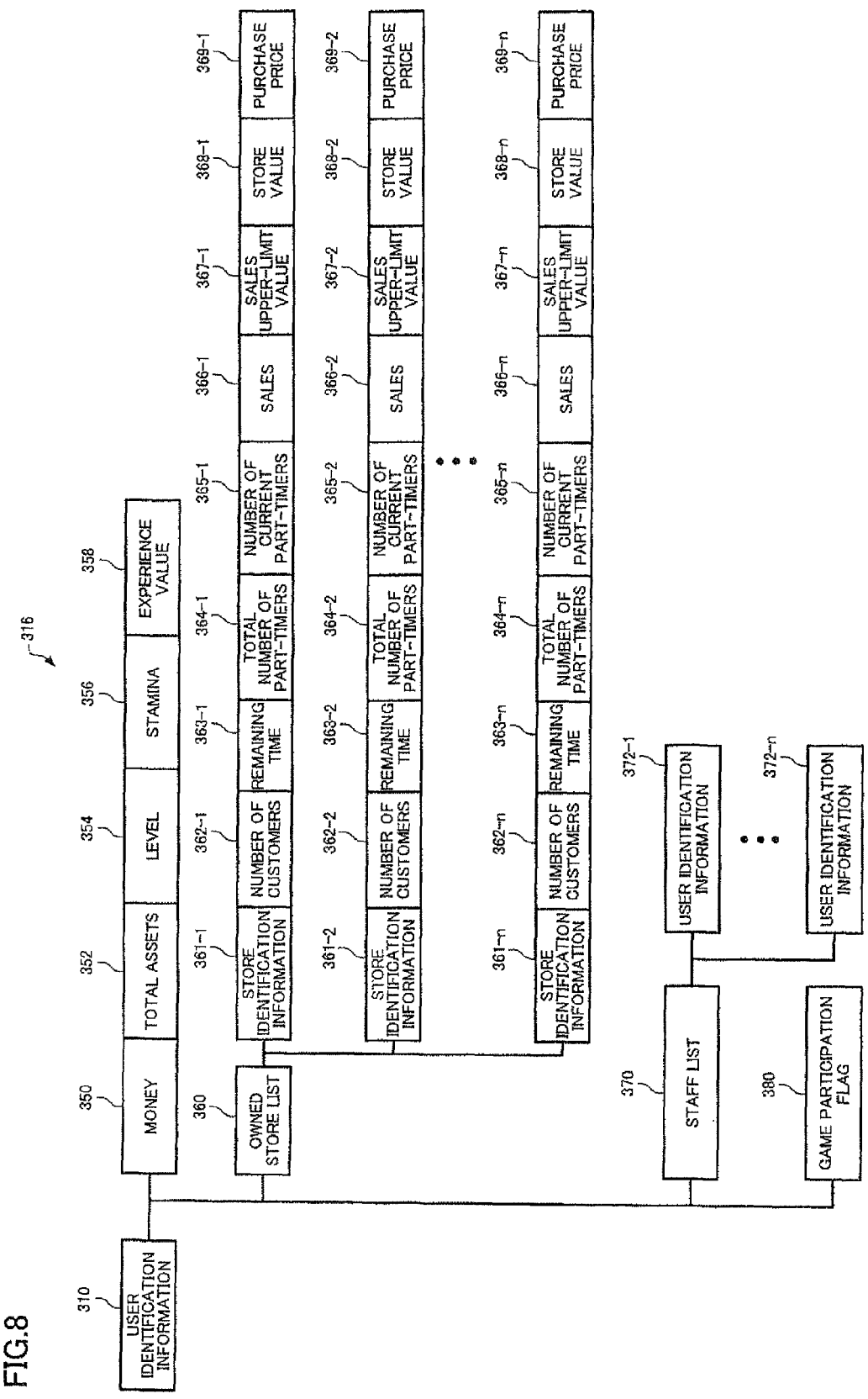
FIG. 8 is a diagram illustrating game data about a user.

FIG. 8 is a diagram illustrating the game data about the user.

The game data about each user is linked to (stored corresponding to) the user identification information 310 about each user. The game data 316 about each user may be stored in the user information database that can be referred to from another application as part of the user information illustrated in FIG. 4, or a user data table specific to the game may be created. The game data 316 may be configured so that the game data 316 is updated by referring to data of another application utilizing an API of the other application.

The game data 316 may be configured so that a parameter (e.g., money 350, total assets 352, level 354, stamina 356, and experience value 258) that is set/updated during the game is linked to (stored corresponding to) the user identification information 310 about each user.

The money 350 is the amount of cash possessed by the user. The money 350 decreases by the purchase price when the user has purchased a store, and increases by the sale price (the sale price is not necessarily the same as the purchase price since the sale price is determined based on the store value at the time of sale) increases when the user has sold the store. When the user has worked part-time, the money 350 increases by the reward for the part-time job.

The total assets 352 refer to a parameter that indicates the sum of the money 350 and the current price of the store (the current price of the store is not necessarily the same as the purchase price, and may change depending on the game operation performed by the user), and may be a game result used to calculate the ranking.

The level 354 is a parameter that increases as the experience value increases. The number of stores that can be purchased by the user may be limited based on the level 354.

The stamina 356 is a parameter that decreases due to a part-time job or the like, but increases with the passage of time. The stamina 356 may be increased when the user has hired staff.

The experience value 358 is a parameter that increases when the user has worked part-time.

The game data 316 about each user may be configured so that an owned store list 360 (i.e., information about the store purchased by each user) is linked to (stored corresponding to) the user identification information 310 about each user. The owned store list 360 may include a parameter (e.g., store identification information (361-1, 361-2, . . . , and 361-n), number of customers (362-1, 362-2, . . . , and 362-n), remaining time (363-1, 363-2, . . . , and 363-n), total number of part-timers (364-1, 364-2, . . . , and 364-n), number of current part-timers (365-1, 365-2, . . . , and 365-n), sales (366-1, 366-2, . . . , and 366-n), sales upper-limit value (367-1, 367-2, . . . , and 367-n), store value (368-1, 368-2, and 368-n), and purchase price (369-1, 369-2, and 369-n)) that is set/updated during the game.

In one embodiment of the invention, the sales upper-limit value 367 is set corresponding to each store, and the sales 366 of each store are increased until the sales upper-limit value 367 is reached. The sales 366 are not further increased when the sales upper-limit value 367 has been reached, and the user can receive money from the sales. When the user has received money from the sales, the sales are reset, and then increased with the passage of time until the sales upper-limit value 367 is reached. The sales upper-limit value 367 and the initial value of the remaining time 363 (i.e., the time required for the sales upper-limit value 367 to be reached) may be set based on the purchase price 369 of each store.

In one embodiment of the invention, the number of customers 362 has the same meaning as the sales 366 (i.e., the number of customers is proportional to the sales). Therefore, only one of the number of customers 362 and the sales 366 may be used as the parameter. For example, the number of customers may increased until the maximum number of customers (corresponding to the sales upper-limit value) is reached, and may not be further increased when the maximum number of customers has been reached. The sales and the remaining time may be influenced by a part-time job that has been done by another user in the store.

The total number of part-timers 364 is the total number of part-time job requests designating the store owned by the user and received after the user has owned the store. The number of current part-timers 365 is the number of part-time job requests designating the store owned by the used and received after the user has received money from the sales the last time. The total number of part-timers 364 and the number of current part-timers 365 may be updated in synchronization with update of the number of part-time jobs (370 in FIG. 9) included in the game data about the store.

Note that the information about each store included in the owned store list 360 may initialized when the store has been acquired. Specifically, when the store has been acquired, the identification information 361 and the purchase price 369 of the acquired store are set. The remaining time 363, the sales upper-limit value 367, and the store value 368 may be calculated based on the purchase price, and the remaining items may be set to the initial value.

The game data 316 about each user may be configured so that a staff list 370 of each user is linked to (stored corresponding to) the user identification information 310 about each user. The staff list 370 includes the user identification information about a user (user who maintains a friendship with each user) hired by each user.

The game data 316 about each user may be configured so that a game participation flag 380 of each user is linked to (stored corresponding to) the user identification information 310 about each user. The initial value of the game participation flag may be "OFF", and the game participation flag may be set to "ON" when the user has made a game participation registration or played the game for the first time.

Figure 9:
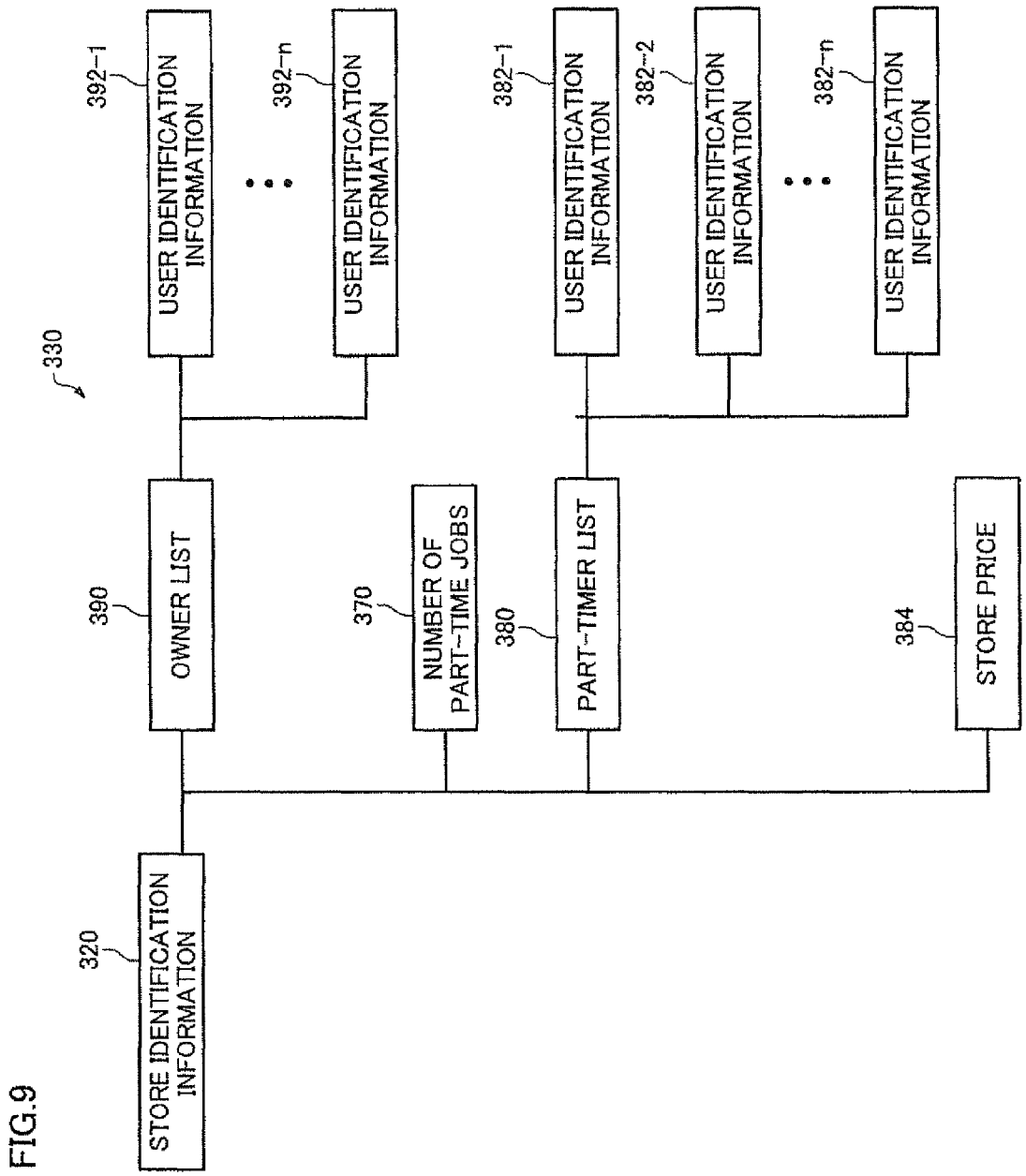
FIG. 9 is a diagram illustrating game data about a store.

FIG. 9 is a diagram illustrating the game data about the store.

The game data about each store (i.e., virtual event area) is linked to (stored corresponding to) the store identification information 320 about each store. The game data 330 about each store may be stored in the store information database that can be referred to from another application as part of the store information (see FIG. 5), or a store data table specific to the game may be created.

The game data 330 about each store may be configured so that the number of part-time jobs 370 (i.e., visit record information) of each store is linked to (stored corresponding to) the store identification information 320 about each store. For example, when a part-time job request designating the store has been received from the mobile terminal of the user (i.e., when the visit processing section has received a visit request designating the virtual event area of the user), a part-time job counter corresponding to the store may be incremented, and the number of part-time jobs 370 corresponding to the store may be updated.

When the part-time job counter corresponding to the store has been incremented, an owner list 390 of each may be referred to, and the total number of part-timers (364 in FIG. 8) and the number of current part-timers (365 in FIG. 8) included in the owned store list of the user information corresponding to the user identification information registered in the owner list may be incremented.

The game data 330 about each store may be configured so that a part-timer list 380 (i.e., visit record information) that is information about a user who has worked part-time in each store is linked to (stored corresponding to) the store identification information 320. The part-timer list 380 may include identification information (382-1, 382-2, . . . , and 382-n) about a user who has worked part-time in the store.

The game data 330 about each store may be configured so that the owner list 390 that is information about the user who has purchased each store is linked to (stored corresponding to) the store identification information 320. The owner list 390 may include identification information (392-1, 392-2, . . . , and 392-n) about a user who has purchased the store.

The game data 330 about each store may be configured so that a store price 384 of each store is linked to (stored corresponding to) the store identification information 320. The store price 384 of each store may be calculated based on the position information (322 in FIG. 5) about each store and the land price information (340 in FIG. 6) corresponding to the position indicated by the position information. The store price 384 may be calculated at a predetermined timing (e.g., when the game service has started, or a predetermined event has occurred). The store price 384 may be calculated when the store has been selected as purchase candidate information (i.e., acquisition candidate information). When the store price of the store has not been set as the game data (e.g., when a default value is set as the game data), the store price may be calculated, and set as the game data.

The store price is calculated based on the land price information. The land price information may be changed (replaced with another land price information) at a predetermined timing. For example, when using the posted land price data as the land price information, the store price can be set while reflecting the land price in the real world (e.g., the store price increases as the location of the store is closer to the central area of Tokyo). The store price can be changed at the same time while reflecting the actual land price by replacing the posted land price data with the posted land price data in another year (e.g., 20 years ago) at a predetermined timing.

The price of a store (e.g., convenience store or family restaurant) having a predetermined attribute (326 in FIG. 5) may be uniformly set, or may be set based on the land price. It is also possible to selectively set the store price in the above manner. A different value may be set corresponding to each attribute, and the store price may be calculated by multiplying the land price (variable) by the value (coefficient) corresponding to the attribute.

3-3. Store Purchase Process

A virtual event area acquisition process according to one embodiment of the invention is described below taking a store purchase process as an example.

Note that the virtual event area acquisition process acquires and manages a virtual event area having the position information that indicates a position near an area visited by the user in the real world (i.e., a virtual event area linked to the position information in the real world) while linking the virtual event area to the user (e.g., a process that links the virtual event area to the user identification information as a thing possessed or acquired by the user).

When the user has performed an operation input using the mobile terminal while watching the display section of the mobile terminal, the mobile terminal and the server perform a game process.

Figure 10:
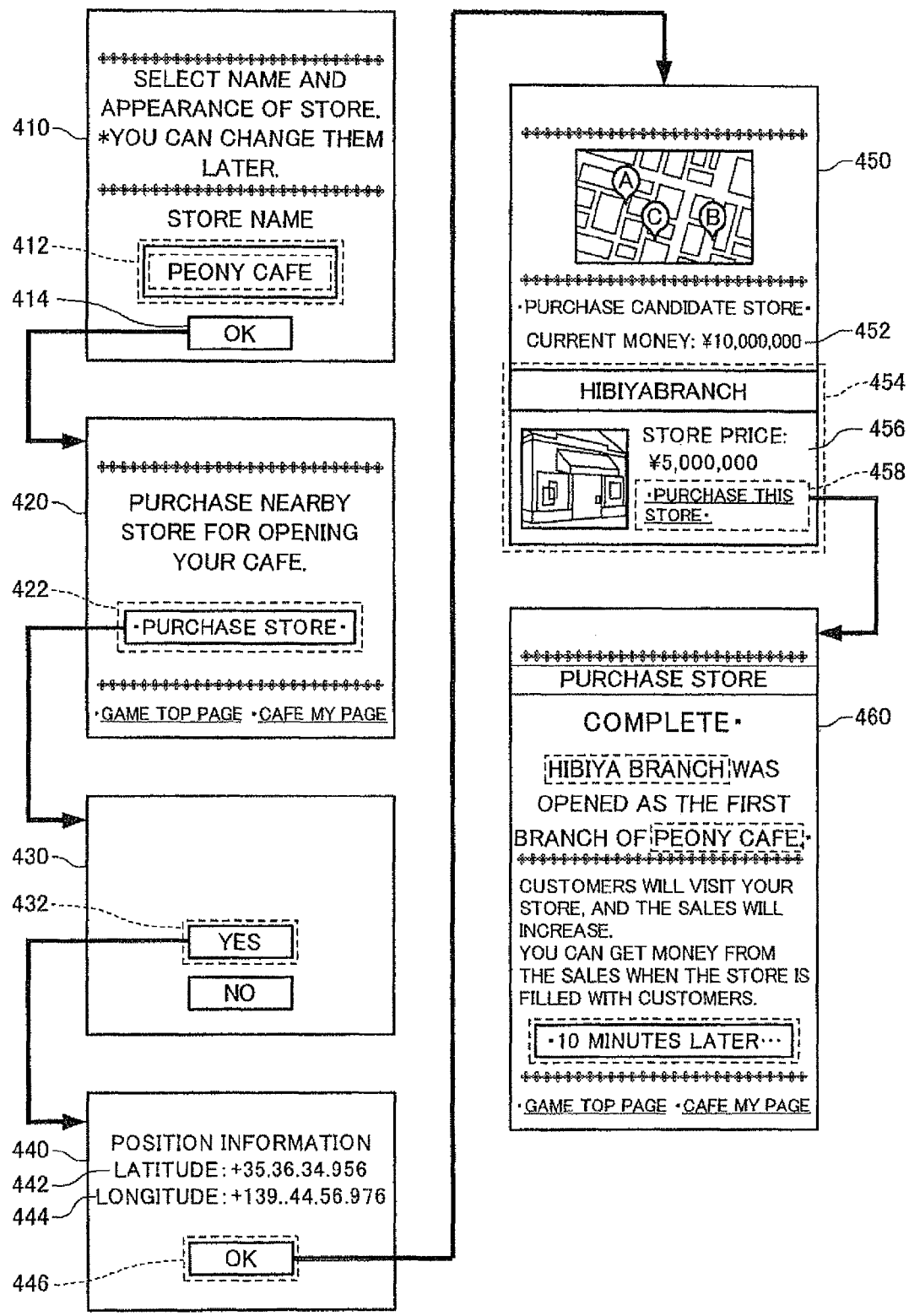
FIG. 10 is a diagram illustrating a screen transition that occurs in a mobile terminal.

FIG. 10 illustrates an example of a screen transition of the mobile terminal during the first store purchase process.

Reference numerals 410 to 460 indicate examples of a screen (web page) displayed on the display section of the mobile terminal. The user purchases the first store when the user has played the game for the first time. When the user has input the desired name of a store to a name field 412 on a store name registration screen (web page) 410, and pressed an OK button 414 on the screen (moved the cursor to the item, and pressed the button), a name "Peony Cafe" is registered as the name of a store acquired by the user, and the store owned by the user will be named "Peony Cafe **".

A (first) store purchase screen 420 (web page) is then displayed. When the user has selected an item "PURCHASE STORE" 422, and performed a select operation, a position information acquisition confirmation screen (web page) 430 is displayed. When the user has selected an item "YES" 432, and performed a select operation, the position information acquisition section of the mobile terminal acquires the current position information (e.g., latitude and longitude) about the mobile terminal. Latitude information 442 and longitude information 444 thus acquired are displayed on a position information confirmation screen (web page) 440. When the user has selected an item "OK" 446, and performed a select operation, a purchase candidate display screen (web page) 450 is displayed.

A current amount of money 452 and purchase candidate store information (store name 454 and store price 456) are displayed on the purchase candidate display screen 450. Only one store that has a price equal to or lower than a predetermined value and is positioned closest to the acquired current position of the mobile terminal may be displayed as the purchase candidate store. The position of the store is determined based on the position information stored in the store information database. Since the position information in the real world is linked to the store, a store that is positioned close to the current position of the user is selected as the purchase candidate store.

Note that the server may select a store, acquire information about the money the user currently has referring to the database, and transmit the information about the selected store and the current amount of money to the mobile terminal. The mobile terminal may display the purchase candidate display screen 450 based on the information received from the server.

When the user has selected an item "purchase this store" 458 displayed on the purchase candidate display screen 450, and performed a select operation (i.e., the user has purchased the store), a store purchase completion screen (web page) 460 is displayed.

When a plurality of stores are positioned within a predetermined range from the current position of the mobile terminal and have a store price equal to or lower than a predetermined value, the user may be allowed to select the desired store. When a store that has a price equal to or lower than a predetermined value is not positioned within a predetermined range from the current position of the mobile terminal, a store having a price equal to or lower than a predetermined value may be selected while enlarging the predetermined range stepwise.

Figure 35:
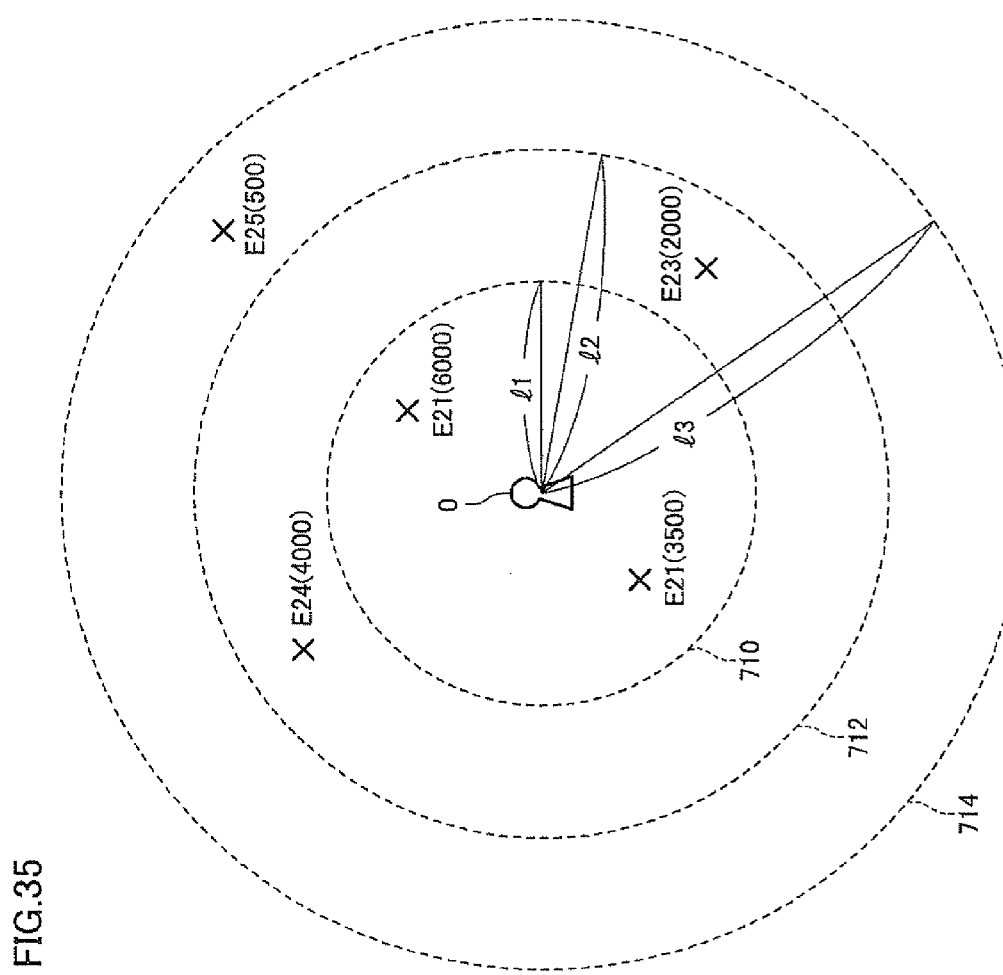
FIG. 35 is a diagram illustrating a search range when a user purchases the first store.

FIG. 35 is a diagram illustrating a search range when the user purchases the first store.

For example, a search range setting values l1, l2, and l3 (l1<l2<l3) may be set, and a search range that is enlarged stepwise may be set based on the search range setting values. Specifically, a store that has the position information that indicates a position within a predetermined range (first range 710) that is a circle formed around a current position O of the user and having a radius of l1 is selected. Whether or not each store thus selected has a price equal to or lower than a predetermined value (e.g., \5,000,000) is then determined. In FIG. 35, only a store E21 having a price of \60,000,000 and a store E22 having a price of \35,000,000 are positioned within the first range (i.e., a store having a price equal to or lower than the predetermined value (\5,000,000) is not positioned within the first range). Therefore, the search range is enlarged to a second range 712 that is a circle formed around the current position O of the user and having a radius of l2. In FIG. 35, only a store E23 having a price of \20,000,000 and a store E24 having a price of \40,000,000 are positioned within the second range in addition to the stores E21 and E22 (i.e., a store having a price equal to or lower than the predetermined value (\5,000,000) is not positioned within the second range). Therefore, the search range is enlarged to a third range 714 that is a circle formed around the current position O of the user and having a radius of l3. Since a store E25 having a price (\5,000,000) equal to or lower than the predetermined value (\5,000,000) is positioned within the third range, the store E35 is selected as the purchase candidate store.

The feature that allows the user to purchase a store that is positioned close to the current position of the user (i.e., purchase a store that is set corresponding to the place actually visited by the user) is an important factor in the game according one embodiment of the invention.

Since the price of a store (excluding an exceptional instance) is set based on the land price, the store price is high in an area where the land price is high, and the number of stores having a price equal to or lower than the initial money possessed by the user is limited. However, the user cannot proceed with the game without purchasing the first store. Therefore, restrictions on the store purchase area may be eased when the user purchases the first store.

Figure 12:
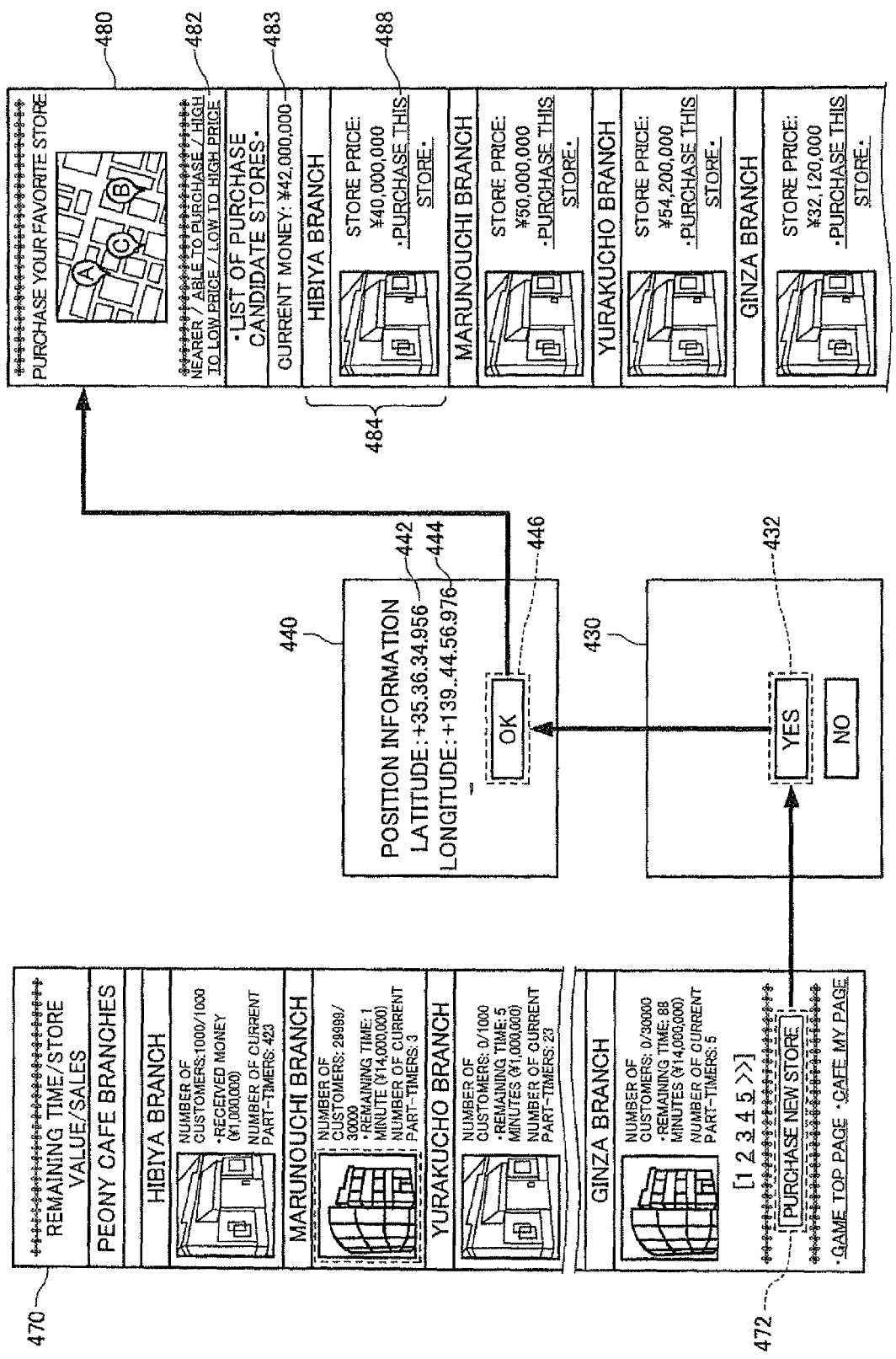
FIG. 12 is a diagram illustrating a screen transition that occurs in a mobile terminal.

FIG. 12 illustrates an example of a screen transition of the mobile terminal during a second and subsequent store purchase process.

Reference numerals 470 to 480 indicate examples of a screen displayed on the display section of the mobile terminal. The user can purchase the second and subsequent stores at a desired timing. When the user has selected an item "PURCHASE NEW STORE" 422 displayed on an owned store list screen (web page) 470, and performed a select operation, the position information acquisition confirmation screen 430 is displayed. When the user has selected the item "YES" 432 displayed on the position information acquisition confirmation screen 430, and performed a select operation, the position information acquisition section of the mobile terminal acquires the current position information (e.g., latitude and longitude) about the mobile terminal. The latitude information 442 and the longitude information 444 thus acquired are displayed on the position information confirmation screen 440. When the user has selected the item "OK" 446, and performed a select operation, a second and subsequent purchase candidate display screen (web page) 480 is displayed.

A display priority 482, current amount of money 483, and purchase candidate store information 484 may be displayed on the second and subsequent purchase candidate display screen 480. The store information 484 includes a store price 486. The purchase candidate store may be a store having the position information (322 in FIG. 5) that indicates a position within a predetermined range from the acquired current position of the mobile terminal. The store that has been purchased (acquired) by the user may be excluded from the purchase candidate store. A store having a price equal to or higher than the money the user has may also be displayed without providing the upper limit of the store price, or only a store having a price equal to or lower than the money the user has may be displayed.

Note that the server may select a purchase candidate store, acquire information about the money the user currently has referring to the database, and transmit the information about the selected store and the current amount of money to the mobile terminal. The mobile terminal may display the purchase candidate display screen 450 based on the information received from the server.

A sort process based on the display priority is described below taking an example in which the upper limit of the store price is not set. When the user has selected one of items "NEARER", "ABLE TO PURCHASE", "HIGH TO LOW PRICE", and "LOW TO HIGH PRICE" displayed as the display priority 482, and performed a select operation, the display order of the store list is changed. When the user has selected the item "NEARER", the distance between the current position of the user and each purchase candidate store is calculated based on the current position information and the position information about each purchase candidate store, and the purchase candidate stores are displayed in ascending order of the distance. When the user has selected the item "ABLE TO PURCHASE", the purchase candidate stores having a price equal to or lower than the money the user has (see 483) are displayed in descending or ascending order of the purchase price.

The user then refers to the store list, selects the desired store having a price within the range of the money the user has, selects an item "PURCHASE THIS STORE" 488, and performs a select operation to purchase the store. When the user has purchased the store, the current amount of money (parameter) is updated with a value obtained by subtracting the store price from the current amount of money.

In the second and subsequent store purchase process, the search area may not be enlarged, differing from the first store purchase process. The search area may be enlarged in the first store purchase process since the user must purchase (acquire) the first store in order to proceed with the game. In the second and subsequent store purchase process, however, when a store that can be purchased by the user is not present within a predetermined range from the current position of the user, the user can move to an area where the land price is low, and search for a store having a lower price. Specifically, since the price of a store (excluding an exceptional instance) is set based on the land price, the price of a store located in an area where the land price is low is lower than that of a store located in an area where the land price is high. Moreover, the user can earn money by working part-time.

FIGS. 11A to 11D are diagrams illustrating a store display priority.

Figure 11B:
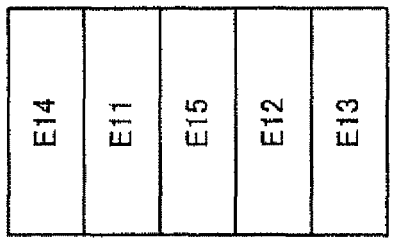
FIGS. 11A to 11D are diagrams illustrating a store display priority.
Figure 11C:
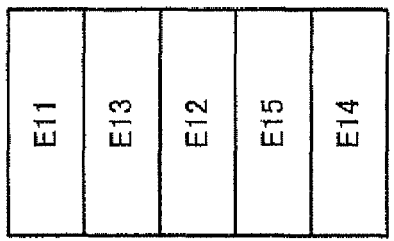
Figure 11D:
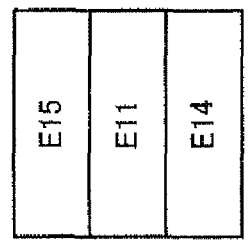
Figure 11A:
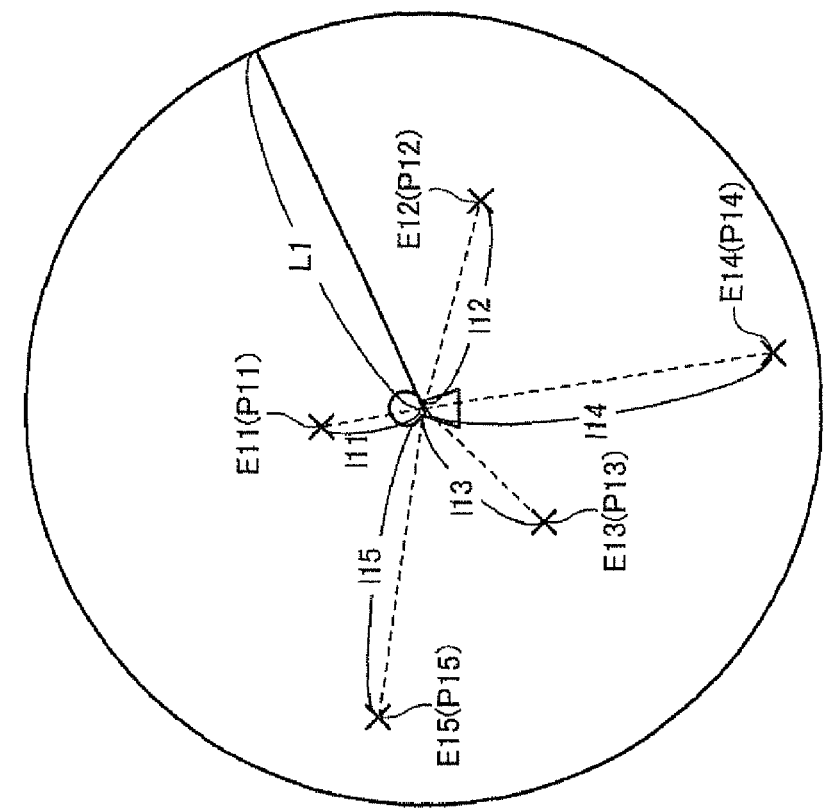

As illustrated in FIG. 11A, a store E11 (distance l11, price P11), a store E12 (distance l12, price P12), a store E13 (distance l13, price P13), a store E14 (distance l14, price P14), and a store E15 (distance l15, price P15) are positioned within a predetermined range that is a circle formed around the current position O of the user and having a radius of L1. The distance between each store and the current position O satisfies the relationship "l11<l13<l12<l15<l14<L1", and the price of each store satisfies the relationship "P14<P11<P15<user's money<P12<P13". In this case, when the user has selected the item "NEARER", the stores positioned within the predetermined range may be displayed in ascending order of the distance (see FIG. 11B). When the user has selected the item "LOW TO HIGH PRICE", the stores positioned within the predetermined range may be displayed in ascending order of the price (see FIG. 11C). When the store information has been displayed in the display order, and the user has selected the item "ABLE TO PURCHASE", three stores that can be purchased by the user may be selected, and the store information may be displayed in descending order of the price (see FIG. 11D).

3-4. Part-Time Job Process (when the User Works Part-Time in Another Store)

A visit process according to one embodiment of the invention is described below taking a part-time job process as an example.

Note that the visit process changes or updates the parameter of a store visited by the user (e.g., a process that links a visit count or the like to the store identification information) when the user has visited a virtual event area having the position information that indicates a position near an area visited by the user in the real world (i.e., a virtual event area linked to the position information in the real world). Note that the visit process may also be applied when the user visits another store as a customer (e.g., shops, eats and drinks, uses various services, amusement facilities, or sports facilities).

Figure 13:
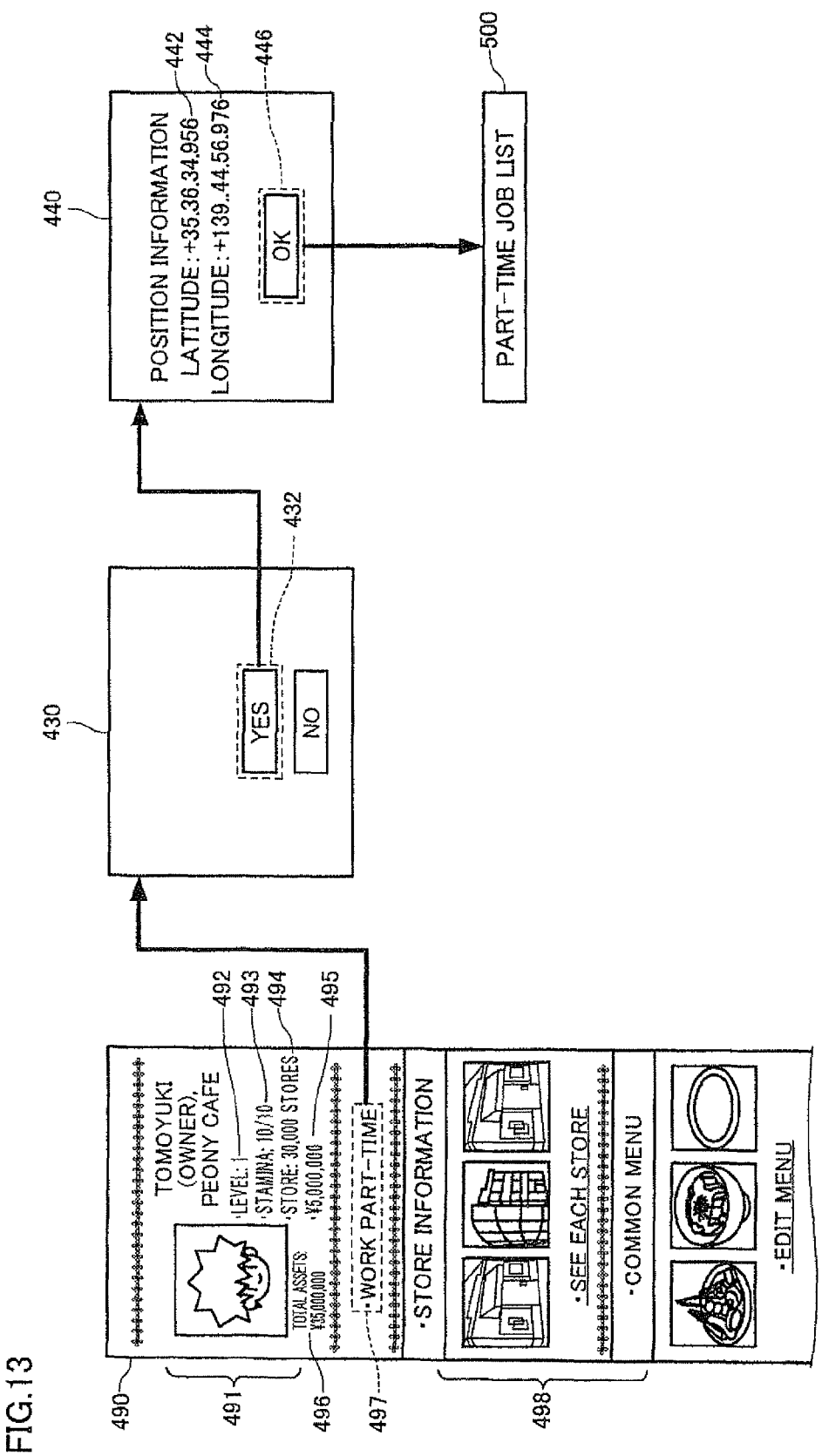
FIG. 13 is a diagram illustrating a screen transition that occurs in a mobile terminal.
Figure 14:
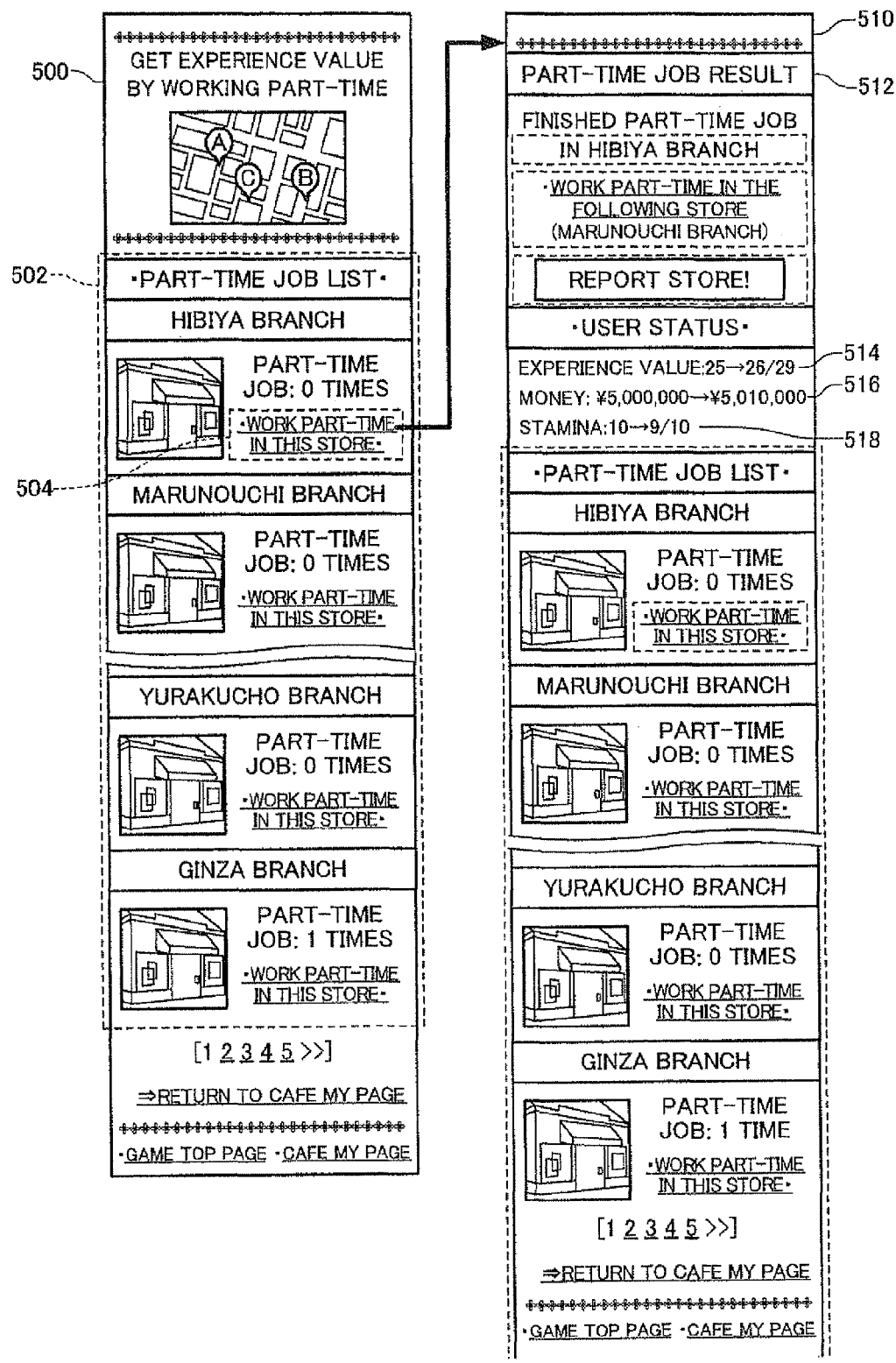
FIG. 14 is a diagram illustrating a screen transition that occurs in a mobile terminal.

FIGS. 13 and 14 illustrate examples of a screen transition that occurs in the mobile terminal during the part-time job process.

Reference numeral 490 in FIG. 13 indicates an example of a game my page screen (web page). Status information 491 about the user, information 498 about the store owned by the user, and the like are displayed on the game my page screen (web page) 490. The current game result (record) and various game parameters (e.g., level 492, stamina 493, store 494, money 495, and total assets 496) may be displayed as the status information 491.

Note that the server may acquire the above information referring to the database, and transmit the acquired information to the mobile terminal. The mobile terminal may display the game my page screen 490 based on the information received from the server.

When the user has selected an item "WORK PART-TIME" 497 displayed on the game my page screen 490, and performed a select operation, the position information acquisition confirmation screen (web page) 430 is displayed. When the user has selected the item "YES" 432 displayed on the position information acquisition confirmation screen 430, and performed a select operation, the position information acquisition section of the mobile terminal acquires the current position information (e.g., latitude and longitude) about the mobile terminal. The latitude information 442 and the longitude information 444 thus acquired are displayed on the position information confirmation screen (web page) 440. When the user has selected the item "OK" 446, and performed a select operation, a part-time job list screen (web page) 500 is displayed.

A candidate store information list 502 that includes candidate stores where the user can work part-time is displayed on the part-time job list screen 500 (see FIG. 14). The candidate stores have the position information (322 in FIG. 5) that indicates a position within a predetermined range from the current position of the mobile terminal (user). The store owned (acquired) by the user is excluded from the candidate stores. The part-time job process may be controlled so that the user cannot work part-time in a store where the user has worked part-time until a predetermined time elapses after the user has worked part-time in the store. The candidate stores may be sorted so that a store owned by another user who maintains a friendship with the user is preferentially displayed.

Note that the server may select candidate stores, and transmit the information about the candidate stores to the mobile terminal. The mobile terminal may display the part-time job list screen 500 based on the information received from the server. The server may select candidate stores referring to the user identification information about a user registered as the friend information 312, and at least the store identification information among the information linked to the user identification information. The friend information 312 may be obtained by selecting given information that is stored as a friend in an external system (e.g., another SNS service), and temporarily storing the selected information in the server. Alternatively, the system may include a search section that searches the name, game ID, user ID, and the like of a friend, and a friend registration section that links the searched user identification information about the friend to the identification information about the user as the friend information.

When the user has selected an item "WORK IN THIS STORE" 504 displayed on the part-time job list screen, and performed a select operation, a part-time job result screen (web page) 510 is displayed.

A part-time job result 512 and status information 514, 516, and 518 about the user who has worked part-time are displayed on the part-time job results screen 510. The parameters (e.g., experience value, reward for part-time job, and stamina) are incremented or decremented (i.e., the experience value and the money increase, and the stamina decreases) when the user has worked part-time, and displayed on the screen (see 514, 516, and 518). Note that the parameters (e.g., experience value, reward for part-time job, and stamina) may be changed corresponding to each store in the same manner as the store value and the purchase price.

Note that the server may calculate the status information 514, 516, and 518 about the user who has worked part-time, and transmit the status information 514, 516, and 518 to the mobile terminal. The mobile terminal may display the part-time job results screen 510 based on the information received from the server.

FIGS. 15A and 1513 are diagrams illustrating the display priority of the candidate stores where the user can work part-time.

When stores E1 (owned by friend), E2 (owned by friend), E3, E4, and E5 are present within a predetermined range that is a circle formed around the current position O of the user and having a radius of L2, the stores E1 and E2 owned by the friend(s) of the user may be preferentially displayed (see FIG. 15B).

The term "friend of the user" refers to a user who has been registered as a friend of the user in an SNS service, for example. The friend of the user is stored in the user information database (see FIG. 4) as the friend information that is linked to the user identification information about the user.

3-5. Part-Time Job Process (when the User Works Part-Time in Store Owned by Friend)

The user can work part-time in a store owned by his friend irrespective of the current position of the user.

Figure 19:
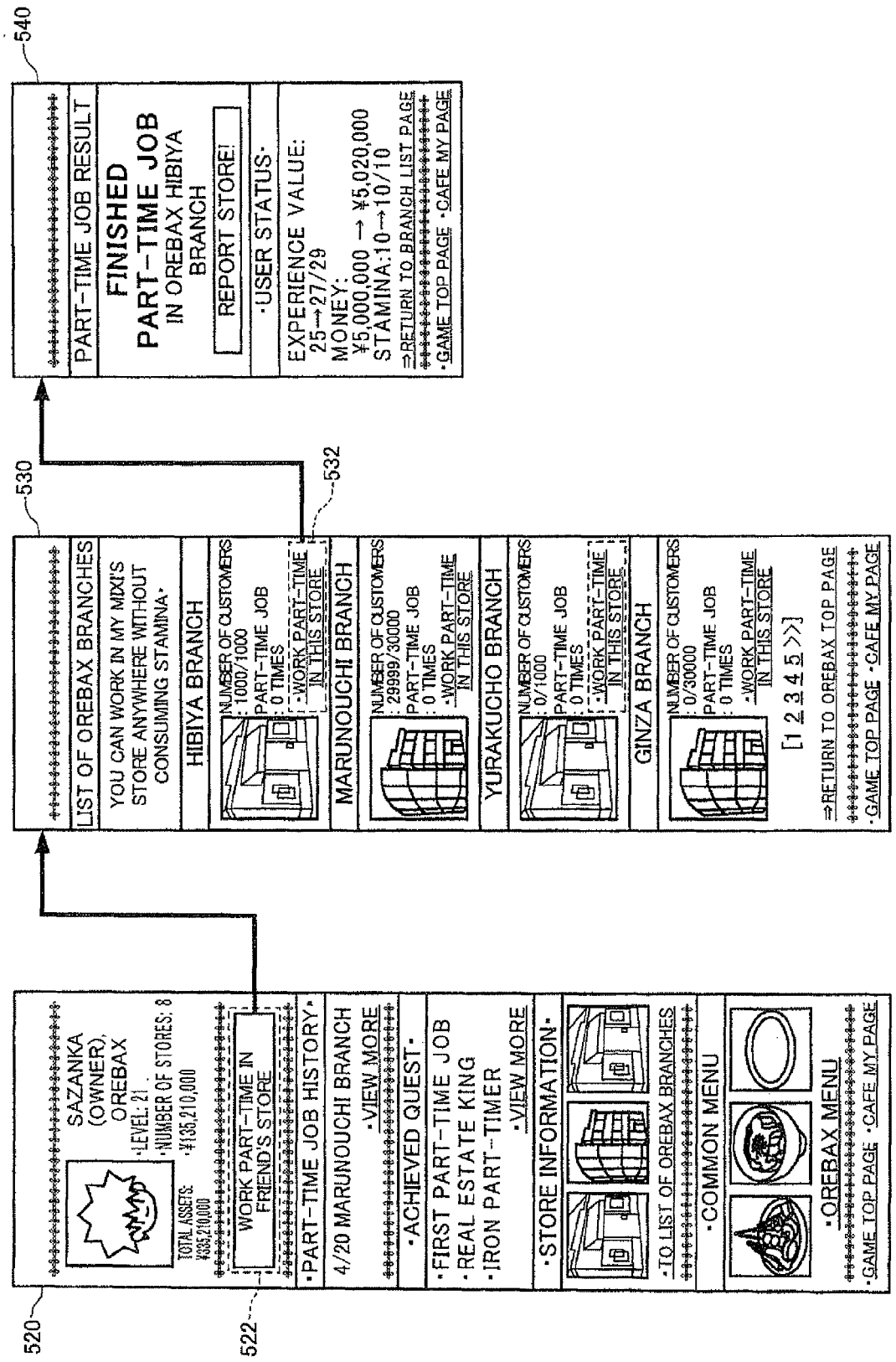
FIG. 19 is a diagram illustrating a screen transition that occurs in a mobile terminal.

FIG. 19 illustrates an example of a screen transition of the mobile terminal during the part-time job process (when the user works part-time in a store owned by his friend).

Reference numeral 520 in FIG. 19 indicates an example of a front page screen (web page) owned by a friend of the user. When the user has accessed the front page screen 520 using the mobile terminal, selected an item "WORK PART-TIME IN FRIEND'S STORE" 522, and performed a select operation, a friend's store list screen (web page) 530 is displayed.

A list of information about the stores owned by the friend (i.e., candidate stores where the user can work part-time) is displayed on the friend's store list screen 530. When the user has selected an item "WORK IN THIS STORE" 532 displayed on the friend's store list screen 530, and performed a select operation, a part-time job result screen (web page) 540 is displayed.

Note that the server may select candidate stores where the user can work part-time, and transmit the information about the candidate stores to the mobile terminal. The mobile terminal may display the friend's store list screen 530 based on the information received from the server.

The part-time working time and the part-time working count may be limited when the user works part-time in a store owned by his friend. This motivates the user to work part-time in a store other than a store owned by his friend.

3-6. Sales Calculation Process

A sales calculation process (i.e., parameter calculation process) according to one embodiment of the invention is described below.

Figure 36:
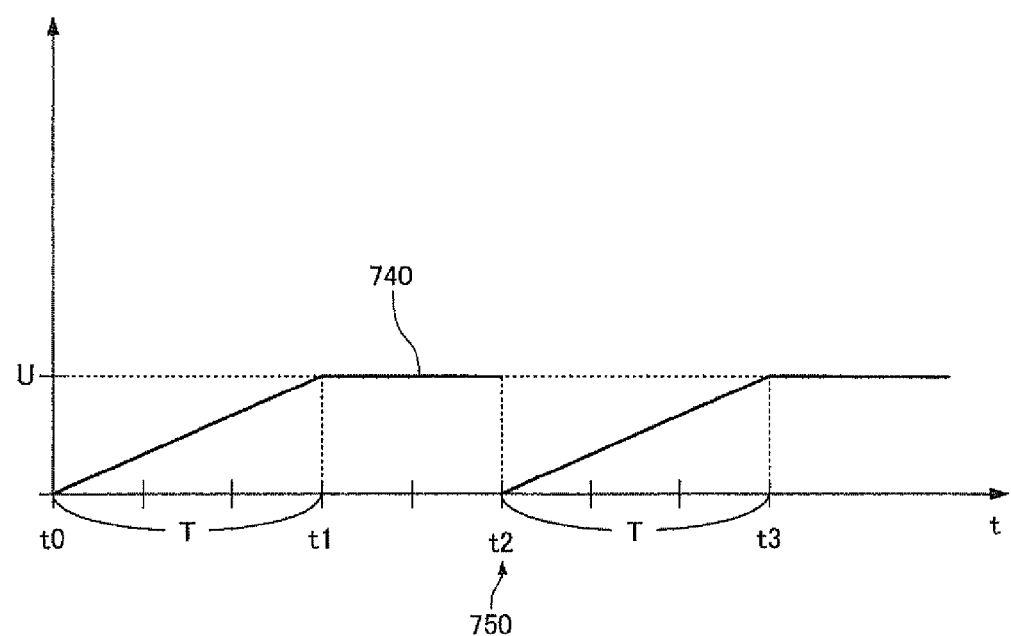
FIG. 36 is a diagram illustrating the sales of a store owned by a user.

FIG. 36 is a diagram illustrating the sales of the store owned by the user. The horizontal axis indicates time, and the vertical axis indicates the sales.

In one embodiment of the invention, a sales upper-limit value is set to each store, and the sales of each store are increased with the passage of time. The sales upper-limit value may be set corresponding to the purchase price of each store. For example, the sales upper-limit value may be set to a value obtained by multiplying the purchase price by $\alpha$ %.

When the sales upper-limit value of a given store is referred to as U, the time T required for the sales upper-limit value U to be reached is set based on the sales upper-limit value U. For example, the time T may increase in proportion to the sales upper-limit value U, or may be set based on a predetermined function. The time T may increase as the sales upper-limit value increases.

The sales 740 of a given store are 0 at a time t0, increase with the passage of time, reach the sales upper-limit value U at a time t1 when the time T has elapsed, and are maintained at the sales upper-limit value U. When the user has issued a money collection instruction 750 (time t2), the sales 740 are reset to 0, then increase with the passage of time, reach the sales upper-limit value U at a time t3 when the time T has elapsed from the time t2, and are maintained at the sales upper-limit value U until the user again issues a money collection instruction.

The process that resets the sales when the user has issued a money collection instruction, and increases the sales until the sales upper-limit value is reached, is repeated in this manner. When the user has issued a money collection instruction, the user receives money from the sales.

Figure 37A:
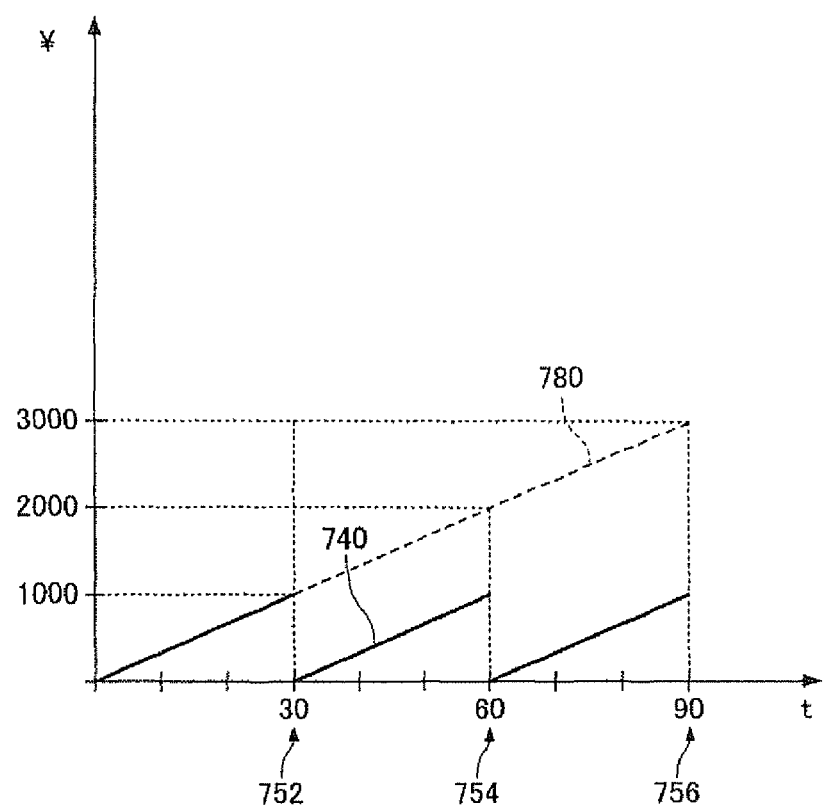
FIGS. 37A and 37B are diagrams illustrating a money collection process, the sales of a store, and the amount of money the user has.
Figure 37B:
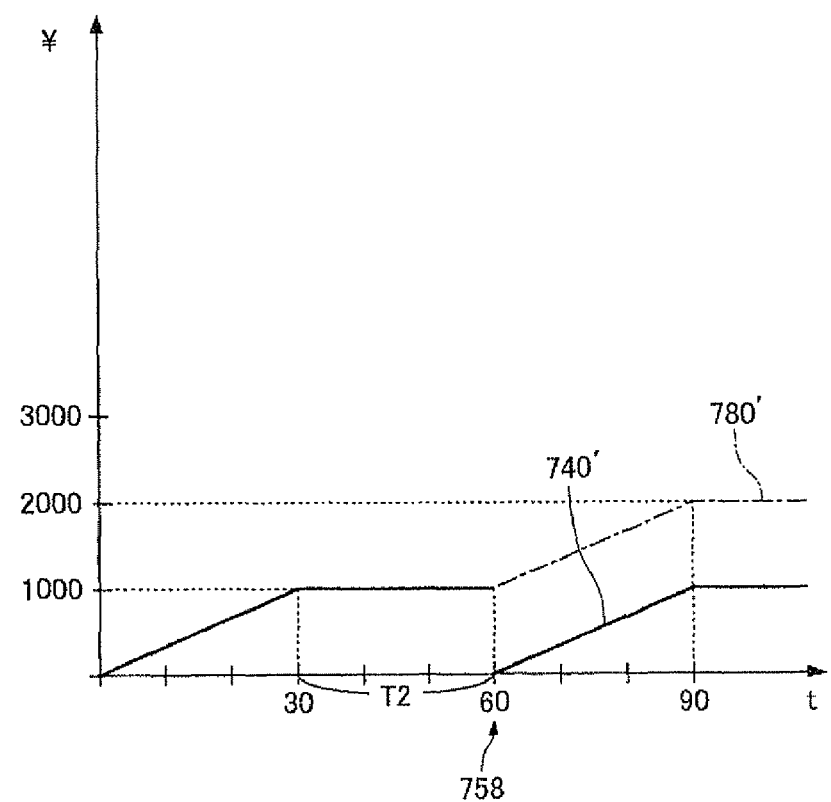

FIGS. 37A and 37B are diagrams illustrating a money collection process, the sales of the store, and the amount of money the user has. The horizontal axis indicates time, and the vertical axis indicates the sales.

The user can issue a money collection request at a desired timing after the sales upper-limit value has been reached. FIG. 37A illustrates a change in the sales 740 and the amount of money 780 the user has when the user issues a money collection request immediately after the sales upper-limit value has been reached. FIG. 37B illustrates a change in the sales 740' and the amount of money 780' the user has when the user issues a money collection request when a predetermined time T2 has elapsed after the sales upper-limit value has been reached. In FIG. 37A, since the money collection cycle is shorter than that of FIG. 37B, the amount of money 780 increases quickly.

Specifically, the user can efficiently increase the amount of money by frequently checking the sales of his store, and collecting money as soon as possible after the sales upper-limit value has been reached. This means that it is advantageous for the user to frequently play the game. This makes it possible to strongly motivate the user to play the game.

Figure 38A:
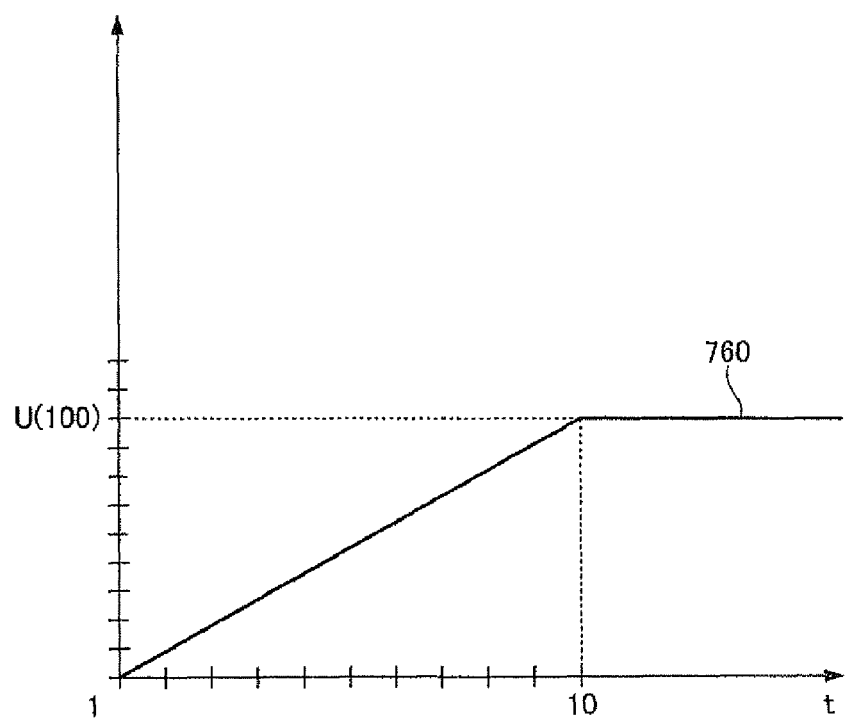
FIGS. 38A and 38B are diagrams illustrating a change in sales of stores that differ in price.
Figure 38B:
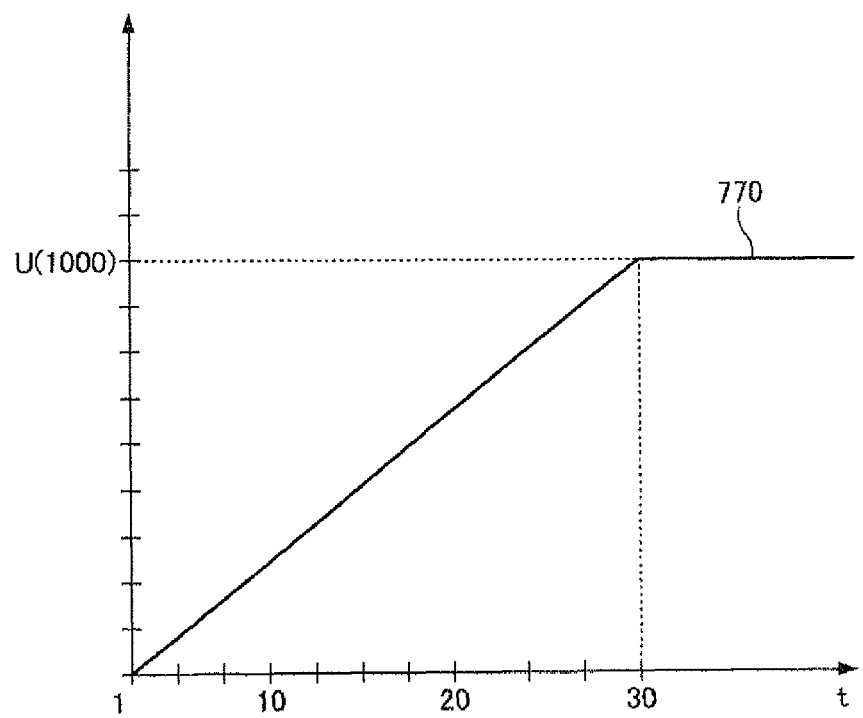

FIGS. 38A and 38B are diagrams illustrating a change in sales of stores that differ in price. The horizontal axis indicates time, and the vertical axis indicates the sales.

FIG. 38A illustrates a sales graph 760 of a store having a price of \10,000,000. The sales upper-limit value U is \1,000,000, and the time T required for the sales to reach the sales upper-limit value U is 10 minutes. FIG. 38B illustrates a sales graph 770 of a store having a price of \100,000,000. The sales upper-limit value U is \10,000,000, and the time T required for the sales to reach the sales upper-limit value U is 30 minutes.

Specifically, the sales increase advantageously as the price of the store increases.

Figure 39A:
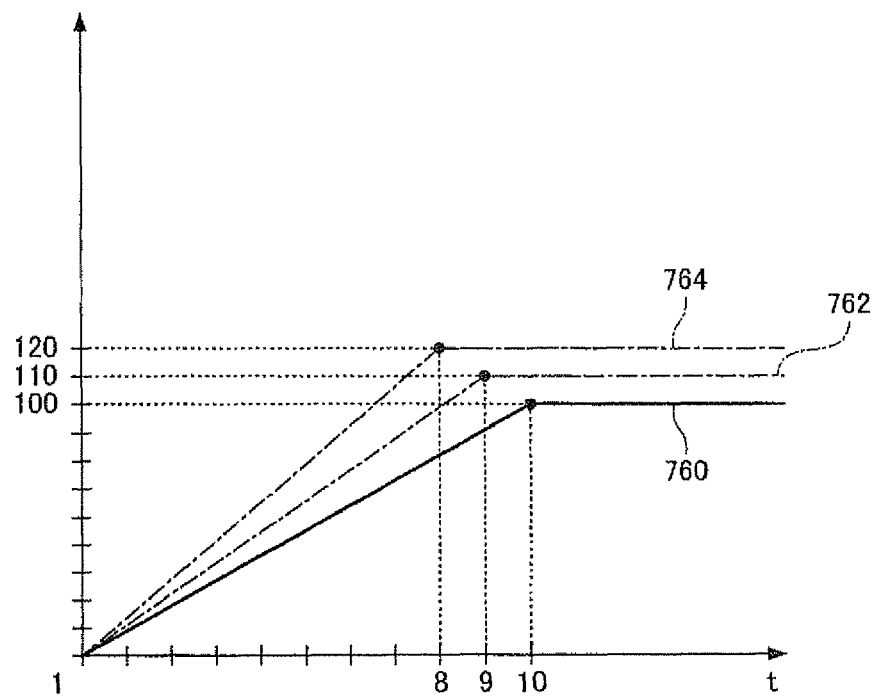
FIGS. 39A and 39B are diagrams illustrating the relationship between a part-time job event and the sales.
Figure 39B:
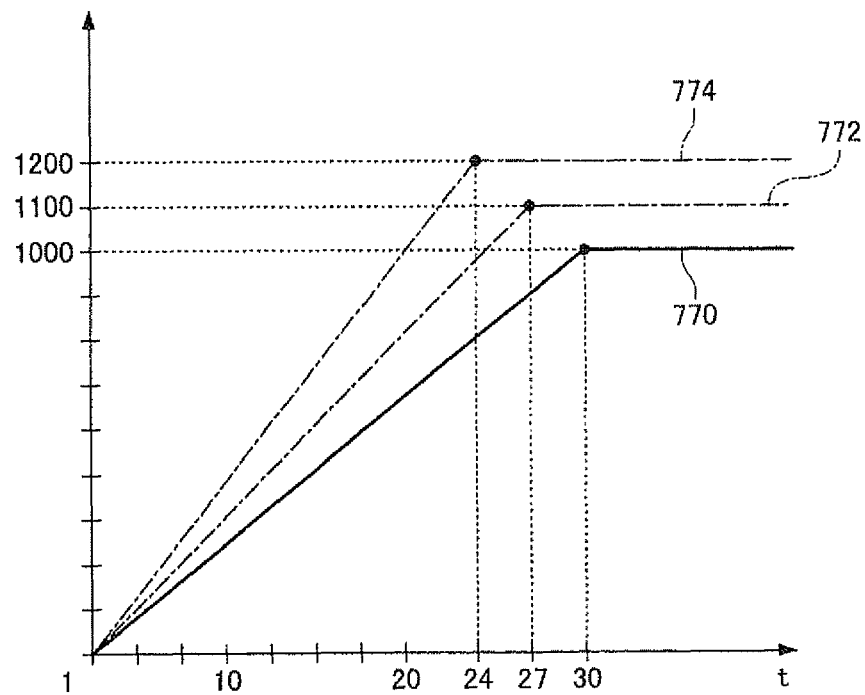

FIGS. 39A and 39B are diagrams illustrating the relationship between a part-time job event and the sales.

In one embodiment of the invention, when a part-time job event has occurred in a store owned by the user (i.e., a virtual event area acquired by the user), the sales of the store (i.e., the result value of the user or a predetermined game parameter) may be changed advantageously as compared with the case where a part-time job event has not occurred.

A graph 760 illustrated in FIG. 39A corresponds to the graph 760 illustrated in FIG. 38A, and indicates a change in sales of the store when a part-time job event has not occurred. A graph 762 indicates a change in sales of the store when a predetermined number of (e.g., one) part-time job events have occurred.

For example, when another user has worked part-time in the store owned by the user, the sales upper-limit value U of the store may be increased by $\alpha$ % (10% in FIG. 39A), and the time T required for the sales to reach the sales upper-limit value U may be reduced by $\beta$ % (10% in FIG. 39A). Specifically, the sales upper-limit value may be increased to \1,100,000, and the time T may be reduced to 9 minutes (see graph 762).

A graph 770 illustrated in FIG. 39B corresponds to the graph 770 illustrated in FIG. 38B, and indicates a change in sales of the store when a part-time job event has not occurred. A graph 772 indicates a change in sales of the store when a predetermined number of part-time job events have occurred.

For example, when another user has worked part-time in the store owned by the user, the sales upper-limit value U of the store may be increased by $\alpha$ % (10% in FIG. 39B), and the time T required for the sales to reach the sales upper-limit value U may be reduced by $\beta$ % (10% in FIG. 39B). Specifically, the sales upper-limit value may be increased to \11,000,000, and the time T may be reduced to 27 minutes (see graph 772).

Note that only one of the sales upper-limit value and the time required for the sales to reach the sales upper-limit value may be changed instead of changing both the sales upper-limit value and the time required for the sales to reach the sales upper-limit value.

The sales upper-limit value and the time required for the sales to reach the sales upper-limit value may be changed at a timing when a part-time job event has occurred. The sales upper-limit value and the time required for the sales to reach the sales upper-limit value may be further changed when a plurality of part-time job events have occurred within the time required for the sales to reach the sales upper-limit value. In this case, the sales of the store increase more quickly as the number of users who work part-time in the store increases.

The sales of the store may be set so that the sales increase with the passage of time, and the sales increase rate may be increased as the number of users who work part-time in the store increases. In this case, the sales of the store increase more quickly as the number of users who work part-time in the store increases.

Alternatively, the sales of the store may be increased each time a part-time job event has occurred.

When another user who maintains a friendship with the user is included among users who have worked part-time in the store owned by the user, the sales of the store may be increased more quickly (i.e., the result value of the user or a predetermined game parameter may be changed more advantageously).

A graph 764 illustrated in FIG. 39A indicates a change in sales when another user who maintains a friendship with the user has worked part-time in the store owned by the user.

For example, when another user who maintains a friendship with the user has worked part-time in the store owned by the user, the sales upper-limit value U of the store may be increased by $\alpha'$ % (20% in FIG. 39A), and the time T required for the sales to reach the sales upper-limit value U may be reduced by $\beta'$ % (20% in FIG. 39A). Specifically, the sales upper-limit value may be increased to \1,200,000, and the time T may be reduced to 8 minutes (see graph 764).

A graph 774 illustrated in FIG. 39B indicates a change in sales when another user who maintains a friendship with the user has worked part-time in the store owned by the user.

For example, when another user who maintains a friendship with the user has worked part-time in the store owned by the user, the sales upper-limit value U of the store may be increased by $\alpha'$ % (20% in FIG. 39A), and the time T required for the sales to reach the sales upper-limit value U may be reduced by $\beta'$ % (20% in FIG. 39A). Specifically, the sales upper-limit value may be increased to \12,000,000, and the time T may be reduced to 24 minutes (see graph 774).

Figure 40A:
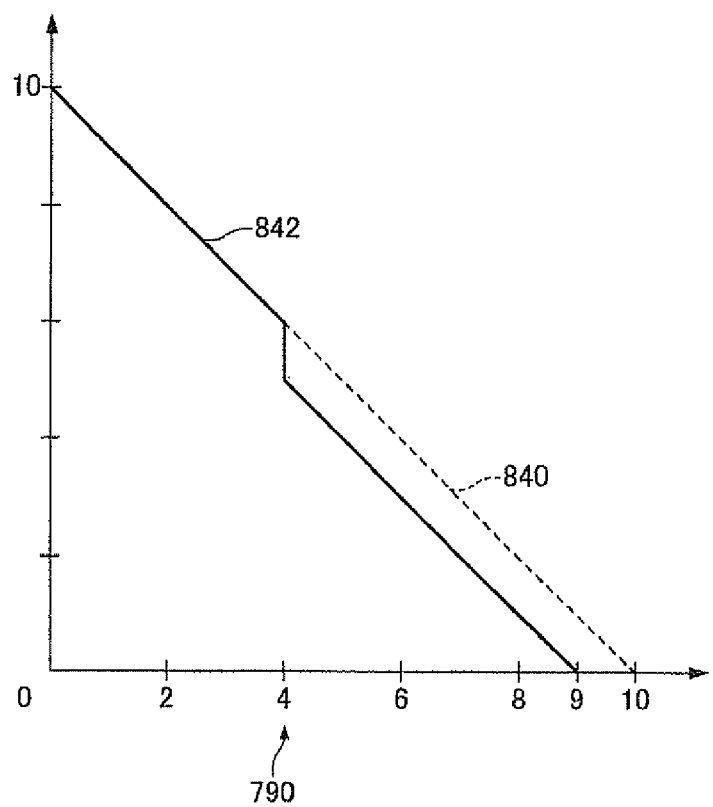
FIGS. 40A and 40B are diagrams illustrating the relationship between a part-time job event and the remaining time.
Figure 40B:
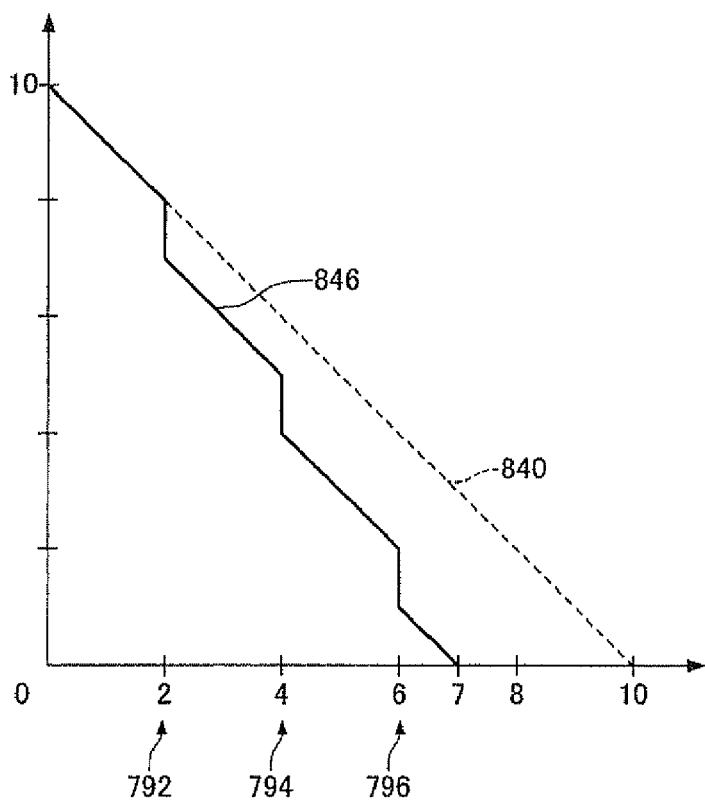

FIGS. 40A and 40B are diagrams illustrating the relationship between a part-time job event and the remaining time.

Specifically, when a part-time job event has occurred in the store owned by the user, the remaining time that elapses until the sales of the store reach the sales upper-limit value may be reduced as compared with the case where a part-time job event has not occurred. In FIGS. 40A and 40B, the horizontal axis indicates the time elapsed after the sales have been reset, and the vertical axis indicates the remaining time that elapses until the sales of the store reach the sales upper-limit value. A graph 840 indicates a change in remaining time when the time required for the sales of the store to reach the sales upper-limit value is 10 minutes, and a part-time job event has not occurred.

As illustrated in FIG. 40A, when a part-time job event has occurred at a timing 790 (when 4 minutes has elapsed) during the time required for the sales of the store to reach the sales upper-limit value, the remaining time is reduced by 1 minute (i.e., the sales of the store reach the sales upper-limit value when 9 minutes has elapsed).

As illustrated in FIG. 40B, when three part-time job events have occurred at a timing 792 (when 2 minutes has elapsed), a timing 794 (when 4 minutes has elapsed), and a timing 796 (when 6 minutes has elapsed) during the time required for the sales of the store to reach the sales upper-limit value, the remaining time is reduced by 1 minute at each timing (i.e., the sales of the store reach the sales upper-limit value when 7 minutes has elapsed).

Specifically, the sales of the store increase more quickly as the number of users who work part-time in the store owned by the user (i.e., the number of part-time job events) increases. This means that the sales of a store located in an area where another user can easily work part-time (i.e., a place frequently visited by another user in the real world (e.g., a place where a number of people gather)) increase more quickly. Therefore, the user may purchase such a store in order to advantageously increase the assets. However, since the land price of a place where a number of people gather is generally high, a large amount of money is required to purchase a store located in such a place. This prompts the user to work part-time in the game in order to purchase the store.

A process performed when a store is owned by a plurality of users is described below.

FIG. 16 illustrates an example of the friend information registered in the user information database.

In FIG. 16, users Y2 and Y3 are registered as friends of a user Y1, A user Y4 and the user Y1 are registered as friends of the user Y2, the user Y1 is registered as a friend of the user Y3, and the user Y2 is registered as a friend of the user Y4.

Figure 17:
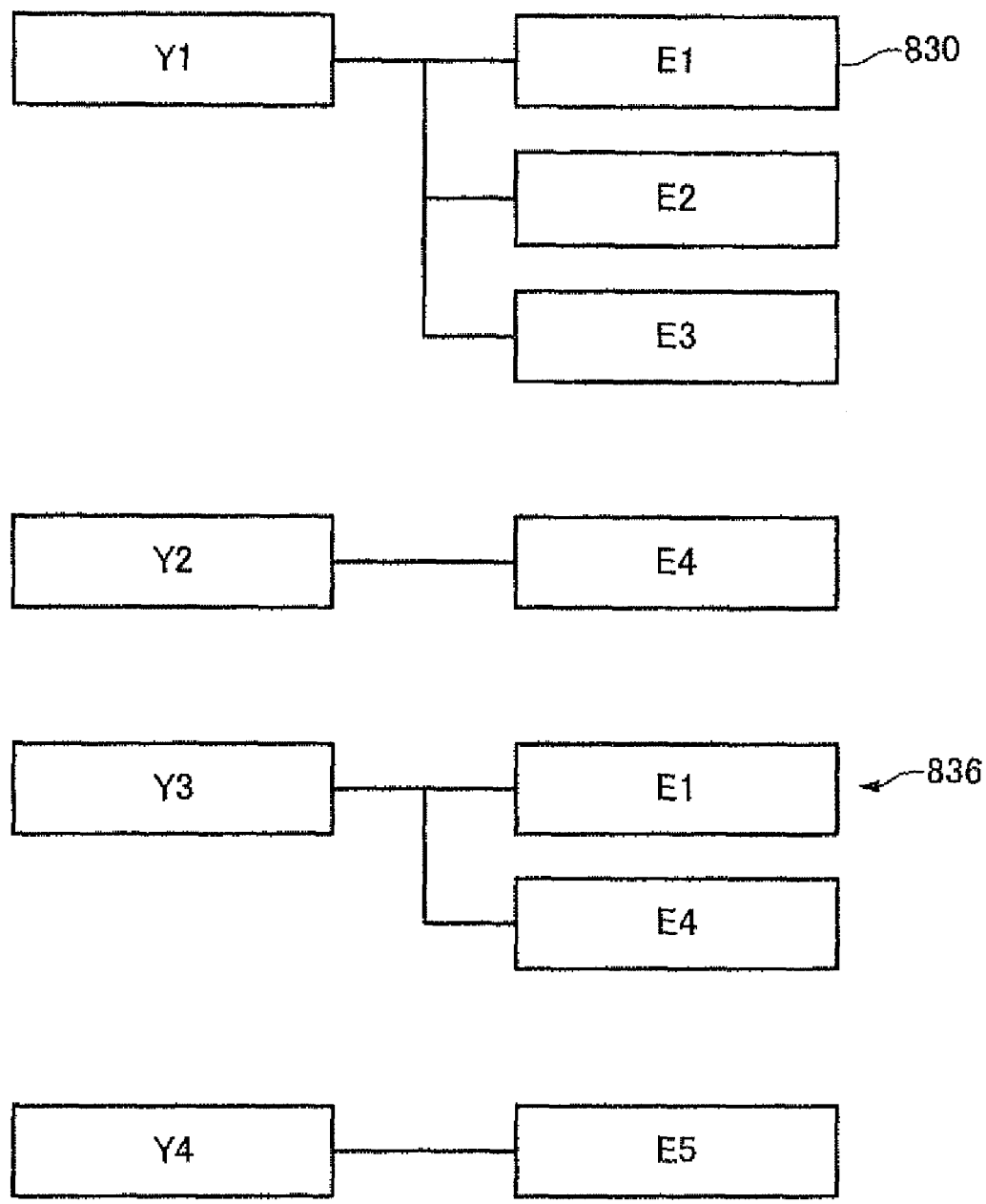
FIG. 17 is a diagram illustrating an example of owned store information registered in a user information database.

FIG. 17 illustrates an example of the store information registered in the user information database.

In FIG. 17, stores E1, E2, and E3 are registered as stores owned by the user Y1, a store E4 is registered as a store owned by the user Y2, the stores E1 and E4 are registered as stores owned by the user Y3, and a store E5 is registered as a store owned by the user Y4.

FIG. 18 illustrates an example of a part-timer list registered in the store information database.

In FIG. 18, the users Y2 and Y4 are registered as part-timers of the store E1, the users Y2, Y3, and Y4 are registered as part-timers of the store E2, no user is registered as a part-timer of the store E3, the users Y1 and Y4 are registered as part-timers of the store E4, and the user Y1 is registered as a part-timer of the store E5.

When calculating the sales of the store owned by the user, whether or not another user who maintains a friendship with the user has worked part-time in the store owned by the user is determined.

For example, the user Y1 owns the store E1 (see 830 in FIG. 17), and the users Y2 and Y4 have worked part-time in the store E1 (see 832 in FIG. 18). Since the users Y2 and Y3 are friends of the user Y1 (see 834 in FIG. 16), when the user Y2 who is a friend of the user Y1 has worked part-time in the store E1 owned by the user Y1, the sales upper-limit value U of the store is increased by $\alpha'$ % (e.g., 20%), and the time T required for the sales to reach the sales upper-limit value U is reduced by $\beta'$ % (e.g., 20%) (first preferential process). When the user Y4 who is not a friend of the user Y1 has worked part-time in the store E1 owned by the user Y1, the sales upper-limit value U of the store is increased by $\alpha$ % (e.g., 10%), and the time T required for the sales to reach the sales upper-limit value U is reduced by $\beta$ % (e.g., 10%) (second preferential process).

For example, the user Y3 owns the store E1 (see 836 in FIG. 17), and the users Y2 and Y4 have worked part-time in the store E1 (see 832 in FIG. 18). The user Y1 is a friend of the user Y3 (see 838 in FIG. 16) (i.e., a friend of the user Y3 has not worked part-time in the store E1 owned by the user Y3). Therefore, when the user Y2 who is not a friend of the user Y3 has worked part-time in the store E1, the sales upper-limit value U of the store is increased by $\alpha$ % (e.g., 10%), and the time T required for the sales to reach the sales upper-limit value U is reduced by $\beta$ % (e.g., 10%) (second preferential process). When the user Y4 who is not a friend of the user Y1 has worked part-time in the store E1 owned by the user Y1, the sales upper-limit value U of the store is increased by $\alpha$ % (e.g., 10%), and the time T required for the sales to reach the sales upper-limit value U is reduced by $\beta$ % (e.g., 10%) (second preferential process).

The effect of the part-timer on the sales and the time required for the sales to reach the sales upper-limit value differs depending on the user who owns the store, and the money collection timing differs depending on the user, as described above. Therefore, the sales of each store and the time required for the sales of each store to reach the sales upper-limit value are controlled corresponding to each user.

Figure 20:
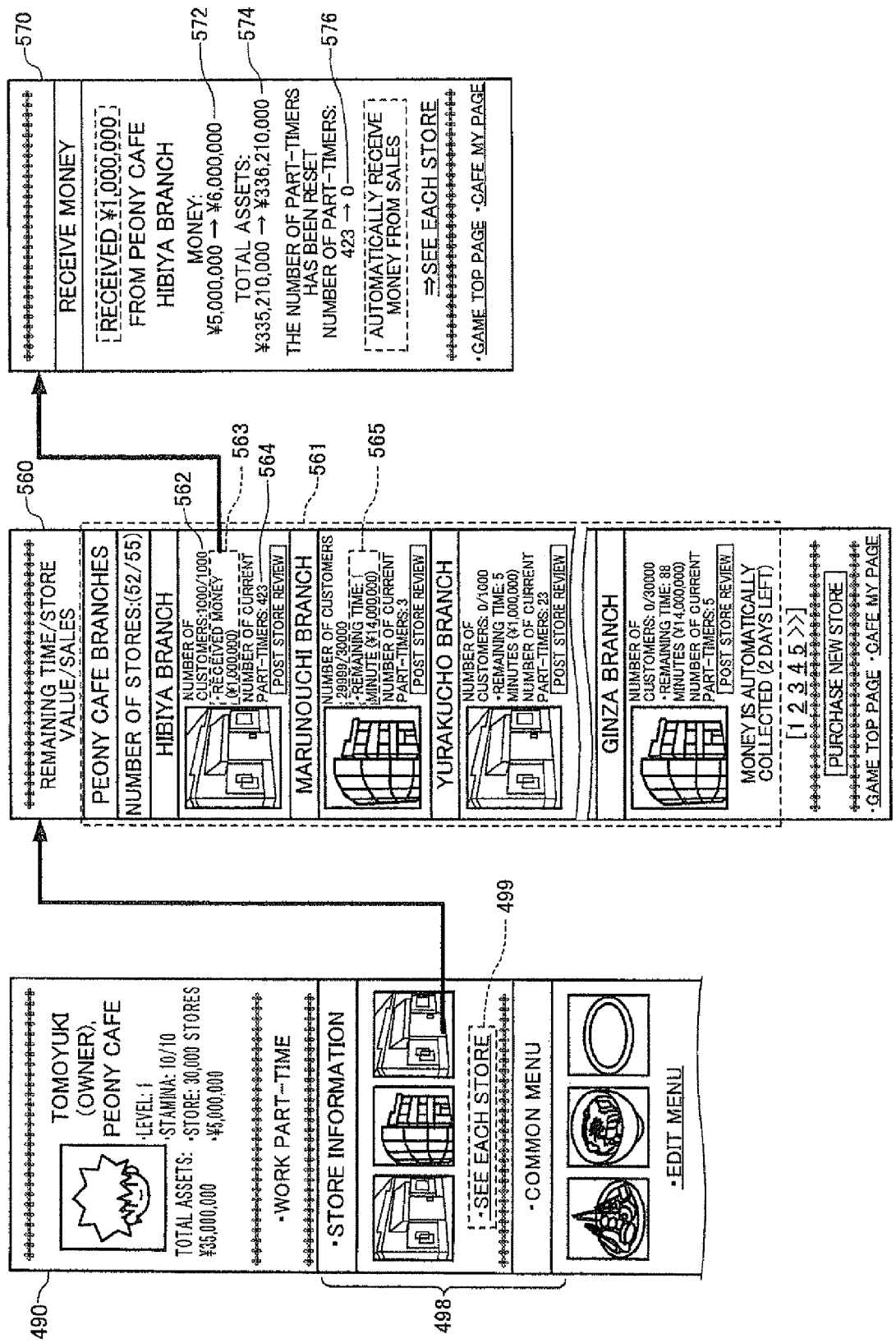
FIG. 20 is a diagram illustrating a screen transition that occurs in a mobile terminal.

FIG. 20 illustrates an example of a screen transition of the mobile terminal during the money collection process.

Reference numeral 490 in FIG. 20 indicates an example of the game my page screen.

The information 498 about the store owned by the user, and the like are displayed on the game my page screen (web page) 490. When the user has selected an item "SEE EACH STORE" 499 included in the information 498, and performed a select operation, an owned store list screen (web page) 560 is displayed.

A list 561 of the store information about the stores owned by the user is displayed on the owned store list screen 560. The number of customers 562, the number of current part-timers 564, the amount of money collected 563 or a remaining time 565 (i.e., the amount of money collected 564 is displayed when the sales of the store have reached the sales upper-limit value, and the remaining time 565 is displayed when the sales of the store have not reached the sales upper-limit value), and the like are displayed as the store information. When the user has selected the item "AMOUNT OF MONEY COL- LECTED" 563 of one of the stores, and performed a select operation, a money collection completion screen (web page) 570 is displayed.

A change in money 572, a change in total assets 574, and a part-timer reset 576 due to money collection are displayed on the money collection completion screen (web page) 570. Whether or not the sales upper-limit value has been reached can be determined based on whether or not the item "AMOUNT OF MONEY COLLECTED" is displayed. The user can efficiently increase the amount of money (collect money from the sales) by frequently checking the remaining time.

Note that the server may perform the process that acquires the information about the stores owned by the user and the process that calculates the amount of money, the total assets, and the number of part-timers after collecting money from the sales, and transmit the information about the results to the mobile terminal. The mobile terminal may display the money collection completion screen 570 based on the information received from the server.

3-7. Store Selling Process

Figure 21:
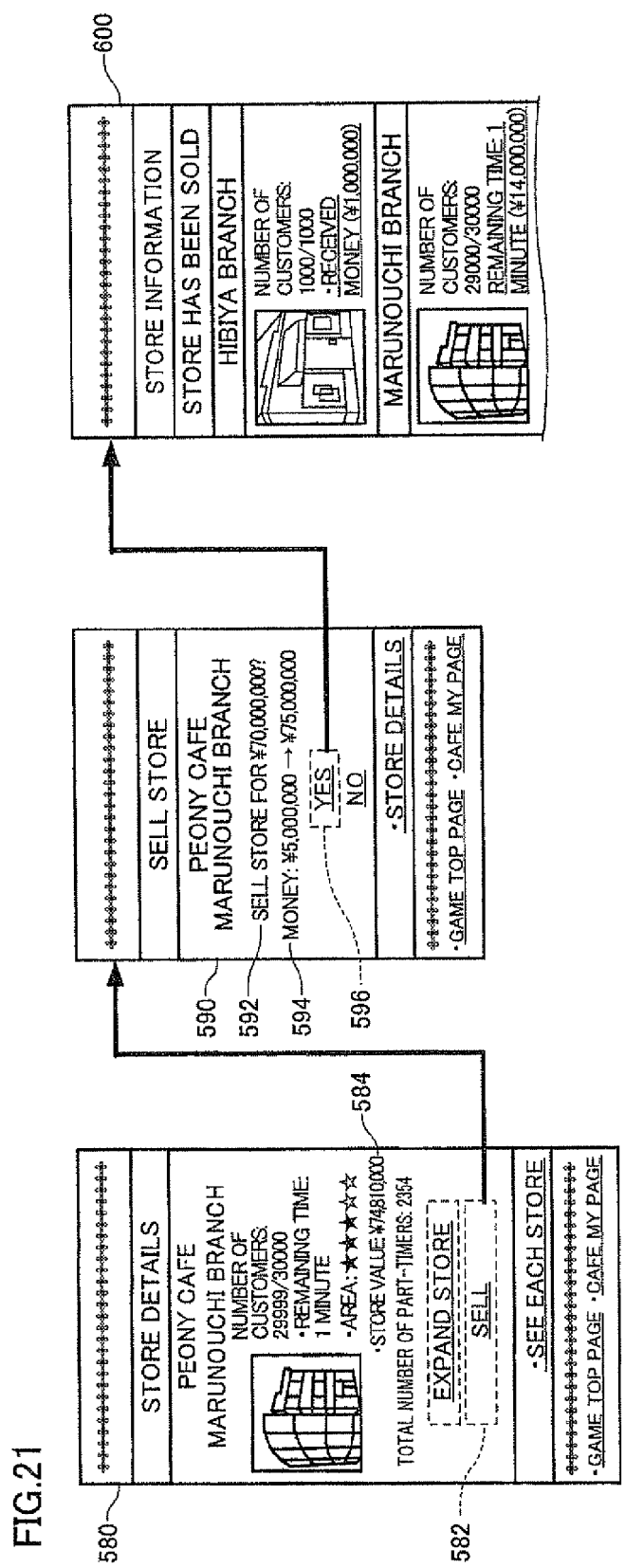
FIG. 21 is a diagram illustrating a screen transition that occurs in a mobile terminal.

FIG. 21 illustrates an example of a screen transition of the mobile terminal during a store selling process.

Reference numeral 580 in FIG. 21 indicates an example of the store information screen.

An item "STORE VALUE: \74,810,000" 584 is displayed on the store information screen (web page) 580. When the user has selected an item "SELL" 582, and performed a select operation, a sell confirmation screen (web page) 590 is displayed. The item "STORE VALUE" 584 reflects an upgrade and the like during the game in the purchase price of the store.

A proposed sale price 592 and a change in money 594 as a result of selling the store are displayed on the sell confirmation screen (web page) 590. The sale price is calculated based on the store value 548, and may be a value obtained by rounding the store value 584, for example. The amount of money after selling the store is calculated by adding the sale price to the amount of money before selling the store. When the user has selected an item "YES" 596, and performed a select operation, a sell completion screen (web page) 600 is displayed.

Note that the server may perform the process that acquires the information (e.g., store value) about the store owned by the user and the process that calculates the sale price, and transmit the information about the results to the mobile terminal. The mobile terminal may display the store information screen 580 (sell confirmation screen 590) based on the information received from the server.

3-8. Friend Information Providing Process

Figure 22:
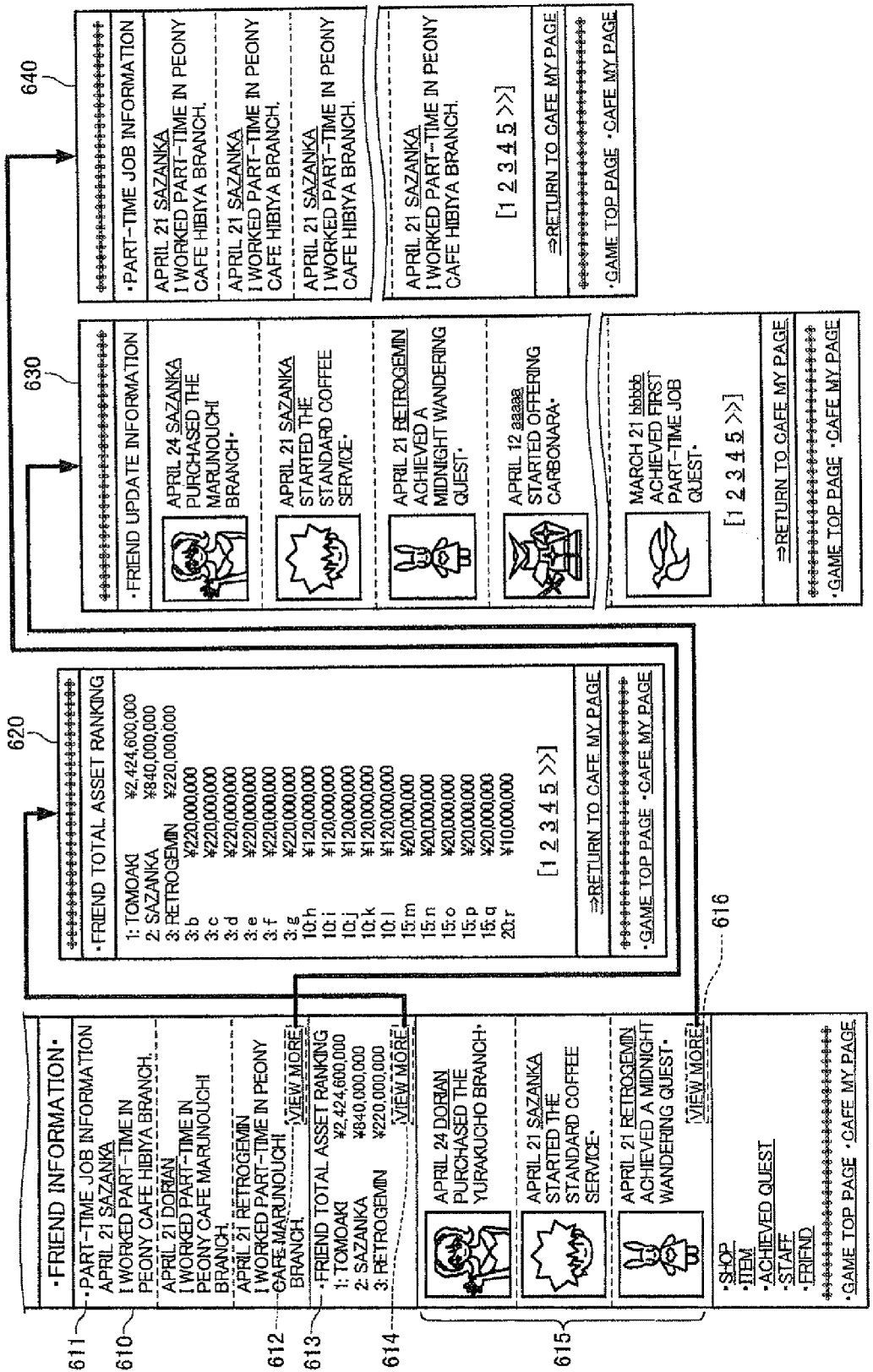
FIG. 22 is a diagram illustrating a screen transition that occurs in a mobile terminal.

FIG. 22 illustrates an example of a screen transition of the mobile terminal during a friend information providing process.

Reference numeral 580 in FIG. 22 indicates an example of the store information screen.

Part-time job information 611 about other users who maintain a friendship with the user, total asset ranking information 613 about other users who maintain a friendship with the user, update information 615 about other users who maintain a friendship with the user, and the like are displayed on a friend information providing screen (web page) 610. When the user has selected an item "VIEW MORE" 612, and performed a select operation, a part-time job information screen (web page) 640 is displayed. When the user has selected an item "VIEW MORE" 614 for the total asset ranking information 613 about other users who maintain a friendship with the user, and performed a select operation, a friend's total asset ranking information screen (web page) 620 is displayed. When the user has selected an item "VIEW MORE" 616 for the update information 615 about other users who maintain a friendship with the user, and performed a select operation, a friend's update information screen (web page) 630 is displayed.

Note that the server may acquire information about the store owned by the user (e.g., part-time job information about other users who maintain a friendship with the user, total asset ranking information about other users who maintain a friendship with the user, and update information about other users who maintain a friendship with the user), and transmit the information to the mobile terminal. The mobile terminal may display each item based on the information received from the server, 3-9. Staff Addition Process A staff addition process (i.e., cooperator registration process) according to one embodiment of the invention is described below.

Figure 23:
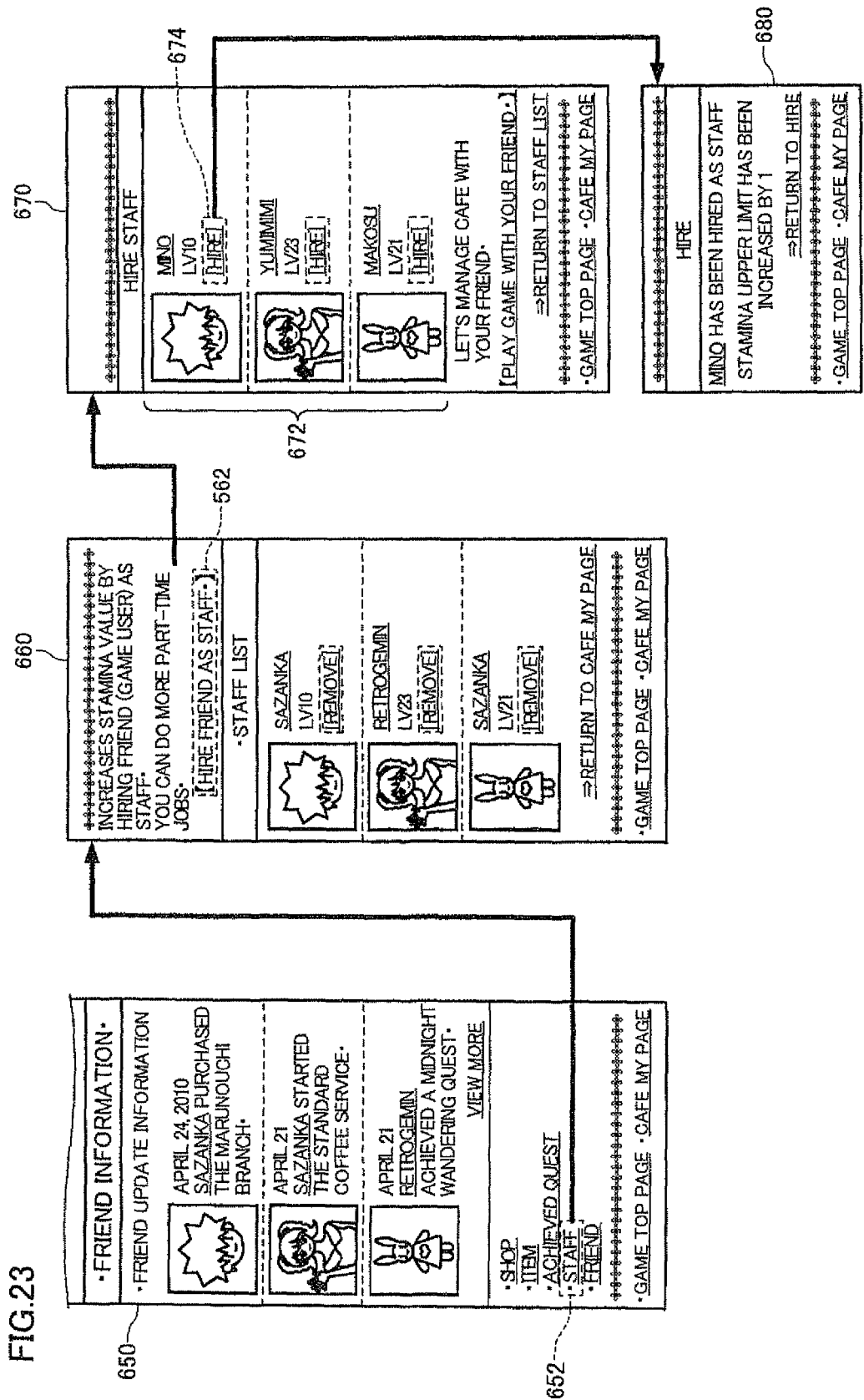
FIG. 23 is a diagram illustrating a screen transition that occurs in a mobile terminal.

FIG. 23 illustrates an example of a screen transition of the mobile terminal during the staff addition process.

When the user has selected an item "STAFF" 652 displayed on the friend information screen (web page) 650, and performed a select operation, a staff list screen (web page) 660 is displayed. A list 672 of friends who can be hired as staff is displayed on the staff list screen 660. When the user has selected an item "HIRE" 674 displayed together with one of the friends in the friend list 672, and performed a select operation, a staff addition completion screen (web page) 660 is displayed.

The user can hire another user who maintains a friendship with the user, has been registered in the game, and has not been hired by the user.

Note that the server may select users who satisfy the above conditions as friends who can hired by the user, and transmit the information about the users to the mobile terminal. The mobile terminal may display the staff list screen 660 based on the information received from the server. The friend information 312 (another user who maintains a friendship with the user) may be obtained by selecting given information (e.g., user identification information or game participation flag) about a friend that is stored in an external system (e.g., another SNS service), and temporarily storing the selected information in the server. Alternatively, the system may include a search section that searches the name, game ID, user ID, and the like of a friend, and a staff registration section that links the searched user identification information about the friend to the identification information about the user as the staff information.

4. Process Performed by Game-Providing System 4-1. First Store Purchase Process

Figure 24:
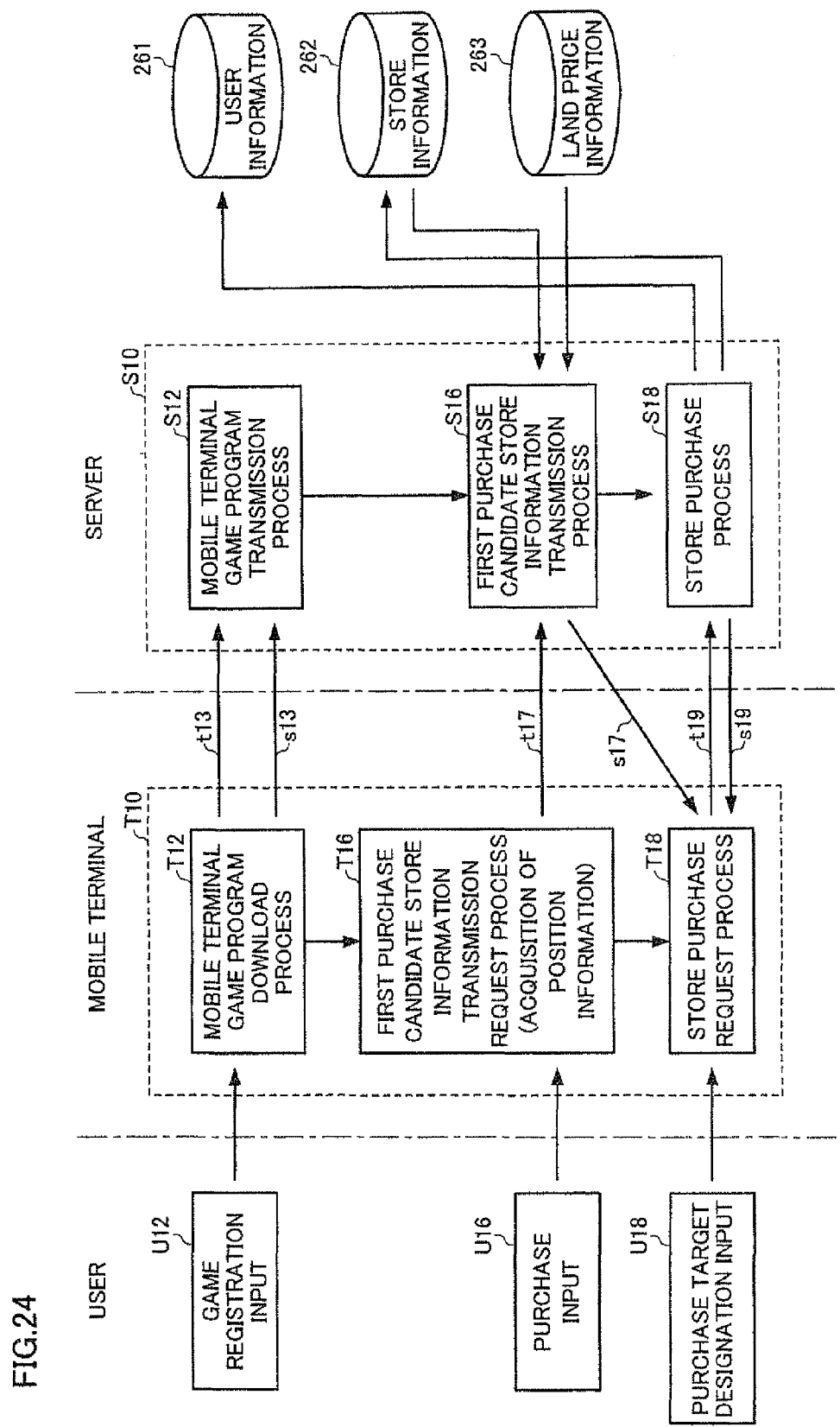
FIG. 24 is a diagram illustrating a process performed by a server and a mobile terminal during a first store purchase process.

FIG. 24 is a diagram illustrating a process performed by the server and the mobile terminal during a first store purchase process.

In this example, a mobile terminal game program corresponding to the game has not been downloaded to the mobile terminal.

When the user has performed a game registration input (i.e., a process performed by the user when the user plays the game for the first time) using the mobile terminal (U12), the mobile terminal executes a mobile terminal game program download process routine (T12), and transmits a mobile terminal game program transmission request to the server (t13).

The server that has received the mobile terminal game program transmission request executes a mobile terminal game program transmission routine (S12), and transmits the mobile terminal game program to the mobile terminal (s13).

When the mobile terminal has downloaded the mobile terminal game program, the mobile terminal executes an initial purchase candidate store information transmission request routine (T16) (e.g., the screen transition process described with reference to FIG. 10 (420 to 440)). When the user has performed a purchase input (U16), the mobile terminal acquires the position information, and transmits a first purchase candidate store information transmission request including the acquired position information to the server (t17).

The server that has received the first purchase candidate store information transmission request executes a first purchase candidate store information transmission routine (S16), creates first purchase candidate store information referring to the store position information stored in the store information database 262, the land price information stored in the land price information database 263, and the like, and transmits the first purchase candidate store information to the mobile terminal that has transmitted the first purchase candidate store information transmission request (s17). Note that the store information database 262 and the land price information database 263 may be stored in another server, or a database of another application may be referred to by utilizing an API of the other application. The applications and the databases may be distributed so that the applications and the databases can be appropriately referred to and updated.

The mobile terminal that has received the first purchase candidate store information executes a store purchase request routine (T18), and performs a screen transition process (see 450 to 460 in FIG. 10, for example). When the user has performed a purchase target designation input (U18), the mobile terminal transmits a store purchase request including purchase target store designation information to the server (t19).

The server that has received the store purchase request executes a store purchase routine (S18), updates the game data (owned store list) stored in the user information database, the game data (owner list) stored in the store information database, and the like based on the store purchase result, and transmits a store purchase completion notification to the mobile terminal (s19).

Figure 25:
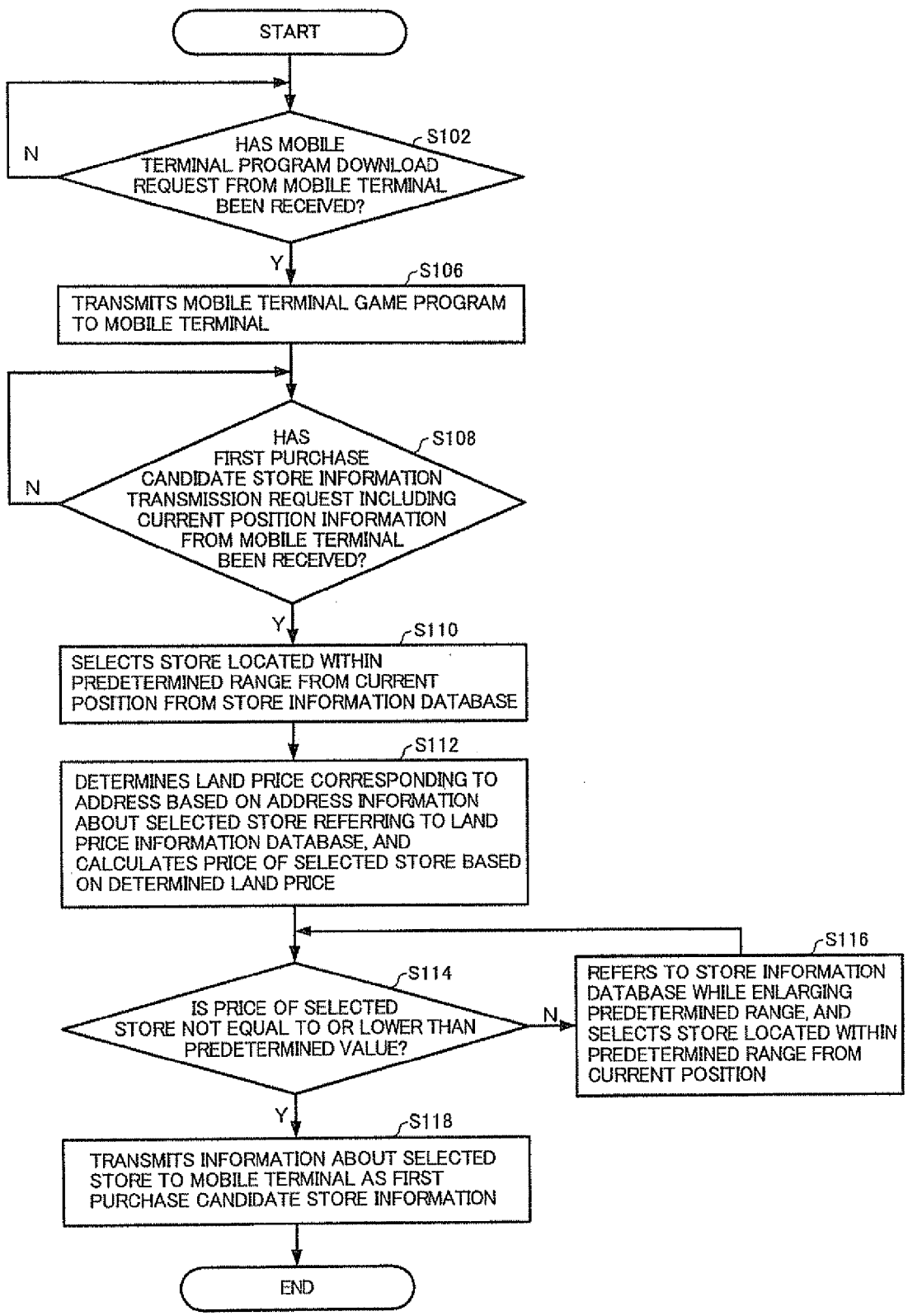
FIG. 25 is a flowchart illustrating the flow from a mobile terminal program transmission process to a first purchase store information transmission process performed by a server.

FIG. 25 is a flowchart illustrating the flow from a mobile terminal program transmission process to a first purchase store information transmission process performed by the server.

When the server has received a mobile terminal program download request from the mobile terminal (step S102), the server transmits the mobile terminal game program to the mobile terminal that has transmitted the mobile terminal program download request (step S106).

When the server has received a first purchase candidate store information transmission request including the current position information from the mobile terminal (step S108), the server selects a store located within a predetermined range from the current position from the store information database (step S110).

When the price of the selected store has not been calculated, the server determines the land price corresponding to the address based on the address information about the store referring to the land price information database, and calculates the price of the store based on the determined land price (step S112).

When the price of the selected store is not equal to or lower than a predetermined value (N in step S114), the server refers to the store information database while enlarging the predetermined range, and selects a store located within the predetermined range from the current position (step S116), and returns to the step S114. When the price of the selected store is equal to or lower than a predetermined value (Y in step S114), the server transmits the information about the selected store to the mobile terminal as the first purchase candidate store information (step S118).

Figure 26:
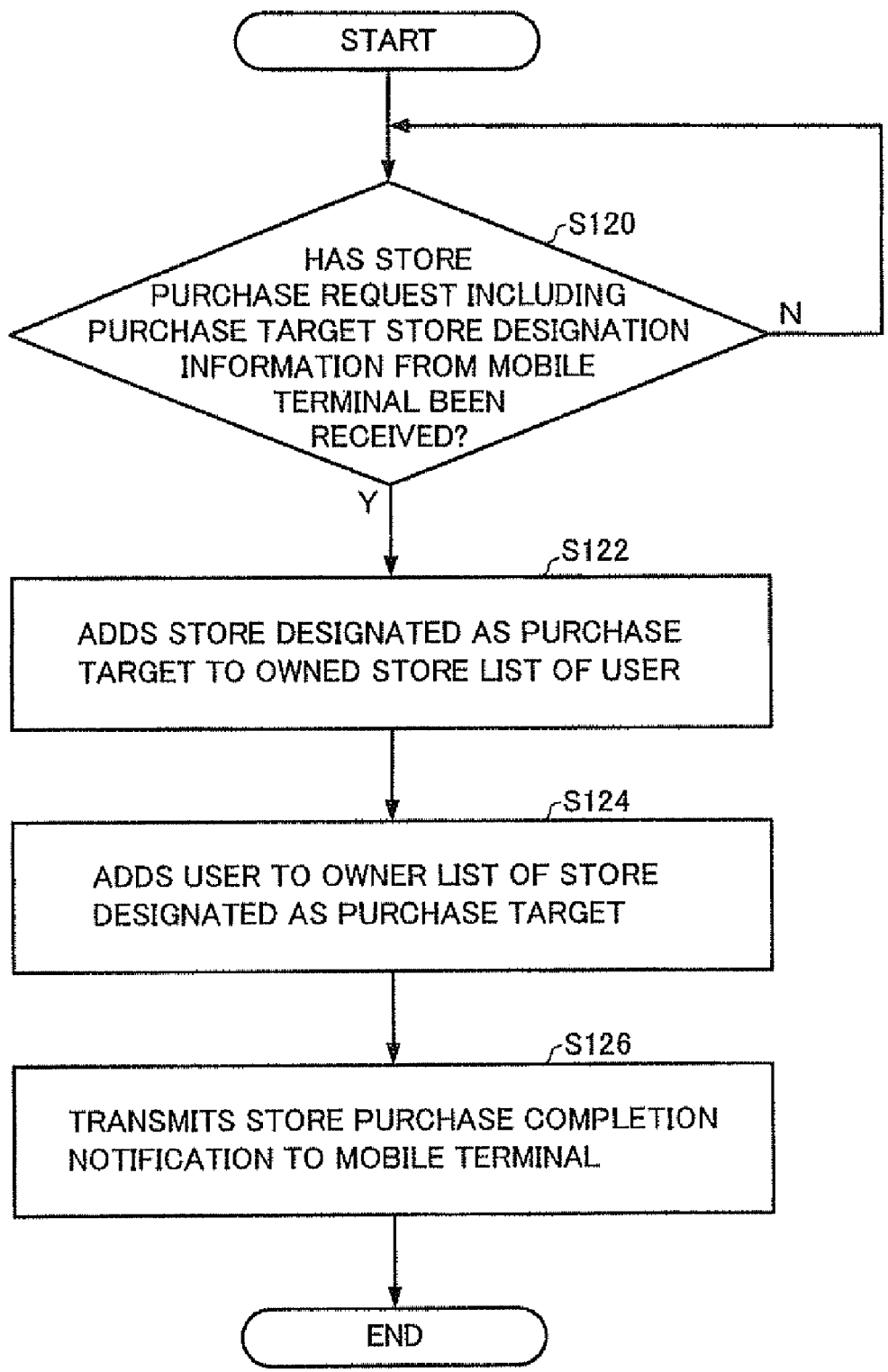
FIG. 26 is a flowchart illustrating the flow of a store purchase process performed by a server.

FIG. 26 is a flowchart illustrating the flow of a store purchase process performed by the server.

When the server has received a store purchase request including purchase target store designation information from the mobile terminal (step S120), the server adds the store designated as the purchase target to the owned store list of the user (step S122). Specifically, the server updates the owned store list (360 in FIG. 8) that is the game data linked to the user identification information about the user that is stored in the user information database. The server also adds the user to the owner list of the store designated as the purchase target (step S124). Specifically, the server registers the user identification information about the user in the owner list (390 in FIG. 9) that is the game data linked to the store identification information about the store that is stored in the store database. The server then transmits a store purchase completion notification to the mobile terminal (step S126).

4-2. Second and Subsequent Store Purchase Process

Figure 27:
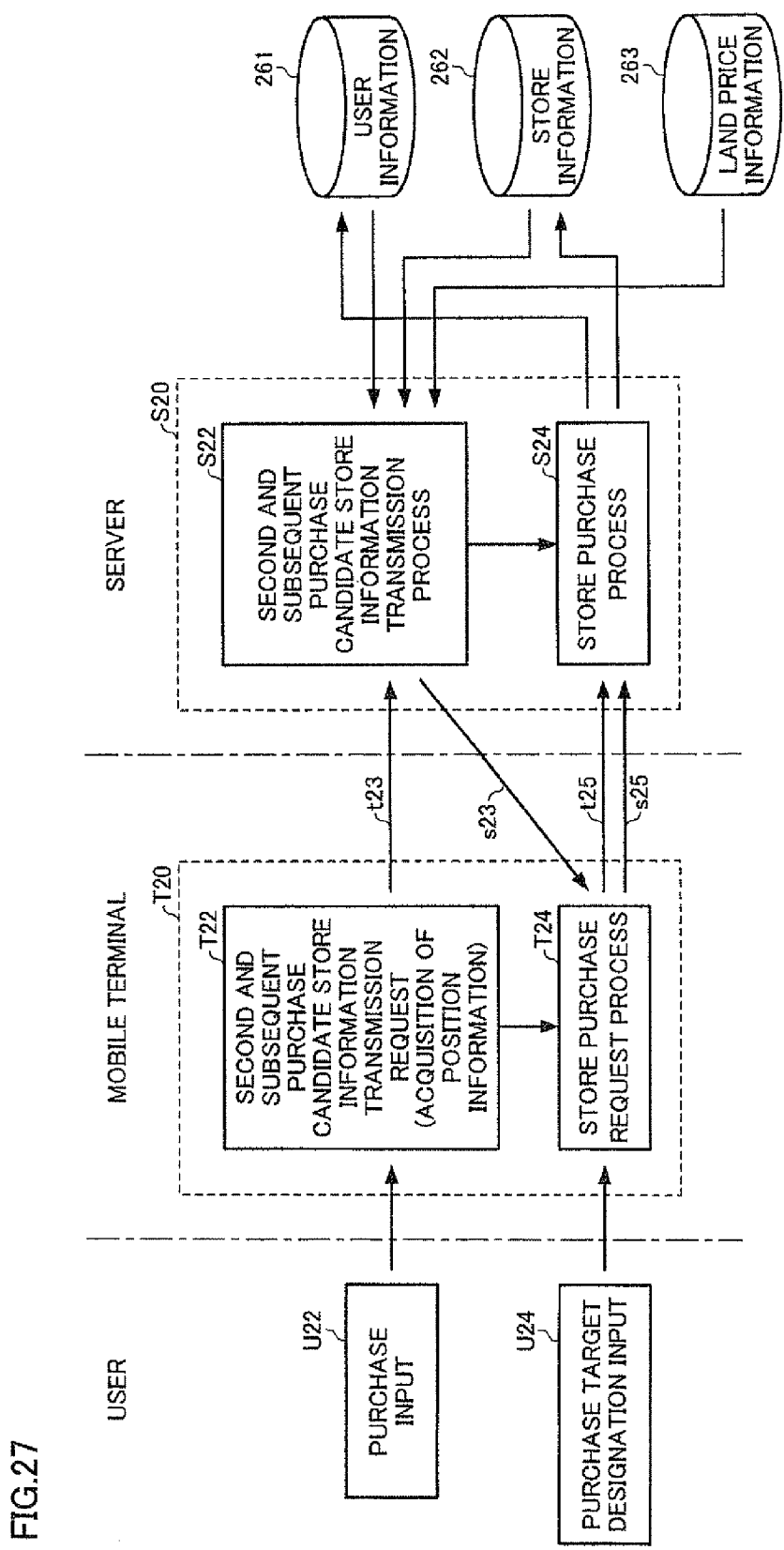
FIG. 27 is a diagram illustrating a process performed by a server and a mobile terminal during a second and subsequent store purchase process.

FIG. 27 is a diagram illustrating a process performed by the server and the mobile terminal during the second and subsequent store purchase process.

The mobile terminal executes a second and subsequent purchase candidate store information transmission request routine (T22), and performs a screen transition process (see 470, 430, and 440 in FIG. 12, for example). When the user has performed a purchase input (U22), the mobile terminal acquires the position information, and transmits a purchase candidate store information transmission request including the acquired position information to the server (t23).

The server that has received the second and subsequent purchase candidate store information transmission request executes a second and subsequent purchase candidate store information transmission routine (S22), creates second and subsequent purchase candidate store information referring to the store position information stored in the store information database 262, the land price information stored in the land price information database 263, the amount of money and the level stored in the user information database, and the like, and transmits the second and subsequent purchase candidate store information to the mobile terminal that has transmitted the second and subsequent purchase candidate store information transmission request (s23). Note that the store information database 262 and the land price information database 263 may be stored in another server, or a database of another application may be referred to by utilizing an API of the other application. The applications and the databases may be distributed so that the applications and the databases can be appropriately referred to and updated.

The mobile terminal that has received the second and subsequent purchase candidate store information executes a store purchase request routine (T24), and performs a screen transition process (see 480 in FIG. 12, for example). When the user has performed a purchase target designation input (U24), the mobile terminal transmits a store purchase request including purchase target store designation information to the server (t25).

The server that has received the store purchase request executes a store purchase routine (S24), updates the game data (owned store list) stored in the user information database, the game data (owner list) stored in the store information database, and the like based on the store purchase result, and transmits a store purchase completion notification to the mobile terminal (s25).

Figure 28:
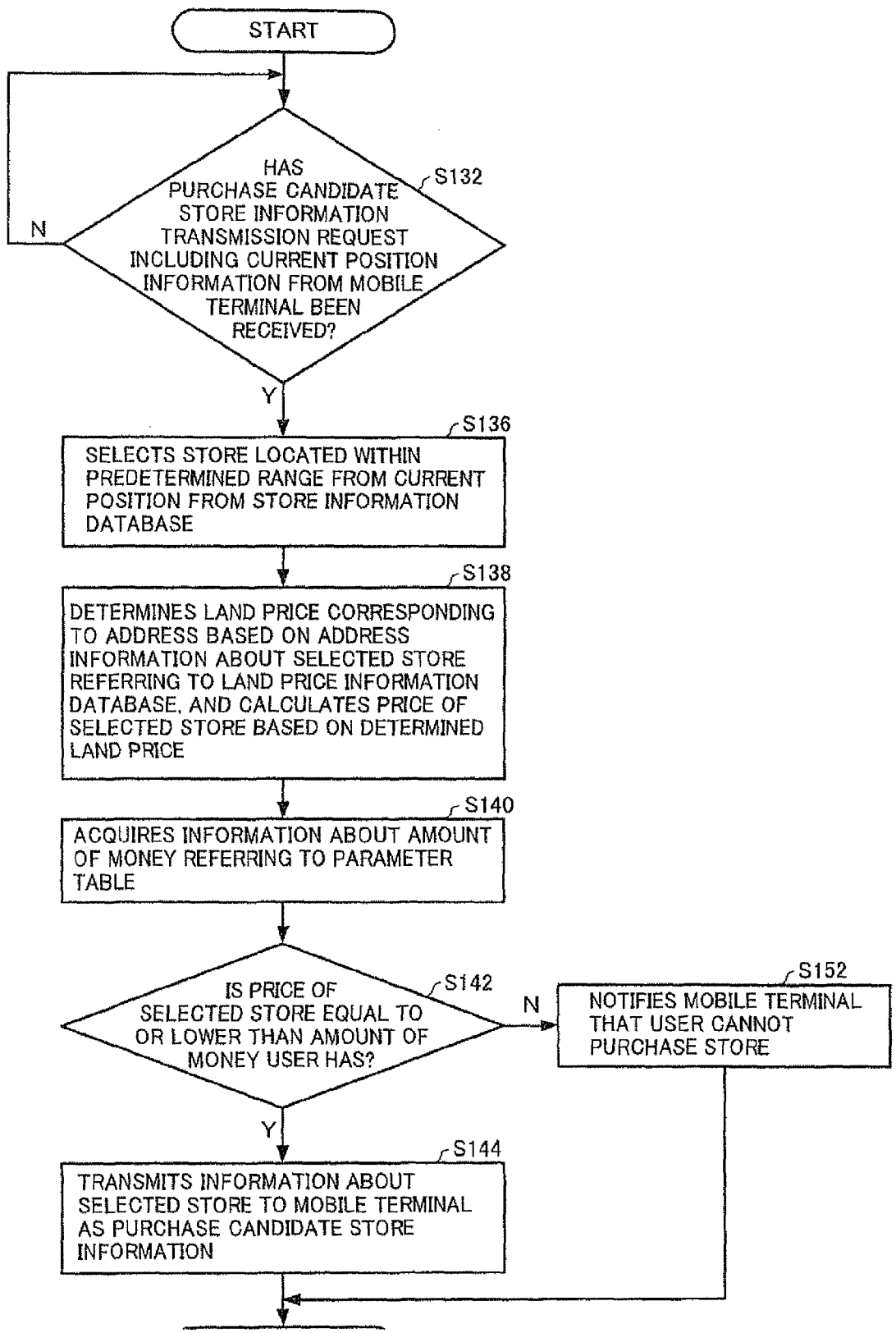
FIG. 28 is a flowchart illustrating the flow of a second and subsequent purchase candidate store information transmission process performed by a server.

FIG. 28 is a flowchart illustrating the flow of the second and subsequent purchase candidate store information transmission process performed by the server.

When the server has received a purchase candidate store information transmission request including the current position information from the mobile terminal (step S132), the server selects a store located within a predetermined range from the current position from the store information database (step S136).

When the price of the selected store has not been calculated, the server determines the land price corresponding to the address based on the address information about the store referring to the land price information database, calculates the price of the store based on the determined land price (step S138).

The server acquires the information about the amount of money the user has referring to the parameter table (e.g., money in FIG. 8) (step S140).

When the price of the selected store is equal to or lower than the amount of money the user has (Y in step S142), the server transmits the information about the selected store to the mobile terminal as the purchase candidate store information. The server may also transmit the information about the selected store having a price higher than the amount of money the user has to the mobile terminal as the purchase candidate store information. In this case, the server may add a purchasable flag to the information about the store having a price equal to or lower than the amount of money the user has.

When the price of the selected store is higher than the amount of money the user has (N in step S142), the server notifies the mobile terminal to that effect (step S152). In this case, the server may also transmit the information about the selected store to the mobile terminal as the purchase candidate store information. The server may add a purchasable flag to the information about the store having a price equal to or lower than the amount of money the user has. The mobile terminal may determine the presence or absence of the purchasable flag, and perform the display control process based on the determination result.

4-3. Part-Time Job Process (when the User Works Part-Time in Another Store)

Figure 29:
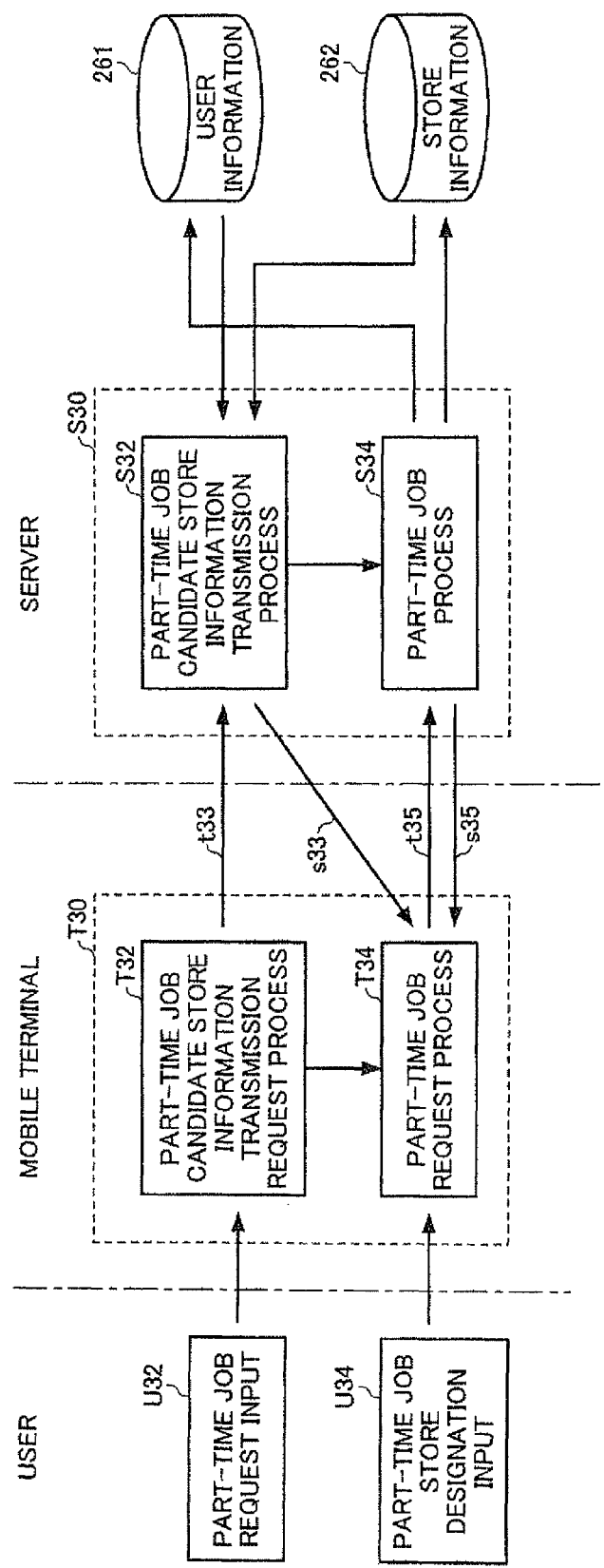
FIG. 29 is a diagram illustrating a process performed by a server and a mobile terminal during a part-time job process (when a user works part-time in another store).

FIG. 29 is a diagram illustrating a process performed by the server and the mobile terminal during the part-time job process (when the user works part-time in another store).

The mobile terminal executes a part-time job candidate store information transmission request routine (T32), and performs a screen transition process (see 490, 430, and 440 in FIG. 13, for example). When the user has performed a part-time job request input (U32), the mobile terminal acquires the position information, and transmits a part-time job candidate store information transmission request including the acquired position information to the server (t33).

The server that has received the part-time job candidate store information transmission request executes a part-time job candidate store information transmission routine (S32), creates part-time job candidate store information referring to the store position information stored in the store information database 262, the stamina stored in the user information database, and the like, and transmits the part-time job candidate store information to the mobile terminal that has transmitted the part-time job candidate store information transmission request (s33). Note that the store information database 262 and the user information database 261 may be stored in another server, or a database of another application may be referred to by utilizing an API of the other application. The applications and the databases may be distributed so that the applications and the databases can be appropriately referred to and updated.

The mobile terminal that has received the part-time job candidate store information executes a part-time job request routine (T34), and performs a screen transition process (see 500 and 510 in FIG. 14, for example). When the user has performed a part-time job store designation input (U34), the mobile terminal transmits a part-time job request including part-time job store designation information to the server (t35).

The server that has received the part-time job request executes a part-time job routine (S34), updates the stamina, the money, and the experience value stored in the user information database, the number of current part-timers and total number of part-timers stored in the owned store list, and the like while taking the part-time job result into consideration, updates the number of part-time jobs, the part-timer list, and the like stored in the store information database, and transmits a part-time job completion notification to the mobile terminal (s35).

Figure 30:
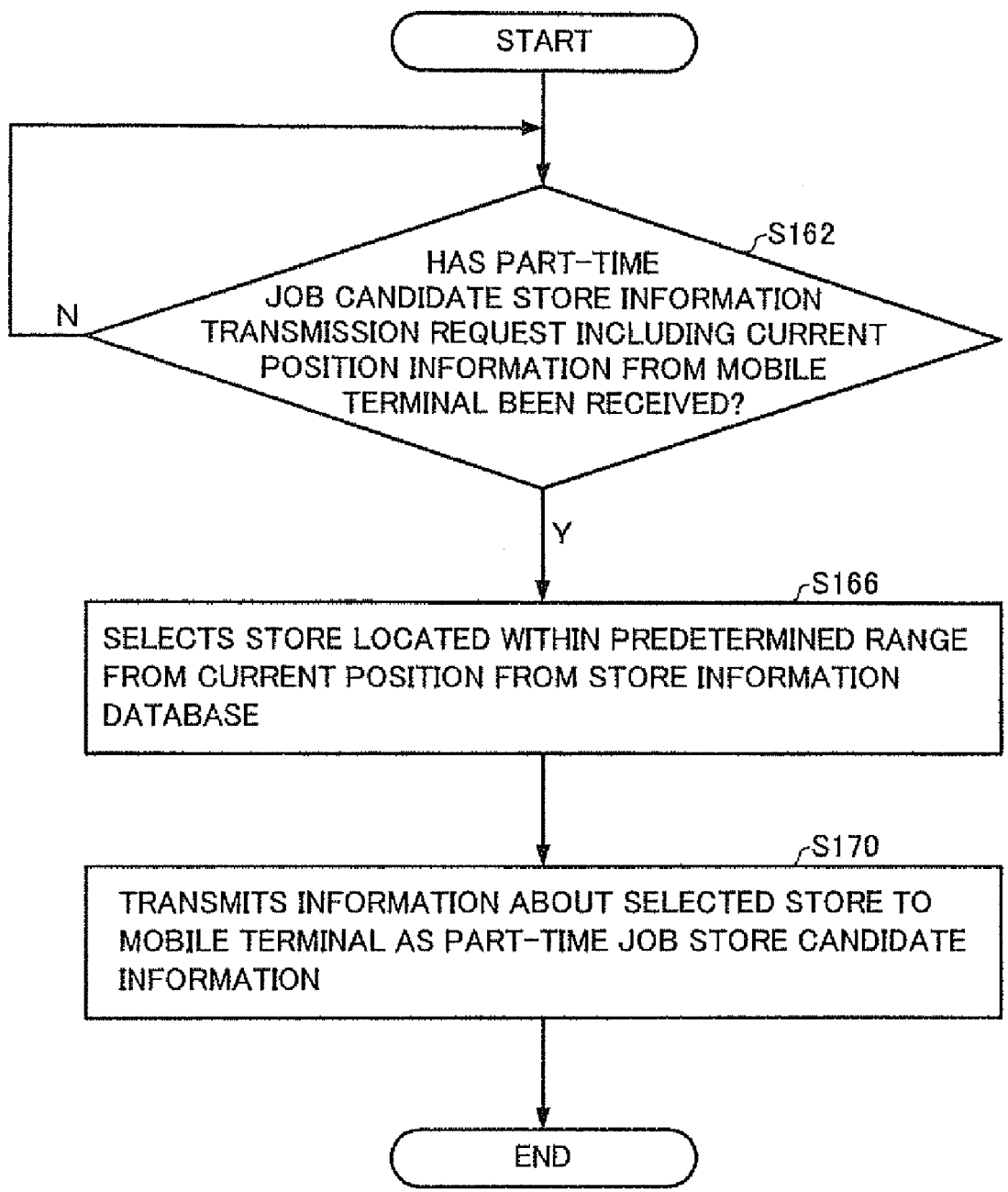
FIG. 30 is a flowchart illustrating the flow of a part-time job candidate store information transmission process performed by a server.

FIG. 30 is a flowchart illustrating the flow of the part-time job candidate store information transmission process performed by the server.

When the server has received a part-time job candidate store information transmission request including the current position information from the mobile terminal (step S1362), the server selects a store located within a predetermined range from the current position from the store information database (step S166).

The server then transmits the information about the selected store to the mobile terminal as the part-time job candidate store information (step S170).

Figure 31:
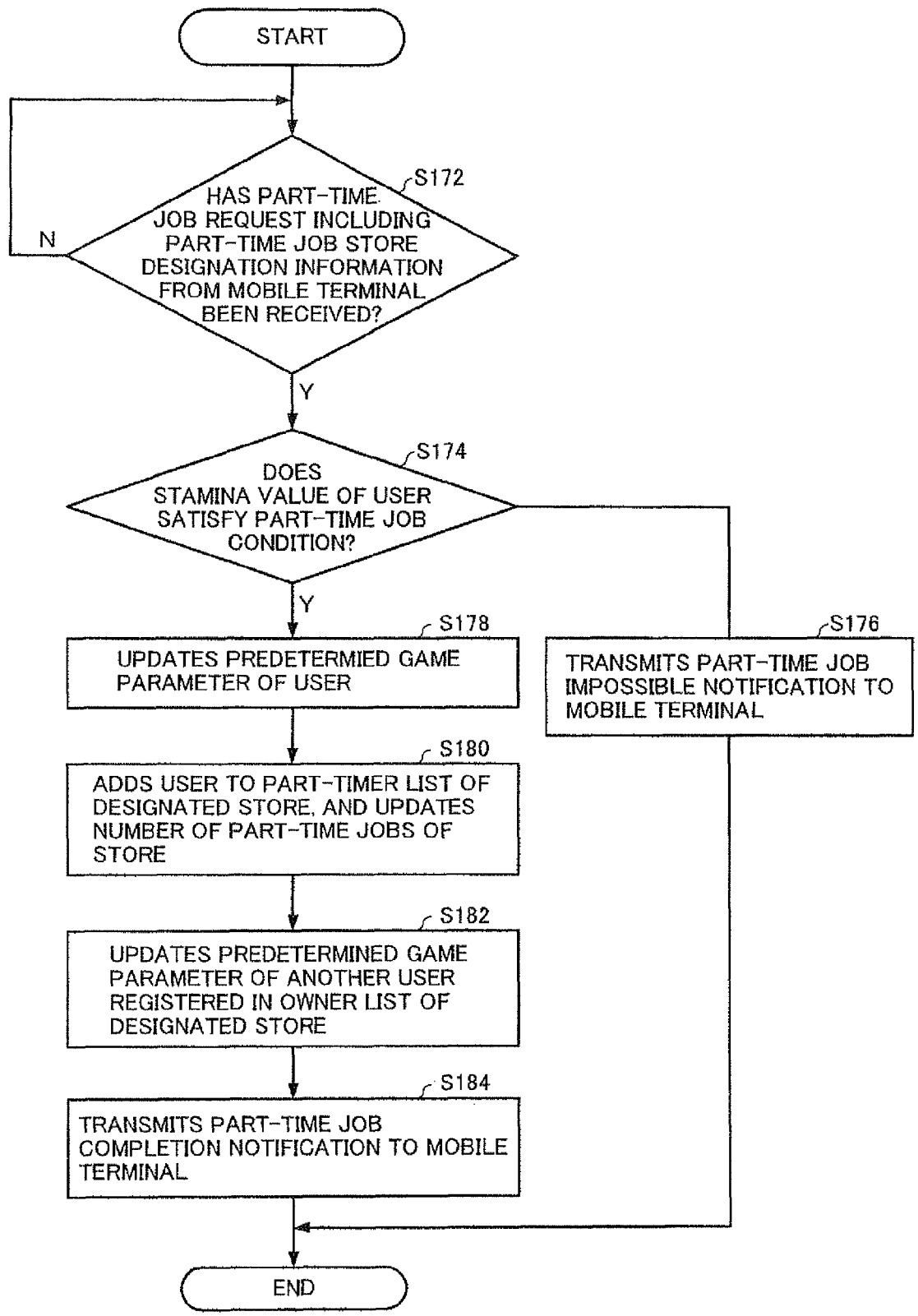
FIG. 31 is a flowchart illustrating the flow of a part-time job process performed by a server.

FIG. 31 is a flowchart illustrating the flow of the part-time job process performed by the server.

When the server has received the part-time job request including the part-time job store designation information from the mobile terminal, the server performs the following process (step S172).

Specifically, the server determines whether or not the stamina value of the user satisfies a part-time job condition. When the stamina value of the user does not satisfy the part-time job condition (N in step S174), the server transmits a part-time job impossible notification to the mobile terminal (step S176). For example, the server may determine that the part-time job condition is satisfied when the stamina value is equal to or larger than a predetermined value.

When the stamina value of the user satisfies the part-time job condition (Y in step S174), the server updates a predetermined game parameter of the user (step S178). For example, the server may subtract a predetermined value from the stamina value, may increase the experience value by a predetermined value, or may increase the amount of money by a predetermined value.

The server also adds the user to the part-timer list of the designated store, and updates the number of part-time jobs of the store (step S180). The server updates a predetermined game parameter of another user registered in the owner list of the designated stare (step S182). For example, the server may update at least one of the number of customers, the remaining time, the total number of part-timers, the number of current part-timers, the sales, a change in sales, and the like.

The server then transmits a part-time job completion notification to the mobile terminal (step S184).

4-4. Part-Time Job Process (when the User Works Part-Time in Store Owned by Friend)

Figure 32:
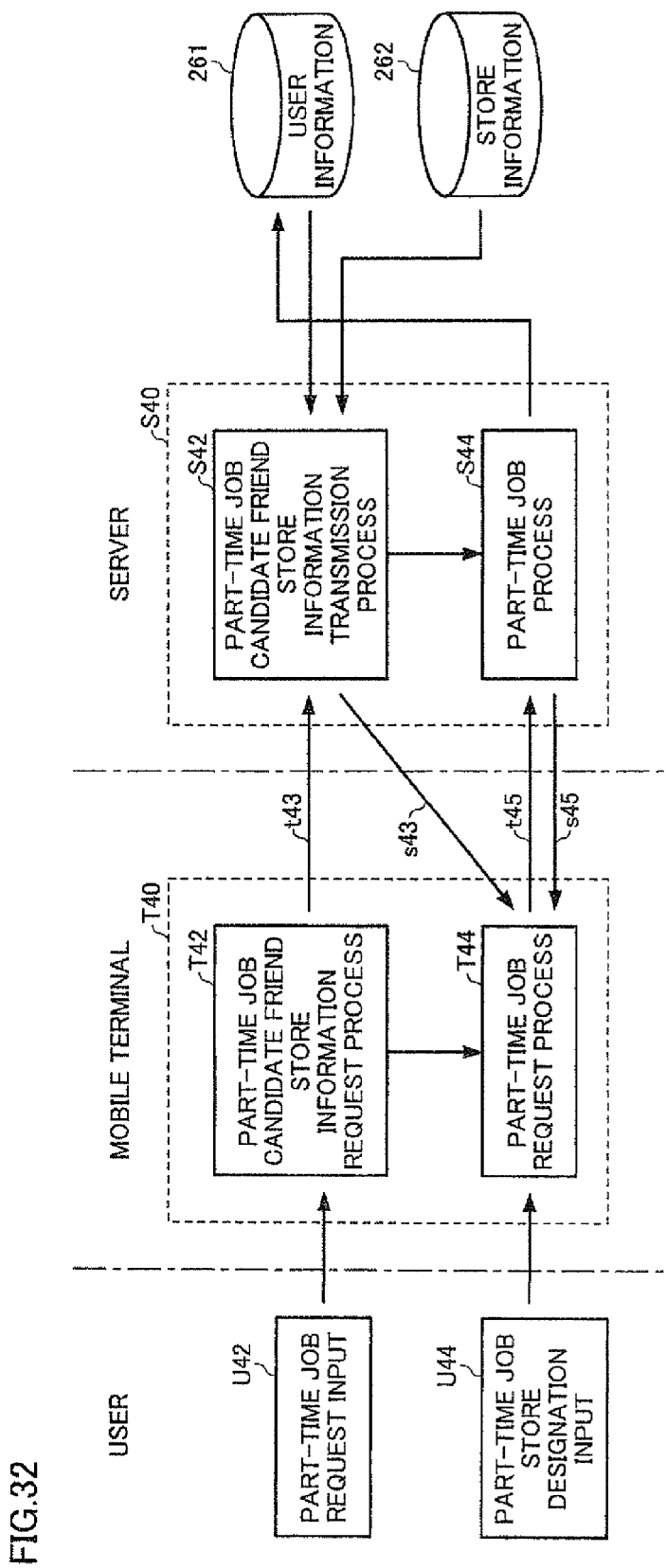
FIG. 32 is a diagram illustrating a process performed by a server and a mobile terminal during a part-time job process (when a user works part-time in a store owned by his friend).

FIG. 32 is a diagram illustrating a process performed by the server and the mobile terminal during the part-time job process (when the user works part-time in a store owned by his friend).

The mobile terminal executes a part-time job candidate friend store information transmission request routine (T40), and performs a screen transition process (see 520 in FIG. 19, for example). When the user has performed a part-time job request input (U42), the mobile terminal transmits a part-time job candidate friend store information transmission request to the server (t43).

The server that has received the part-time job candidate friend store information transmission request executes a part-time job candidate friend store information transmission routine (S42), creates part-time job candidate friend store information referring to the owned store list stored in the user information database 261, the store information stored in the store information database, and the like, and transmits the part-time job candidate friend store information to the mobile terminal that has transmitted the part-time job candidate friend store information transmission request (s43). Note that the store information database 262 and the user information database 261 may be stored in another server, or a database of another application may be referred to by utilizing an API of the other application. The applications and the databases may be distributed so that the applications and the databases can be appropriately referred to and updated.

The mobile terminal that has received the part-time job candidate friend store information executes a part-time job request routine (T44), and performs a screen transition process (see 530 and 540 in FIG. 19, for example). When the user has performed a part-time job store designation input (U44), the mobile terminal transmits a part-time job request including part-time job store designation information to the server (t45).

The server that has received the part-time job request executes a part-time job routine (S44), updates the stamina, the money, and the experience value stored in the user information database, the number of current part-timers and total number of part-timers stored in the owned store list, and the like while taking the part-time job result into consideration, updates the number of part-time jobs, the part-timer list, and the like stored in the store information database, and transmits a part-time job completion notification to the mobile terminal (s45).

4-5. Staff Addition Process

Figure 33:
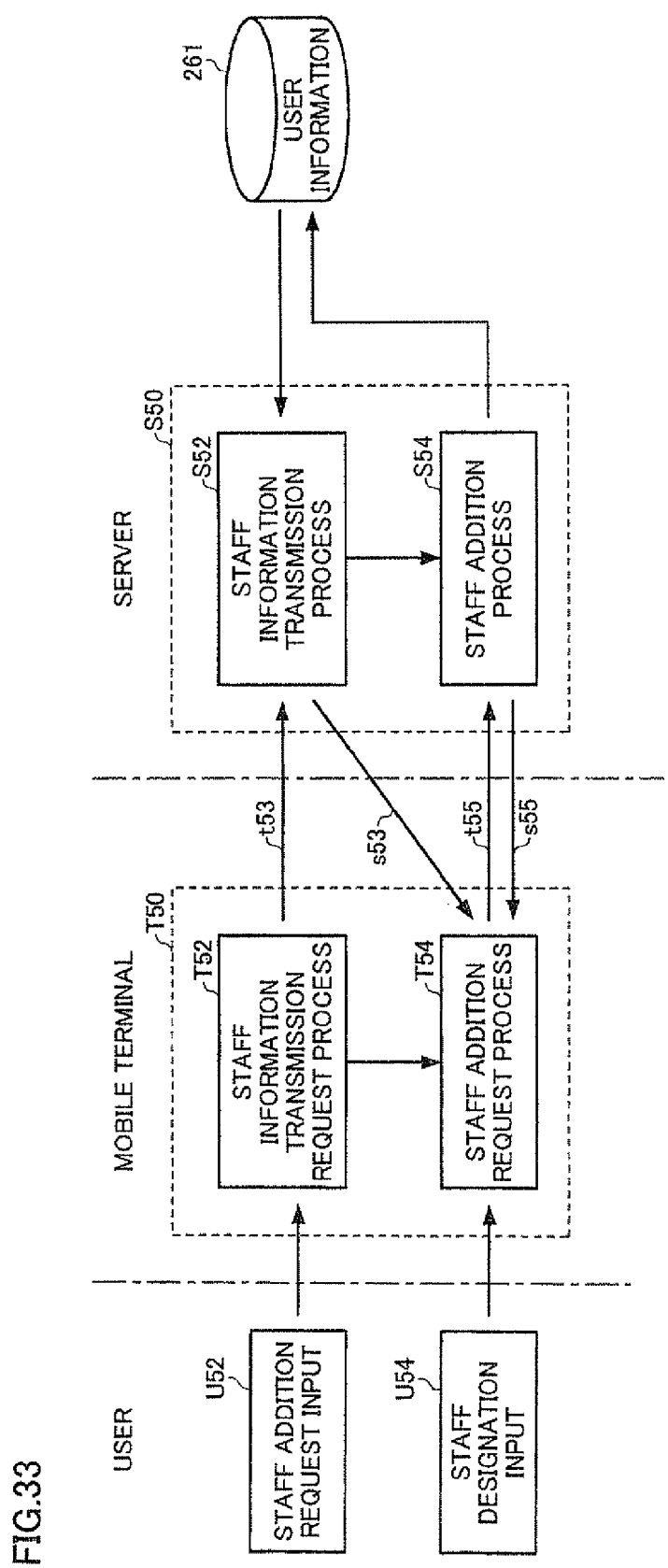
FIG. 33 is a diagram illustrating a process performed by a server and a mobile terminal during a staff addition process.

FIG. 33 is a diagram illustrating a process performed by the server and the mobile terminal during the staff addition process.

The mobile terminal executes a staff information transmission request routine (T50), and performs a screen transition process (see 650 and 660 in FIG. 23, for example). When the user has performed a staff addition request input (U52), the mobile terminal transmits a staff information transmission request to the server (t53).

The server that has received the staff information transmission request executes a staff information transmission routine (S52), creates staff information, and transmits the staff information to the mobile terminal that has transmitted the staff information transmission request (s53). For example, the server may search another user who is a friend of the user from the friend information stored in the user information database 261, and determine that the other user can be hired as staff when the game participation flag (370 in FIG. 8) stored in the game data of the other user indicates that the other user participates in the game. Note that the user information database 261 may be stored in another server, or a database of another application may be referred to by utilizing an API of the other application. The applications and the databases may be distributed so that the applications and the databases can be appropriately referred to and updated.

The mobile terminal that has received the staff information executes a staff addition request routine (T54), and performs a screen transition process (see 670 in FIG. 23, for example). When the user has performed a staff designation input (U54), the mobile terminal transmits a staff addition request including designated staff information to the server (t55).

The server that has received the staff addition request executes a staff addition routine (S54), updates the stamina value and the staff list stored in the user information database while taking the staff into consideration, and transmits a staff addition completion notification to the mobile terminal (s55).

4-6. Money Collection Process

Figure 34:
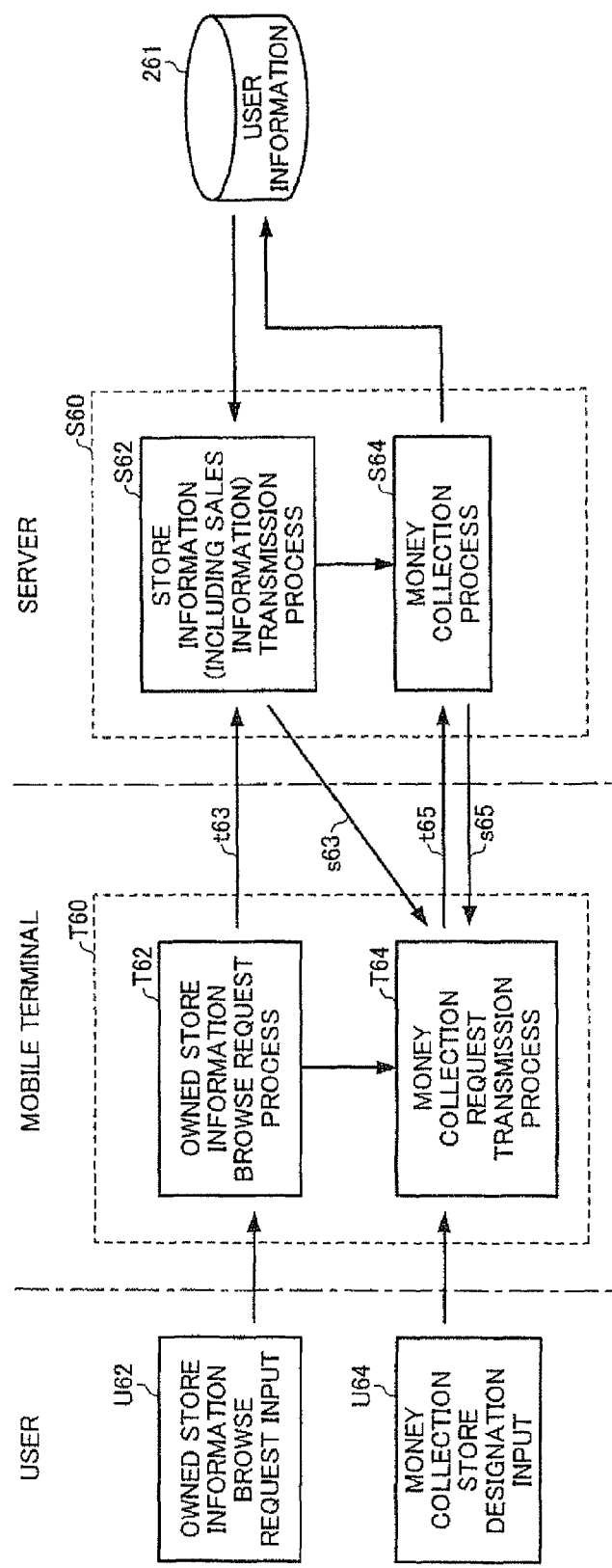
FIG. 34 is a diagram illustrating a process performed by a server and a mobile terminal during a money collection process.

FIG. 34 is a diagram illustrating a process performed by the server and the mobile terminal during the money collection process.

The mobile terminal executes an owned store information transmission request routine (T62), and performs a screen transition process (see 490 in FIG. 20, for example). When the user has performed an owned store information browse request input (U62), the mobile terminal transmits an owned store information browse request to the server (t63).

The server that has received the owned store information browse request executes an owned store information transmission routine (S62), generates owned store information based on the information stored in the owned store list that is the game data linked to the user identification information stored in the user information database, and the like, and transmits the owned store information to the mobile terminal (s63). Note that the store information database 262 and the user information database 261 may be stored in another server, or a database of another application may be referred to by utilizing an API of the other application. The applications and the databases may be distributed so that the applications and the databases can be appropriately referred to and updated.

The mobile terminal that has received the owned store information executes a money collection request routine (T64), and performs a screen transition process (see 560 in FIG. 20, for example). When the user has performed a money collection store designation input (U64), the mobile terminal transmits a money collection request including designated store information to the server (t65).

The server that has received the money collection request executes a money collection routine (S64), updates the information stored in the owned store list that is the game data linked to the user identification information stored in the user information database, and the like while taking the money collection process into consideration, and transmits a money collection completion notification to the mobile terminal (s65).

The above embodiments have been described taking a game that allows the user to purchases a virtual store, collect money from the sales, and work part-time in another virtual store to increase the assets and the experience value. Note that the invention is not limited thereto. For example, the invention may be applied to a game that allows the user to visit a virtual store as a customer. The invention may be applied to an arbitrary game that utilizes at least two events that are linked to the position information in the real world, and is executed based on the position information in the real world that is linked to each event, and the current position information about the mobile terminal.

The above embodiments have been described taking an example in which the invention is applied to a game system. Note that the invention may be applied to various game systems such as an arcade game system, a consumer game system, or a portable game system. The invention may be applied to various games such as a shooting game, a racing game, a role-playing game, and a puzzle game.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a game-providing program that provides a game to a plurality of mobile terminals via a network, the game-providing program causing a computer to function as:
    a virtual event area selection section that selects a virtual event area based on current position information acquired by a mobile terminal among the plurality of mobile terminals, the virtual event area being linked to position information that indicates a position within a predetermined range from a current position obtained from the current position information;
    an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;
    a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and
    a parameter calculation section that calculates at least one of a result value and a game parameter of a user in response to the acquisition request and/or the visit request for the virtual event area,
    the parameter calculation section changing the result value or the predetermined game parameter of a user for whom the information about the virtual event area is stored as the acquisition information when the visit request for the virtual event area has been received.

2. The information storage medium as defined in claim 1, wherein the visit processing section causes a memory to store identification information about a user who has issued the visit request for the virtual event area as visit record information linked to the virtual event area when the visit request has been received; and
    wherein the parameter calculation section determines whether or not the user who has issued the visit request for the virtual event area maintains a friendship with the user for whom the information about the virtual event area is stored as the acquisition information based on the visit record information and friend information that specifies a user who maintains a friendship with another user, and advantageously changes a result value or a predetermined game parameter of the user for whom the information about the virtual event area is stored as the acquisition information when it has been determined that the users are friends, as compared with a case where the users are not friends.

3. The information storage medium as defined in claim 1, wherein the visit processing section acquires information about a user who maintains a friendship with another user based on the friend information, and provides the other user with information about the virtual event area stored as the acquisition information about the user as the visit candidate information via a mobile terminal among the plurality of mobile terminals.

4. The information storage medium as defined in claim wherein the parameter calculation section changes a result value or a predetermined game parameter of a user who has issued the visit request for the virtual event area when the visit request has been received.

5. The information storage medium as defined in claim 1, the game-providing program causing the computer to further function as:
    a cooperator registration section that provides a user with information about another user who maintains a friendship with the user and is registered as a game user, as cooperator candidate information via a mobile terminal among the plurality of mobile terminals, and registers the other user as a cooperator of the user when a cooperation request that designates the other user has been received from the mobile terminal,
    wherein the parameter calculation section changes at least one of a result value and a game parameter of the user when a cooperator has been registered for the user.

6. The information storage medium as defined in claim 2, wherein the acquisition section decides whether or not a user who has acquired the selected virtual event area has a friend among other users who have issued acquisition requests for the virtual event area based on the friend information and the acquisition information, and determines a priority for providing the other users with the information via the users' mobile terminals based on the decision result.

7. The information storage medium as defined in claim 1, the game-providing program causing the computer to further function as:
    a virtual price calculation section that calculates a virtual price of the virtual event area based on land price information corresponding to the position information,
    wherein the acquisition section provides a user with information including the virtual price of the selected virtual event area via a mobile terminal among the plurality of mobile terminals.

8. The information storage medium as defined in claim 7, wherein the parameter calculation section calculates at least one of a result value and a game parameter of a user based on the virtual price of the virtual event area stored as the acquisition information about the user.

9. The information storage medium as defined in claim 7, wherein the acquisition section selects a virtual event area that is positioned within a predetermined range from the current position and has a virtual price equal to or lower than a given value based on the acquired current position information and the position information linked to the virtual event area, and provides information about the virtual event area as the acquisition candidate information, and wherein the acquisition section selects a virtual event area that has a virtual price equal to or lower than the given value and provides information about the virtual event area as the acquisition candidate information while enlarging the predetermined range stepwise when the virtual event area that has a virtual price equal to or lower than the given value is not included within the predetermined range.

10. The information storage medium as defined in claim 7,
wherein evaluation information that can be updated by another application is stored in a memory and linked to the virtual event area; and wherein the virtual price calculation section calculates the virtual price of the virtual event area based on the evaluation information.

11. The information storage medium as defined in claim 1,
wherein the parameter calculation section increases virtual sales of the virtual event area acquired by a user until an upper-limit value that has been set according to a predetermined condition has been reached; and wherein the parameter calculation section includes a virtual money collection section that allows a user to receive money from the virtual sales and resets the virtual sales when a money collection request for the virtual event area acquired by the user has been received from the mobile terminal.

12. The information storage medium as defined in claim 2, the game-providing program causing the computer to further function as:
an exclusive control section that performs an exclusive control process so that a user cannot acquire a virtual event area that has been acquired by another user who maintains a friendship with the user.

13. The information storage medium as defined in claim 12,
wherein, when a user maintains a friendship with another user who has acquired the virtual event area selected by the virtual event area selection section, the exclusive control section issues a negotiation request to the other user, and when the exclusive control section has received a negotiation acceptance response from the other user, the exclusive control section cancels acquisition of the virtual event area by the other user and allows the user to acquire the virtual event area.

14. A game-providing system that includes a server that provides game to a plurality of mobile terminals via a network, the game-providing system comprising:
a virtual event area information storage section that stores virtual event area information including a virtual event area and position information corresponding to the virtual event area;

a virtual event area selection section that selects a virtual event area based on current position information acquired by a mobile terminal among the plurality of mobile terminals, the virtual event area being linked to the position information that indicates a position within a predetermined range from a current position obtained from the current position information;

an acquisition section that provides a user with information about the virtual event area selected by the virtual event area selection section as acquisition candidate information via a mobile terminal among the plurality of mobile terminals, links the information about the virtual event area to identification information about the user, and causes a memory to store the information about the virtual event area as acquisition information about the user when an acquisition request for the virtual event area indicated by the acquisition candidate information has been received from a mobile terminal among the plurality of mobile terminals;

a visit processing section that provides a user with information about the virtual event area selected by the virtual event area selection section as visit candidate information via a mobile terminal among the plurality of mobile terminals, and receives a visit request for the virtual event area indicated by the visit candidate information from a mobile terminal among the plurality of mobile terminals; and a parameter calculation section that calculates at least one of a result value and a game parameter of a user in response to the acquisition request and/or the visit request for the virtual event area, the parameter calculation section changing the result value or the predetermined game parameter of a user for whom the information about the virtual event area is stored as the acquisition information when the visit request for the virtual event area has been received.

15. The game-providing system as defined in claim 14, further comprising:
a user information storage section that stores user information including friend information that specifies a user who maintains a friendship with another user, wherein the visit processing section causes a memory to store identification information about a user who has issued the visit request for the virtual event area as visit record information linked to the virtual event area when the visit request has been received; and wherein the parameter calculation section determines whether or not the user who has issued the visit request for the virtual event area maintains a friendship with the user for whom the information about the virtual event area is stored as the acquisition information based on the visit record information and the friend information, and advantageously changes a result value or a predetermined game parameter of the user for whom the information about the virtual event area is stored as the acquisition information when it has been determined that the users are friends, as compared with a case where the users are not friends.

16. The game-providing system as defined in claim 14,
wherein the visit processing section acquires information about a user who maintains a friendship with another user based on the friend information, and provides the other user with information about the virtual event area stored as the acquisition information about the user as the visit candidate information via a mobile terminal among the plurality of mobile terminals.

17. The game-providing system as defined in claim 14,
wherein the parameter calculation section changes a result value or a predetermined game parameter of a user who has issued the visit request for the virtual event area when the visit request has been received.

18. The game-providing system as defined in claim 14, further comprising:
a land price information storage section that stores land price information corresponding to the position information; and a virtual price calculation section that calculates a virtual price of the virtual event area based on the land price information, wherein the acquisition section provides a user with information including the virtual price of the selected virtual event area via a mobile terminal among the plurality of mobile terminals.

19. The game-providing system as defined in claim 18, wherein the parameter calculation section increases virtual sales of the virtual event area acquired by a user until an upper-limit value that has been set according to a predetermined condition has been reached; and wherein the parameter calculation section includes a virtual money collection section that allows a user to receive money from the virtual sales and resets the virtual sales when a money collection request for the virtual event area acquired by the user has been received from the mobile terminal.

20. The game-providing system as defined in claim 15, further comprising:

an exclusive control section that performs an exclusive control process so that a user cannot acquire a virtual event area that has been acquired by another user who maintains a friendship with the user.

* * * * *